United States Patent
Yamada et al.

(10) Patent No.: US 6,236,496 B1
(45) Date of Patent: *May 22, 2001

(54) OPTICAL FIBER AMPLIFIER AND OPTICAL AMPLIFICATION METHOD

(75) Inventors: Makoto Yamada; Hirotaka Ono; Terutoshi Kanamori; Yasutake Ohishi, all of Mito (JP)

(73) Assignee: Nippon Telegraph and Telephone Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 54 days.

(21) Appl. No.: 08/988,531

(22) Filed: Dec. 10, 1997

(30) Foreign Application Priority Data

Dec. 11, 1996 (JP) .................................. 8-331199
Dec. 13, 1996 (JP) .................................. 8-333923

(51) Int. Cl.[7] .................................................... H01S 3/00
(52) U.S. Cl. ............................................. 359/341; 372/6
(58) Field of Search ............................ 359/341; 372/6, 372/40

(56) References Cited

U.S. PATENT DOCUMENTS

| | | | |
|---|---|---|---|
| 5,365,368 | * 11/1994 | Hsu et al. ........................... | 359/341 |
| 5,500,764 | * 3/1996 | Armitage et al. ................... | 359/341 |
| 5,668,659 | * 9/1997 | Sakamoto et al. .................. | 359/341 |
| 5,905,838 | * 5/1999 | Judy et al. .......................... | 385/123 |

FOREIGN PATENT DOCUMENTS 5-315691   11/1993 (JP).

OTHER PUBLICATIONS

"Low Noise Operation of Er2+ Doped Silica Fibre Amplifier Around 1–6μm" J.F. Massicott et al., Electronics Letters, Sep. 24, 1992, vol. 28, No. 20, pp. 1924–1925.

"High Gain, Broadband, 1.6μm Er2+ Doped Silica Fibre Amplifier" J.F. Massicott, Electronics Letters, Sep. 27, 1990 vol. 26, No. 20, pp. 1645–1646.

"Gain–Flattened Er3+–Doped Fiber Amplifier for a WDM Signal in the 1.57–1.60-μm Wavelength Region" Ono et al. IEEE Photonics Technology Letters, May 1997, vol. 9, No. 5, pp. 1041–1135.

"1.58μm band Er3+–doped fibre amplifier pumped in the 0.98 and 1.48μm bands" Ono et al., Electronics Letters, May 8, 1997, vol. 33, No. 10, pp. 876–877.

"1.58–μm Band Gain–Flattened Erbium–Doped Fiber Amplifiers for WDM Transmission System" Ono et al., Journal of Lightwave Technology, Mar. 1999, vol. 17, No. 3, pp. 490–496.

1.58 μm Band $Er^{3+}$-doped Fiber Amplifier; H. Ono, et al., NTT Opto–electronics Laboratories, p. 271, 1997.

(List continued on next page.)

Primary Examiner—Mark Hellner
(74) Attorney, Agent, or Firm—Venable; Robert J. Frank; Ashley J. Wells

(57) ABSTRACT

An optical amplifier includes an erbium doped fiber of which at least one of a core part and a clad part is doped with erbium, excitation light sources or exciting the optical fiber, optical means for inputting excitation light from the excitation light source and signal light to the Er-doped fiber, and an optical isolator. The erbium doped fiber is a 1.58 μm band optical fiber having an equivalent fiber length as a product of a fiber length (m) and an erbium doping concentration (ppm by weight), which length provides a signal gain obtained at a wavelength of the excitation light source used for excitation of the erbium doped fiber of more than a predetermined practical reference value.

35 Claims, 36 Drawing Sheets

Er DOPED SILICA FIBER
λex: 0.98μm-BAND

FIBER LENGTH (m) ×Er
CONCENTRATION (wt ppm)

OTHER PUBLICATIONS 1580 nm–Band WDM Transport Technologies (1): For Doubling usable Band width and suppressing FWM in DSF; T. Sakamoto, et al.;, NTT Optical Network Systems Laboratories, p. 377, 1997.

1580 nm band WDM Transport Technologies (II): Optically Repeated Transmission; J. Kani, et al.; NTT Optical Network Systems Laboratories; p. 378, 1997.

1580 nm Band WDM Transport Technologies(III): Application to WDM Ring Networks; NTT Optical Network Systems Laboratories, p. 379, 1997.

Low Noise and High Gain 1.58 $\mu$m band EDFAs; H. Ono, et al., NTT Opto–electronics Laboratories; p. 126, 1997.

Optical Amplifiers and their Application; Victoria Conference Centre, Jul. 21–23, 1997: Ultra–broadband and gain–flattened EDFAs for WDM signals, Makoto Yamada, et al., NTT Opto–electronics Laboratories.

Optical Amplifier and their Applications; Victoria Conference Centre, Jul. 21–23, 1997: Ultra Wide Band Erbium–Doped Silica Fiber Amplifier with 80 nm of Bandwidth; Yan Sun, et al., Optical Society of America.

Recent Progress in Optical Fiber Amplifiers (Invited) M. Yamada, et al., NTT Opto–electronics Laboratories, The Institute of Electronics, Information and Communication Engineers, Technical Report, pp. 43–48, Jun. 1996.

WDM Optical Fiber Amplifiers for WDM Transmission; Yasutake Ohishi, et al., NTT Opto–electronics Laboratories, pp. 693–98, 1997.

1.6$\mu$m–Band Rare–Earth–Doped Fiber Amplifier; Makoto Yamada; Review of Laser Engineering, NTT Opto–electronics Laboratories, vol. 25, No. 2, pp. 147–52; Feb. 1997.

Amplification Characteristics of 1.58 $\mu$m Band $Er^{3+}$–Doped Amplifiers, H.Ono, et al., NTT Opto–electronics Laboratories; Technical Report of the Institute of Electronics, Information & Communication Engineers, pp. 25–30, May 1997.

Low–noise and high–gain 1.58 $\mu$m band $Er^{3+}$–doped fibre amplifiers with cascade configurations; H. Ono, et al., Electronics Letters; vol. 33, No. 17, pp. 1477–78, Aug. 14, 1997.

1.58$\mu$m band fluoride–based $Er^{3+}$–doped fibre amplifier for WDM transmission systems; H. Ono, et al., Electronics Letters, vol. 33, No. 17, 1471–72, Aug. 14, 1997.

$2^{nd}$ Optoelectronics & Communications Conference; Jul. 8–11, 1997: First Demonstration of 1580 nm wavelength band WDM transmission: For Doubling usable bandwidth and suppressing FWM in DSF, M. Jinno, et al., NTT Optical Network Systems Laboratories, pp. 406–07.

Broadband and gain–flattened amplifier composed of a 1.55$\lambda$m–band and a 1.58$\mu$m $Er^{3+}$–doped fibre amplifier in a parallel configuration; M. Yamada, et al., Electronics Letters, vol. 33, No. 8, pp. 710–11, Apr. 10, 1997.

Low Noise Operation of $Er^{3+}$Doped Silica Fibre Amplifier Around 1.6$\mu$m, J.F. Massicott, et al; Electronics Letters, vol. 28, No. 20, pp. 1924–25, Sep. 24, 1992.

High Gain, BroadBand 1.6 um $Er^{3+}$ Doped Silica Fibre Amplifier; Electronics Letters, vol. 26, No. 20, pp. 1645–46, Sep. 27, 1990.

Gain–flattened EDFA with high AL concentration for multistage repeatered WDM transmission systems; S. Yoshida, et al, Electronics Letters, vol. 31, No. 20, pp. 1765–67; Sep. 28, 1995.

Wideband Gain Flattened Erbium Fibre Amplifier Using a Photosensitive Fibre Blazed Grating; R. Kashyap, et al, Electronic Letters, vol. 29, No. 2, pp. 154–56, Jan. 21, 1993.

Fluoride–Based Erbium–Doped Fiber Amplifier with Inherently Flat Gain Spectrum; Makoto Yamada, et al., IEEE, Photonics Technology Letters, vol. 8, No. 7, Jul. 1996.

Gain–flattened optical–fiber amplifiers with a hybrid Er–doped–doped–fiber configuration for WDM transmission; T. Kashiwada, et al., OFC '95 Technical Digest, pp. 77–78.

A Low–Noise and Gain–Flattened Amplifier Composed of a Silica–Based and a Fluoride–Based $Er^{3+}$–Doped Fiber Amplifier in a Cascade Configuration, Makoto Yamada, et al., IEEE Photonics Technology Letters, vol. 8, No. 5, May, 1996, pp. 620–22.

Gain–Flattened $Er^{3+}$–Doped Fiber Amplifier for a WDM Signal in the 1.57–1.60–$\mu$m Wavelength Region, Hirotaka Ono, IEEE Photonics Technology Letters, vol. 9, No. 5, pp. 596–98, May 1997.

1.58$\mu$m band $Er^{3+}$–doped fibre amplifier pumped in the 0.98 and 1.48$\mu$m bands, H. Ono, et al., Electronics Letters, vol. 33, No. 10, pp. 876–77, May 8, 1997.

* cited by examiner

OPTICAL FIBER AMPLIFIER AND OPTICAL AMPLIFICATION METHOD

BACKGROUND OF THE INVENTION

1. Field of the Invention

This invention relates to an optical amplifier and an optical amplification method, and more specifically to 1.58 μm band optical fiber amplifiers for amplifying signal light in a wavelength band of 1.570 to 1.600 μm or 1.565 to 1.600 μm and broad-band optical fiber amplifiers using the 1.58 μm band optical fiber amplifiers. Also, this invention relates to amplification methods using such optical fiber amplifiers.

2. Description of the Related Art

An Er-doped optical fiber amplifier (EDFA) has advantageous characteristics that it is possible to effect optical amplification in 1.55 μm where transmission loss of communication optical fiber is minimum, it has no dependence on polarization, it can be connected with a communication optical fiber with a low loss, and the like. Therefore, the Er-doped optical fiber amplifier is being developed as an optical amplifier for 1.55 μm band optical communication systems, and widely applied in, for example, a trunk transmission system for transmitting digital signals, an optical CATV transmission system for transmitting analog signals, and the like.

Recently, in the 1.55 μm band optical communication system, with the aim of even further increasing the communication capacity, transmission of wavelength division multiple (WDM) signals comprising a plurality of optical signals of different signal wavelengths is being attempted. For this purpose, the optical fiber amplifier is required to have a wide amplification bandwidth, and characteristics for amplifying individual signal lights differing in wavelength in WDM signals without gain deviation.

To overcome such requirements, the following conventional methods have been proposed:

(1) A method in which an Er-doped silica based fiber that is codoped with Al is used as an amplification medium;

(2) A method in which a gain equalizer is added behind the optical fiber amplifier;

(3) A method in which an Er-doped fluoride based fiber is used as an amplification medium; and (4) A method in which two Er-doped optical fibers differing in gain spectrum are cascade connected to each other.

In relation to the method (1) above, it is reported that the gain deviation of 1.54–1.56 μm WDM signals can be reduced to less than 0.2 dB (S. Yoshida, et al., "Gain flattened FDFA with high Al concentration for multistage repeated WDM transmission systems", Electron. Lett., vol. 31, pp. 1765–1767, 1995). On the methods (2) and (3) above, thebackwarde reports that the gain deviation of 1.532–1.56 μm WDM signals can be reduced to less than 1.5 dB (R. Kashyap, et al., "Wideband gain flattened erbium fiber amplifier using a photosensitive fiber blazed grating", Electron. Lett., vol. 29, pp. 154–156, 1993 and M. Yamada, et al., "Fluoride-based erbium-doped fiber amplifier with inherently flat gain spectrum", IEEE Photonics Technol. Lett., vol. 8, pp. 882–884, 1996). Further, as for the method (4) above, there have been reported that an Al,Er-codoped silica-based fiber and a P,Er-codoped silica-based fiber in a cascade configuration can achieve a gain deviation in 1.54–1.56 μm WDM signal of less than 1.3 dB (T. Kashiwada et al., ìGain flattening for fiber amplifiersî, OFC ì95, paper TuP1, 1995), and that use of an Al,Er-codoped silica-based fiber and an Er-doped fluoride-based fiber in a cascade configuration can achieve a gain deviation in 1.53–1.56 μm WDM signal of less than 1.1 dB (M. Yamada et al., ìGain flattening for fiber amplifiersî, IEEE Photonics Technol., Vol. 8, pp. 620–622, 1996).

Presently, there have been reported WDM transmission experiments at 1 Tbit/s, 2.6 Tbit/s, and so on using optical fiber amplifiers according to the methods (2), (3) and (4) above. However, even with the this method, the gain-flattened amplification band is limited to 1530 nm to 1560 nm as shown in FIG. 1 (Yamada, et al., Proceedings for the Electronic Information Communication Society, LQE 96–27, pp. 43–48) so that in order to even further expand the communication bandwidth used in WDM transmission, improvements in the band characteristics including the broadening of band and the flattening of gain, of optical fiber amplifiers are important.

Furthermore, there has been a report that Er-doped silica based fibers have an amplification band of 1.57 to 1.61 μm (1.58 μm band), in addition to the amplification band of 1.53 to 1.56 μm (1.55 μm band) (J. F. Massicott, et al., "High gain, broadband, 1.6 μm $Er^{3+}$-doped silica fibre amplifier", Electron. Lett., vol. 26, No. 20, pp. 1645–1646, 1990 and J. F. Massicott et al., ìLow noise operation of $Er^{3+}$ doped silica fibre amplifier around 1.6 μmî, Electron. Lett., Vol. 28, No. 20, pp. 1924–1925, 1992). FIG. 2 shows an amplification band of 1.58 μm band shown in this report (J. F. Massicott, et al., "High gain, broadband, 1.6 μm $Er^{3+}$-doped silica fiber amplifier", Electron. Lett., vol. 26, pp. 1645–1646, 1990). In FIG. 2, the solid line, broken line and dashed line indicate signal gain curves where the fiber length L=200 m, 175 m, or 150 m, respectively.

However, the conventional 1.58 μm band optical fiber amplifiers have the following problems.

1) A high power 1.55 μm band pump light source is required, which is expensive, unlike those of a 0.98 μm band (Er $^4I_{11/2}$ level excitation of the Er-doped silica based fiber), 0.97 μm band (Er $^4I_{11/2}$ level excitation of the Er-doped fluoride based fiber), or a 1.48 μm band (Er $^4I_{11/2}$ level excitation of individual fibers) used as an excitation light source for the conventional Er-doped optical fiber amplifier.

2) A definitive designing method for the fiber length and other parameters of the Er-doped optical fiber for achieving the 1.58 μm band amplification has yet to be clarified.

3) The gains at respective signal wavelengths of WDM signals in the 1.58 μm band cannot be flattened (the gain deviation cannot be reduced).

SUMMARY OF THE INVENTION

Therefore, a primary object of this invention is to provide a 1.58 μm optical fiber amplifier and an optical amplification method using the same.

A further object of this invention is to provide an optical amplifier and an optical amplification method using the same having flat, broadband amplification characteristics.

In accordance with a first aspect of this invention, there is provided an optical amplifier characterized by comprising:

an erbium doped fiber having a core part and a clad part, at least one of the core part and the clad part being doped with erbium, an excitation light source for exciting the optical fiber, optical means for inputting excitation light from the excitation light source and signal light to the Er-doped fiber, and an optical isolator, wherein the erbium doped fiber is a 1.58 μm band optical fiber having an equivalent fiber length as a product of a fiber length (m) and an erbium doping concentration (ppm by weight), the equivalent fiber length providing a signal gain, obtained at a wavelength of the excitation light source used for excitation of the erbium doped fiber, of more than a predetermined practical reference value.

Here, the practical reference value may be 15 dB.

The erbium doped fiber may be selected from the group consisting of an Er-doped silica fiber, an Er-doped fluoride fiber, an Er-doped tellurite glass fiber, an Er-doped multi-component oxide glass fiber, an Er-doped chalcogenide glass fiber, and an Er-doped fluorophosphate glass fiber.

The erbium doped fiber may be selected from the group consisting of an Er-doped silica fiber, an Er-doped multi-component oxide glass fiber, and an Er-doped fluorophosphate glass fiber, and wherein a difference between the signal gain of a maximum wavelength and the signal gain of a minimum wavelength in a plurality of different signal lights in a wavelength region of 1.570 to 1.600 $\mu$m may preferably be less than 1 dB.

The erbium doped fiber may be selected from the group consisting of an Er-doped fluoride fiber and an Er-doped tellurite glass fiber, and wherein a difference between the signal gain of a maximum wavelength and the signal gain of a minimum wavelength in a plurality of different signal lights in a wavelength region of 1.565 to 1.600 $\mu$m may preferably be less than 1 dB.

The excitation light source may be a light source for exciting a $^4I_{11/2}$ level or a $^4I_{13/2}$ level of Er.

The excitation light source may comprise a light source for exciting a $^4I_{11/2}$ level and a light source for exciting a $^4I_{13/2}$ level of Er.

The excitation light source may be a 0.98 $\mu$m band excitation light source for exciting a $^4I_{11/2}$ level of Er or a 1.48 $\mu$m band excitation light source for exciting a $^4I_{13/2}$ level of Er and wherein the Er-doped fiber is selected from the group consisting of an Er-doped silica fiber, an Er-doped multi-component oxide glass fiber, an Er-doped fluorophosphate glass fiber, or an Er-doped tellurite glass fiber.

The excitation light source may comprise a light source for exciting a $^4I_{11/2}$ level and a light source for exciting a $^4I_{13/2}$ level of Er and wherein the Er-doped fiber is selected from the group consisting of an Er-doped silica fiber, an Er-doped multi-component oxide glass fiber, an Er-doped fluorophosphate glass fiber, or an Er-doped tellurite glass fiber.

The excitation light source may be a 0.97 $\mu$m band excitation light source for exciting a $^4I_{11/2}$ level of Er or a 1.48 $\mu$m band excitation light source for exciting a $^4I_{13/2}$ level of Er and wherein the Er-doped fiber may be an Er-doped fluoride fiber.

The excitation light source may comprise a 0.97 $\mu$m band excitation light source for exciting a $^4I_{11/2}$ level of Er or a 1.48 $\mu$m band excitation light source for exciting a $^4I_{13/2}$ level of Er and wherein the Er-doped fiber may be an Er-doped fluoride fiber.

The erbium doped fiber may be an Er-doped silica fiber having an equivalent fiber length of greater than 0.3×10$^5$ (m wt. Ppm) and the excitation light source is a 0.98 $\mu$m band excitation light source for generating excitation light of 0.98 $\mu$m band.

The erbium doped fiber may be an Er-doped silica fiber having an equivalent fiber length of greater than 0.6×10$^5$ (m weight ppm), and the excitation light source is a 1.48 $\mu$m band excitation light source for exciting a $^4I_{13/2}$ level of Er.

The erbium doped fiber may be an Er-doped fluoride fiber having an equivalent fiber length of greater than 0.1×10$^5$ (m weight ppm), and the excitation light source may be a 0.97 $\mu$m band excitation light source for a $^4I_{11/2}$ level of Er.

The erbium doped fiber may be an Er-doped fluoride fiber having an equivalent fiber length of greater than 0.2×10$^5$ (m weight ppm), and the excitation light source may be a 1.48 $\mu$m band excitation light source for a $^4I_{13/2}$ level of Er.

The erbium doped fiber may be an Er-doped tellurite glass fiber having an equivalent fiber length of no smaller than 0.005×10$^5$ (m weight ppm) and wherein the excitation light source may be a 0.98 $\mu$m band excitation light source for a $^4I_{11/2}$ level of Er.

The erbium doped fiber may be an Er-doped tellurite glass fiber having an equivalent fiber length of greater than 0.01×10$^5$ (m weight ppm), and the excitation light source may be a 1.48 $\mu$m band excitation light source a $^4I_{13/2}$ level of Er.

The erbium doped fiber may be an Er-doped multi-component oxide glass fiber having an equivalent fiber length of greater than 0.008×10$^5$ (m weight ppm), and the excitation light source may be a 0.98 $\mu$m band excitation light source for a $^4I_{11/2}$ level of Er.

The erbium doped fiber may be an Er-doped multi component oxide glass fiber having an equivalent fiber length of greater than 0.015×10$^5$ (m weight ppm), and the excitation light source may be a 1.48 $\mu$m band excitation light source for exciting a $^4I_{13/2}$ level of Er.

The erbium doped fiber may be an Er-doped chalcogenide glass fiber having an equivalent fiber length of greater than 0.01×10$^5$ (m weight ppm), and the excitation light source may be a 0.98 $\mu$m band excitation light source for exciting a $^4I_{11/2}$ level of Er.

The erbium doped fiber may be an Er-doped chalcogenide glass fiber having an equivalent fiber length of greater than 0. 02×10$^5$ (m weight ppm), and the excitation light source may be a 1.48 $\mu$m band excitation light source for exciting a $^4I_{13/2}$ level of Er.

The erbium doped fiber may be an Er-doped fluorophosphate glass fiber having an equivalent fiber length of greater than 0.008×10$^5$ (m weight ppm) and wherein the excitation light source may be a 0.98 $\mu$m band excitation light source for exciting a $^4I_{11/2}$ level of Er.

The erbium doped fiber may be an Er-doped fluorophosphate glass fiber having an equivalent fiber length of greater than 0.015×10$^5$ (m weight ppm) and wherein the excitation light source may be a 1.48 $\mu$m band excitation light source for exciting a $^4I_{13/2}$ level of Er.

The erbium doped fiber may be an Er-doped silica fiber having an equivalent fiber length of greater than 0.3×10$^5$ (m weight ppm) and wherein the excitation light source may comprise a 0.98 $\mu$m band excitation light source for exciting a $^4I_{11/2}$ level of Er and a 1.48 $\mu$m band excitation light source for exciting a $^4I_{13/2}$ level of Er.

The erbium doped fiber may be an Er-doped fluoride fiber having an equivalent fiber length of greater than 0.1×10$^5$ (m weight ppm) and wherein the excitation light source may comprise a 0.97 $\mu$m band excitation light source for exciting a $^4I_{11/2}$ level of Er and a 1.48 $\mu$m band excitation light source for exciting a $^4I_{13/2}$ level of Er.

The erbium doped fiber may be an Er-doped tellurite fiber having an equivalent fiber length of greater than 0.005×10$^5$ (m weight ppm) and wherein the excitation light source may comprise a 0.98 $\mu$m band excitation light source for exciting a $^4I_{11/2}$ level of Er and a 1.48 $\mu$m band excitation light source for exciting a $^4I_{13/2}$ level of Er.

The erbium doped fiber may be an Er-doped multi component oxide glass fiber having an equivalent fiber length of greater than 0.008×10$^5$ (m weight ppm) and wherein the excitation light source may comprise a 0.98 μm band excitation light source for exciting a $^4I_{11/2}$ level of Er and a 1.48 μm band excitation light source for exciting a $^4I_{13/2}$ level of Er.

The erbium doped fiber may be an Er-doped chalcogenide glass fiber having an equivalent fiber length of greater than $0.01\times10^5$ (m weight ppm) and wherein the excitation light source may comprise a 0.98 μm band excitation light source for exciting a $^4I_{11/2}$ level of Er and a 1.48 μm band excitation light source for exciting a $^4I_{13/2}$ level of Er.

The erbium doped fiber may be an Er-doped fluorophosphate glass fiber having an equivalent fiber length of greater than $0.008\times10^5$ (m weight ppm) and wherein the excitation light source may comprise a 0.98 μm band excitation light source for exciting a $^4I_{11/2}$ level of Er and a 1.48 μm band excitation light source for exciting a $^4I_{13/2}$ level of Er.

According to a second aspect of the present invention, there is provided an optical amplifier comprising:
- a demultiplexer for dividing signal light into plurality of wavelength regions;
- a plurality of optical amplification units for amplifying individual signal light outputted from the demultiplexer; and
- a multiplexer for combining individual signal light outputted from the plurality of optical amplification units:
- wherein at least one of the optical amplification unit may comprise an erbium doped fiber having a core part and a clad part, at least one of which is doped with erbium, an excitation light source for exciting the optical fiber, optical means for inputting excitation light from the excitation light source and signal light to the Er-doped fiber, and an optical isolator and wherein the erbium doped fiber is a 1.58 μm band optical fiber having an equivalent fiber length as a product of a fiber length (m) and an erbium doping concentration (ppm by weight), the length providing a signal gain obtained at a wavelength of the excitation light source used for excitation of the erbium doped fiber of no smaller than a predetermined practical reference value.

Here, the practical reference value may be 15 dB.

The erbium doped fiber may be selected from the group consisting of an Er-doped silica fiber, an Er-doped fluoride fiber, an Er-doped tellurite glass fiber, an Er-doped multi-component oxide glass fiber, an Er-doped chalcogenide glass fiber, and an Er-doped fluorophosphate glass fiber.

The erbium doped fiber may be selected from the group consisting of an Er-doped silica fiber, an Er-doped multi-component oxide glass fiber, and an Er-doped fluorophosphate glass fiber and wherein a difference between the signal gain of a maximum wavelength and the signal gain of a minimum wavelength in a plurality of different signal lights in a wavelength region of 1.570 to 1.600 μm may preferably be less than 1 dB.

The erbium doped fiber may be selected from the group consisting of an Er-doped fluoride fiber and an Er-doped tellurite glass fiber and wherein a difference between the signal gain of a maximum wavelength and the signal gain of a minimum wavelength in a plurality of different signal lights in a wavelength region of 1.565 to 1.600 μm may preferably be less than 1 dB.

The excitation light source may be a light source for exciting a $^4I_{11/2}$ level or a $^4I_{13/2}$ level of Er.

The excitation light source may comprise a light source for exciting a $^4I_{11/2}$ level and a light source for exciting a $^4I_{13/2}$ level of Er.

The excitation light source may be a 0.98 μm band excitation light source for exciting a $^4I_{11/2}$ level of Er or a 1.48 μm band excitation light source for exciting a $^4I_{13/2}$ level of Er.

The excitation light source may comprise a light source for exciting a $^4I_{11/2}$ level and a light source for exciting a $^4I_{13/2}$ level of Er and wherein the Er-doped fiber may be selected from the group consisting of an Er-doped silica fiber, an Er-doped multi-component oxide glass fiber, an Er-doped fluorophosphate glass fiber, and an Er-doped tellurite glass fiber.

The excitation light source may be a 0.97 μm band excitation light source for exciting a $^4I_{11/2}$ level of Er or a 1.48 μm band excitation light source for exciting a $^4I_{13/2}$ level of Er.

The excitation light source may comprise a 0.97 μm band excitation light source for exciting a $^4I_{11/2}$ level of Er or a 1.48 μm band excitation light source for exciting a $^4I_{13/2}$ level of Er and wherein the Er-doped fiber may be an Er-doped fluoride fiber.

The erbium doped fiber may be an Er-doped silica fiber having an equivalent fiber length of greater than $0.3\times10^5$, and the excitation light source may be a 0.98 μm band excitation light source for exciting a $^4I_{11/2}$ level of Er.

The erbium doped fiber may be an Er-doped silica fiber having an equivalent fiber length of greater than $0.6\times10^5$ (m weight ppm), and the excitation light source may be a 1.48 μm band excitation light source for exciting a $^4I_{13/2}$ level of Er.

The erbium doped fiber may be an Er-doped fluoride fiber having an equivalent fiber length of greater than $0.1\times10^5$ (m weight ppm), and the excitation light source may be a 0.97 μm band excitation light source for exciting a $^4I_{11/2}$ level of Er.

The erbium doped fiber may be an Er-doped fluoride fiber having an equivalent fiber length of greater than $0.2\times10^5$ (m weight ppm), and the excitation light source may be a 1.48 μm band excitation light source for exciting a $^4I_{13/2}$ level of Er.

The erbium doped fiber may be an Er-doped tellurite glass fiber having an equivalent fiber length of no smaller than $0.005\times10^5$ (m weight ppm) and wherein the excitation light source may be a 0.98 μm band excitation light source for exciting a $^4I_{11/2}$ level of Er.

The erbium doped fiber may be an Er-doped tellurite glass fiber having an equivalent fiber length of greater than $0.01\times10^5$ (m weight ppm), and the excitation light source may be a 1.48 μm band excitation light source for exciting a $^4I_{13/2}$ level of Er.

The erbium doped fiber may be an Er-doped multi-component oxide glass fiber having an equivalent fiber length of greater than $0.008\times10^5$ (m weight ppm), and the excitation light source may be a 0.98 μm band excitation light source for exciting a $^4I_{11/2}$ level of Er.

The erbium doped fiber may be an Er-doped multi-component oxide glass fiber having an equivalent fiber length of greater than $0.015\times10^5$ (m weight ppm), and the excitation light source may be a 1.48 μm band excitation light source for exciting a $^4I_{13/2}$ level of Er.

The erbium doped fiber may be an Er-doped chalcogenide glass fiber having an equivalent fiber length of greater than $0.01\times10^5$ (m weight ppm), and the excitation light source may be a 0.98 μm band excitation light source for exciting a $^4I_{11/2}$ level of Er.

The erbium doped fiber may be an Er-doped chalcogenide glass fiber having an equivalent fiber length of greater than $0.02\times10^5$ (m weight ppm), and the excitation light source may be a 1.48 μm band excitation light source for exciting a $^4I_{13/2}$ level of Er.

The erbium doped fiber may be an Er-doped fluorophosphate glass fiber having an equivalent fiber length of greater than $0.008\times10^5$ (m weight ppm) and wherein the excitation light source may be a 0.98 μm band excitation light source for exciting a $^4I_{11/2}$ level of Er.

The erbium doped fiber may be an Er-doped fluorophosphate glass fiber having an equivalent fiber length of greater than $0.015\times10^5$ (m weight ppm) and wherein the excitation light source may be a 1.48 μm band excitation light source for exciting a $^4I_{13/2}$ level of Er.

The optical amplifier as claimed in claim 30, wherein the erbium doped fiber may be an Er-doped silica fiber having an equivalent fiber length of greater than $0.3\times10^5$ (m weight ppm) and wherein the excitation light source may comprise a 0.98 μm band excitation light source for exciting a $^4I_{11/2}$ level of Er and a 1.48 μm band excitation light source for exciting a $^4I_{13/2}$ level of Er.

The erbium doped fiber may be an Er-doped fluoride fiber having an equivalent fiber length of greater than $0.1\times10^5$ (m weight ppm) and wherein the excitation light source may comprise a 0.97 μm band excitation light source for exciting a $^4I_{11/2}$ level of Er and a 1.48 μm band excitation light source for exciting a $^4I_{13/2}$ level of Er.

The erbium doped fiber may be an Er-doped tellurite fiber having an equivalent fiber length of greater than $0.005\times10^5$ (m weight ppm) and wherein the excitation light source may comprise a 0.98 μm band excitation light source for exciting a $^4I_{11/2}$ level of Er and a 1.48 μm band excitation light source for exciting a $^4I_{13/2}$ level of Er.

The erbium doped fiber may be an Er-doped multi-component oxide glass fiber having an equivalent fiber length of greater than $0.008\times10^5$ (m weight ppm) and wherein the excitation light source may comprise a 0.98 μm band excitation light source for exciting a $^4I_{11/2}$ level of Er and a 1.48 μm band excitation light source for generating excitation light of 1.48 μm.

The erbium doped fiber may be an Er-doped chalcogenide glass fiber having an equivalent fiber length of greater than $0.01\times10^5$ (m weight ppm) and wherein the excitation light source may comprise a 0.98 μm band excitation light source for generating excitation light of 0.98 μm band and a 1.48 μm band excitation light source for exciting a $^4I_{13/2}$ level of Er.

The erbium doped fiber may be an Er-doped chalcogenide glass fiber having an equivalent fiber length of greater than $0.008\times10^5$ (m weight ppm) and wherein the excitation light source may comprise a 0.98 μm band excitation light source for exciting a $^4I_{11/2}$ level of Er and a 1.48 μm band excitation light source for exciting a $^4I_{13/2}$ level of Er.

The optical amplification unit may comprise a thulium-doped fiber having a core part and a clad part, one of the core part and the clad part being doped with thulium, an excitation light source for exciting the optical fiber, optical means for inputting an excitation light from the excitation light source and a signal light into the Tm-doped fiber.

The optical amplification unit may comprise a praseodymium-doped fiber having a core part and a clad part, one of the core part and the clad part being doped with praseodymium, an excitation light source for exciting the optical fiber, optical means for inputting an excitation light from the excitation light source and a signal light into the Pr-doped fiber.

The optical amplification unit may comprise a Raman fiber amplifier.

The Raman fiber amplifier may have an amplification activity in a 1.51 μm band.

The optical amplifier may have an optical variable attenuator for adjusting a signal light power outputted from each optical amplification unit which is inserted between the plurality of optical amplification units and an input port of the multiplexer.

The optical amplifier may have a difference between the signal gain of a maximum wavelength and the signal gain of a minimum wavelength in a plurality of signal lights in a wavelength region of 1.58 μm which is less than 1 dB.

According to a third aspect of the present invention, there is provided an optical amplification method for amplifying light by passing an excitation light from an excitation light source through an erbium doped fiber having a core part and a clad part, at least one of the core part and the clad part being doped with erbium for amplifying signal light in a wavelength region of 1.58 μm band, wherein the erbium doped fiber has an equivalent fiber length as a product of a fiber length (m) and an erbium doping concentration (ppm by weight), the length providing a signal gain obtained at a wavelength of the excitation light source used for excitation of the erbium doped fiber of more than a predetermined practical reference value.

The wavelength region of 1.58 μm band may be a wavelength region of 1.57 to 1.60 μm.

The wavelength region of 1.58 μm band may be a wavelength region of 1.565 to 1.60 μm.

The optical amplification unit may comprise a thulium-doped fiber having a core part and a clad part, one of the core part and the clad part being doped with thulium, an excitation light source for exciting the optical fiber, optical means for inputting an excitation light from the excitation light source and a signal light into the Tm-doped fiber.

The optical amplification unit may comprise a praseodymium-doped fiber having a core part and a clad part, one of the core part and the clad part being doped with praseodymium, an excitation light source for exciting the optical fiber, optical means for inputting an excitation light from the excitation light source and a signal light into the Pr-doped fiber.

The optical amplification unit may comprise a Raman fiber amplifier.

The Raman fiber amplifier may have an amplification activity in a 1.51 μm band.

The above and other objects, effects, features and advantages of the present invention will become more apparent from the following description of embodiments thereof taken in conjunction with the accompanying drawings.

DESCRIPTION OF PREFERRED EMBODIMENTS

Figure 1:
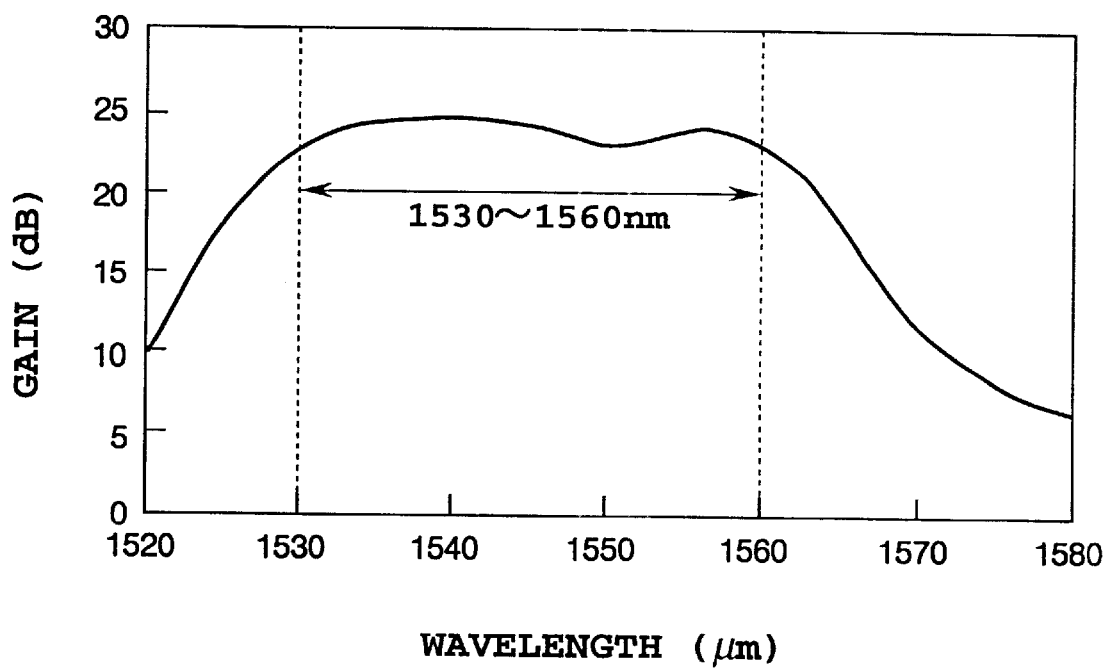
FIG. 1 is a graph illustrating the amplification characteristics of a conventional 1.55 mm band optical fiber amplifier.
Figure 2:
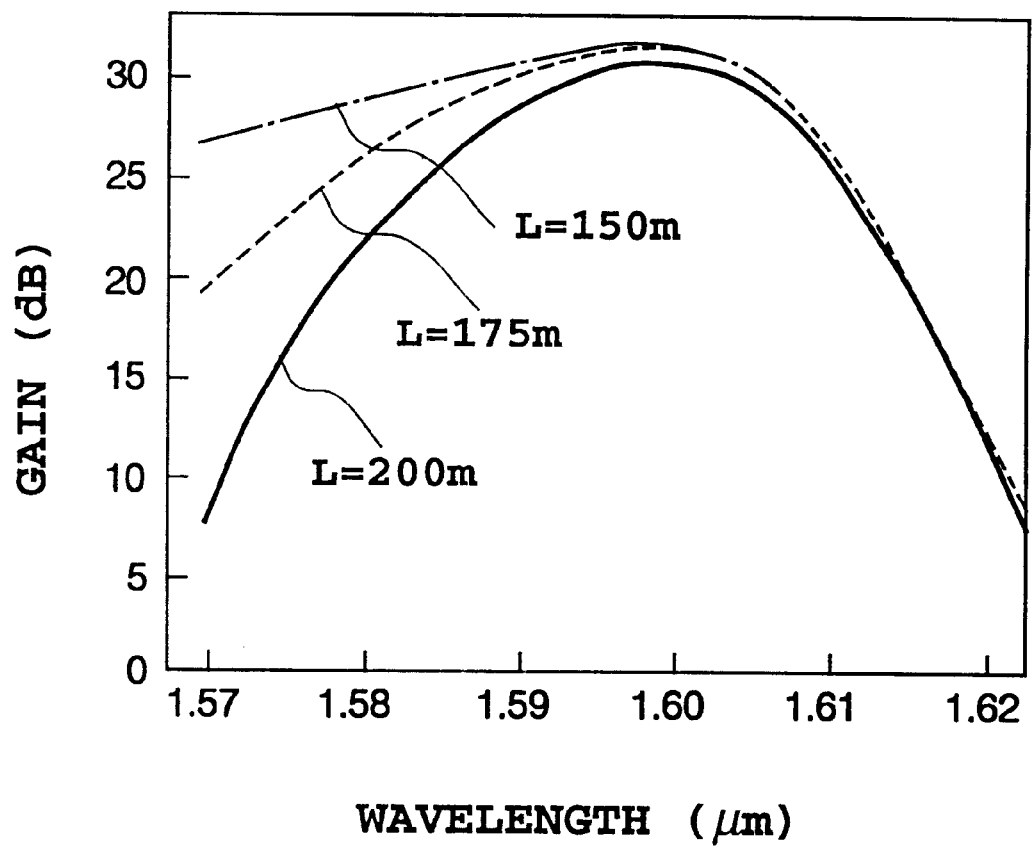
FIG. 2 is a graph illustrating a 1.58 μm amplification band in a conventional optical amplifier with an Er-doped silica fiber.
Figure 3:
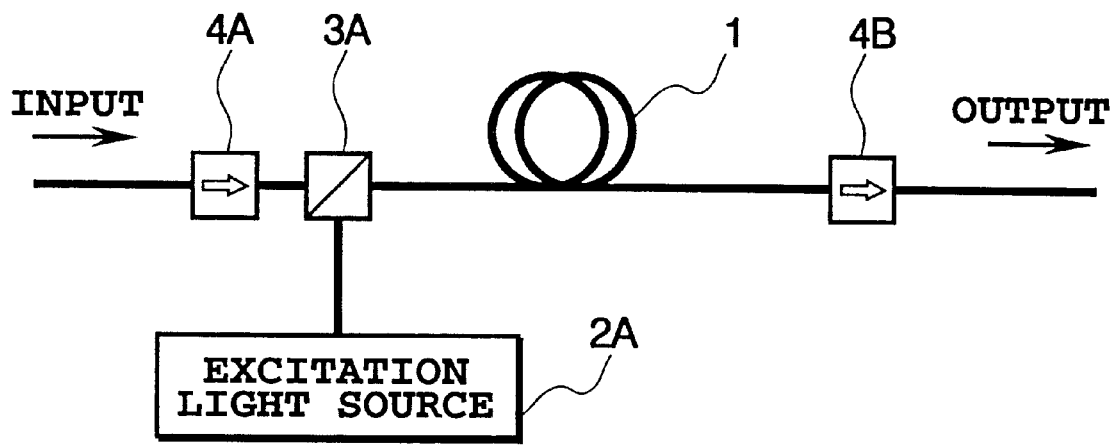
FIG. 3 is a block diagram showing a basic structure (forward excitation system) of the 1.58 μm band optical fiber amplifier according to this invention.
Figure 4:
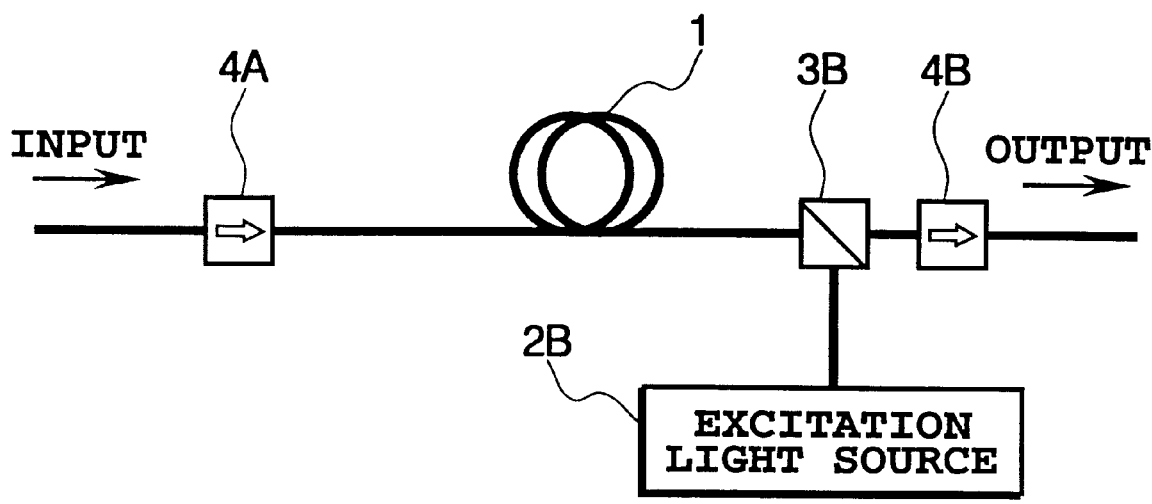
FIG. 4 is a block diagram showing a basic structure (backward excitation system) of the 1.58 μm band optical fiber amplifier according to this invention.
Figure 5:
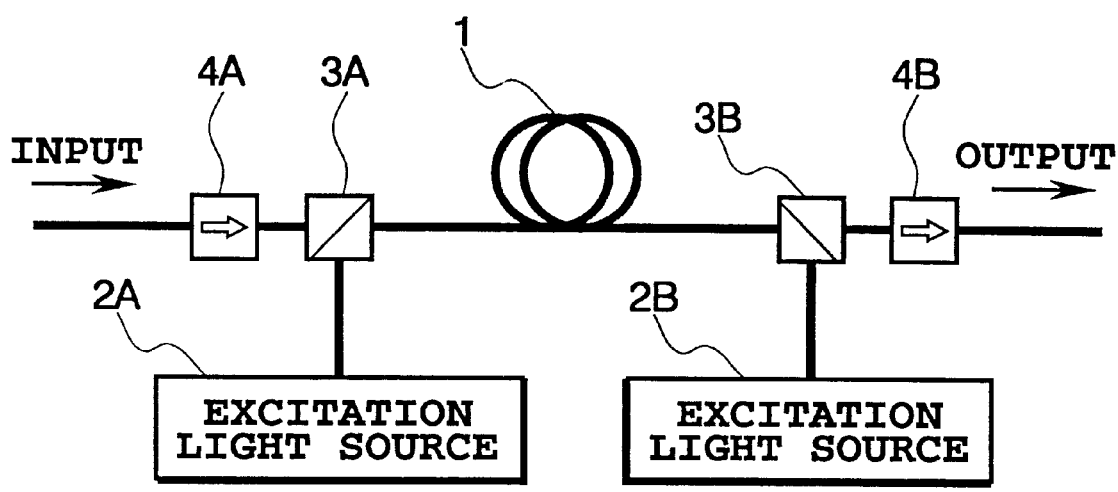
FIG. 5 is a block diagram showing a basic structure (bidirectional excitation system) of the 1.58 μm band optical fiber amplifier according to this invention.

FIGS. 3 to 5 show basic structures of the 1.58 μm band optical fiber according to this invention.

FIG. 3 shows the arrangement of the optical fiber amplifier of this invention in the form of a forward excitation system, FIG. 4 shows the arrangement of the optical fiber amplifier of the invention in the form of a backward excitation system, and FIG. 5 shows the arrangement of the optical fiber amplifier in the form of a bidirectional excitation system. An Er-doped optical fiber 1, which serves as an amplification medium, can be, for example, an Er-doped silica based fiber, an Er-doped fluoride based fiber, an Er-doped tellurite glass based fiber, an Er-doped chalcogenide glass based fiber, an Er-doped multi-component oxide glass based fiber, or an Er-doped fluorophosphate glass based fiber. An excitation light source 2A or 2B generates excitation light, which is launched into the Er-doped optical fiber 1. The generated light is in 0.98 μm band or 1.48 μm band in the case of Er-doped silica fibers, Er-doped tellurite glass based fibers, Er-doped chalcogenide glass based fibers, Er-doped multi-component oxide glass based fibers, and Er-doped fluorophosphate glass based fibers, or 0.97 μm band or 1.48 μm band in the case of Er-doped fluoride fibers. A multiplexer 3A or 3B combines the signal light with the excitation light before they are launched into the Er-doped optical fiber 1. Optical isolators 4A and 4B are provided to suppress the oscillation of the optical fiber amplifier.

The 1.58 μm band optical fiber amplifier according to this invention is characterized in that a product of the fiber length and Er doping concentration of the Er-doped optical fiber 1 is within a specified range as described below.

Figure 6:
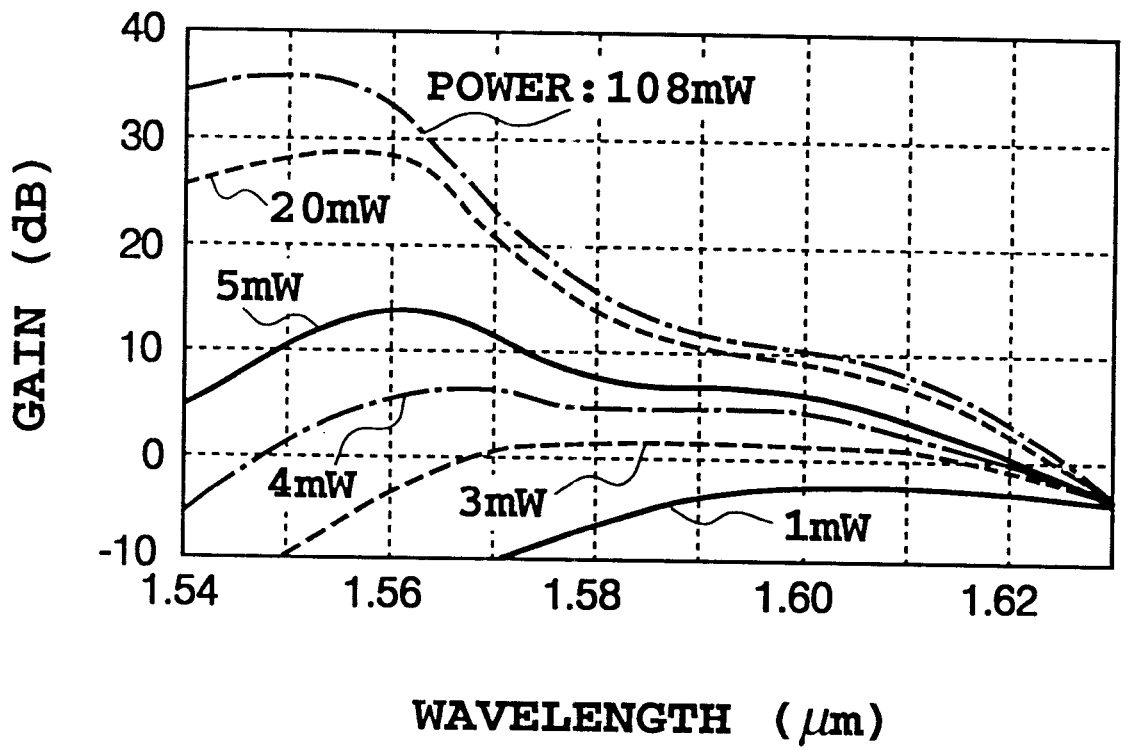
FIG. 6 is a graph illustrating an example of change in amplification band relative to the excitation light power of the Er-doped silica fiber.

FIG. 6 shows an example of change in amplification band relative to the excitation light power of the Er-doped silica fiber having a fiber length of 20 m, a refractive index difference of 1.8%, a cut-off wavelength of 1.13 μm, an Al doping concentration of 40000 wt. ppm, an Er doping concentration of 1000 wt. ppm, and an excitation wavelength of 1.48 μm band. The excitation system uses the forward excitation system as shown in FIG. 3. The fiber length 20 m of the Er-doped silica fiber is a length used in a normal 1.55 μm band optical fiber amplifier.

FIG. 6 shows that the gain is flat in the wavelength region of 1.57 to 1.60 μm when the excitation light power is about 3 to 4 mW. However, with these fiber lengths, a practical signal gain (more than 15 dB) cannot be obtained in the wavelength region of 1.57 to 1.60 μm. That is, with the fiber length used in the normal 1.55 μm band optical fiber amplifier, it is impossible to construct a practical 1.58 μm band optical fiber amplifier.

Figure 7:
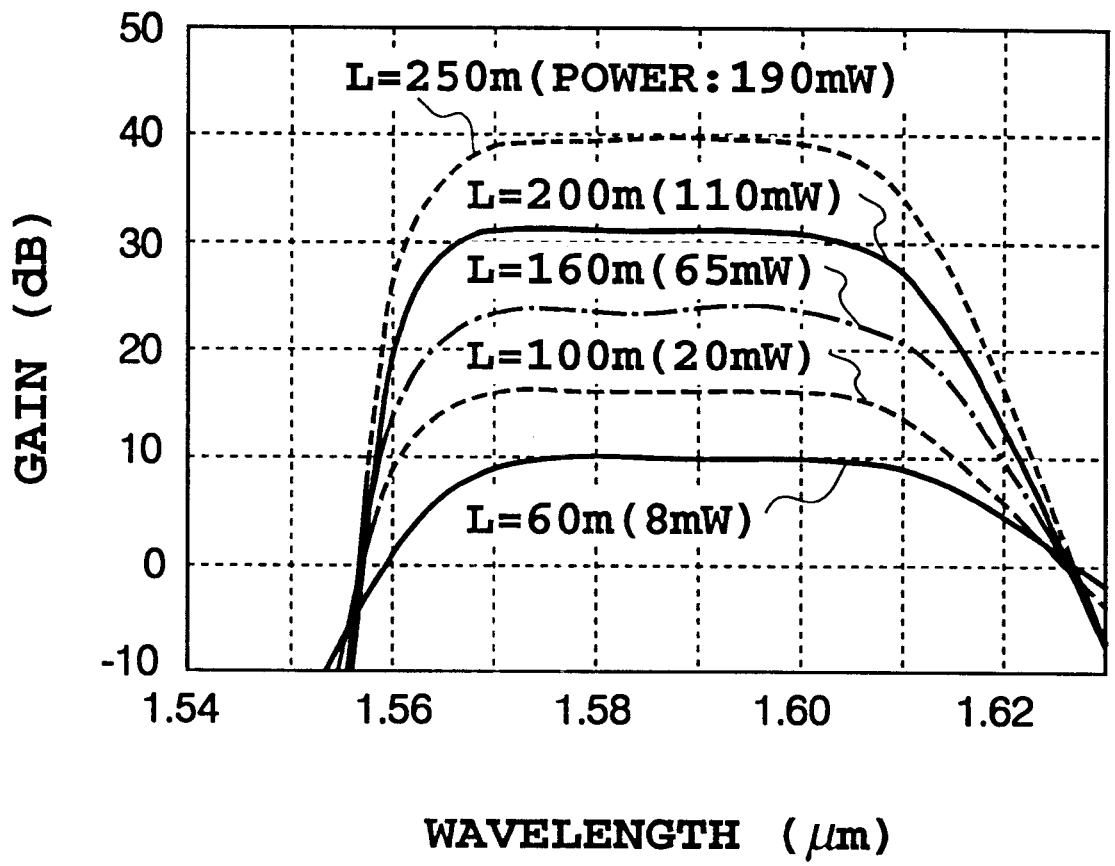
FIG. 7 is a graph illustrating an example of change in amplification band relative to the fiber length of an Er-doped silica fiber.

FIG. 7 shows an example of change in amplification band relative to the fiber length in the construction used in the measurement of FIGS. 3 to 5. The excitation light power is set to a value where the gain is flat in the 1.58 μm band wavelength region. FIG. 7 shows that by increasing the fiber length, the signal gain of the 1.58 μm is increased. That is, it can be seen that to achieve a practical 1.58 μm band optical fiber amplifier, the fiber length of the Er-doped optical fiber is one of the important parameters.

Incidentally, the fiber length of the Er-doped optical fiber strongly depends on the Er doping concentration of the Er-doped optical fiber. Therefore, as a parameter showing an equivalent fiber length of the Er-doped optical fiber, is used a product of the fiber length (m) with the Er doping concentration (wt. ppm) of the Er-doped optical fiber.

Figure 8:
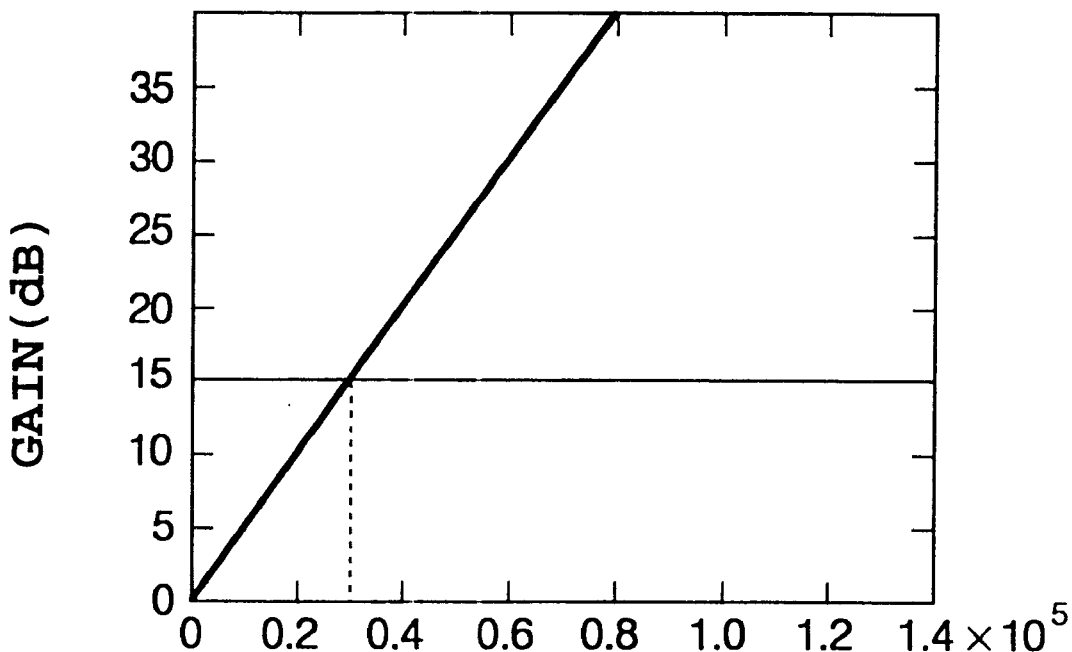
FIG. 8 is a graph illustrating the relationship between the signal gain and the fiber length x Er doping concentration of an Er-doped silica fiber when it is excited in 0.98 μm band.
Figure 9:
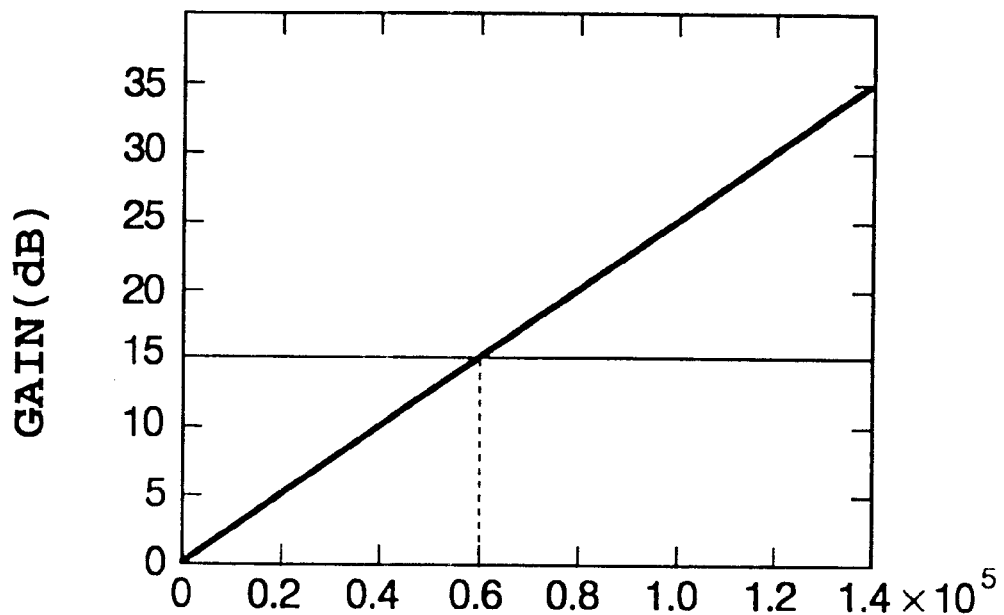
FIG. 9 is a graph illustrating the relationship between the signal gain and the fiber length x Er doping concentration of an Er-doped silica fiber when it is excited in 1.48 μm band.

FIGS. 8 and 9 show the relationship between the signal gain and [fiber length x Er doping concentration] when the gain in 1.58 μm band of the Er-doped silica fiber is flat. FIG. 8 relates to the case where an excitation light of 0.98 μm band is used, and FIG. 9 relates to the case where an excitation light of 1.48 μm band is used.

Figure 10:
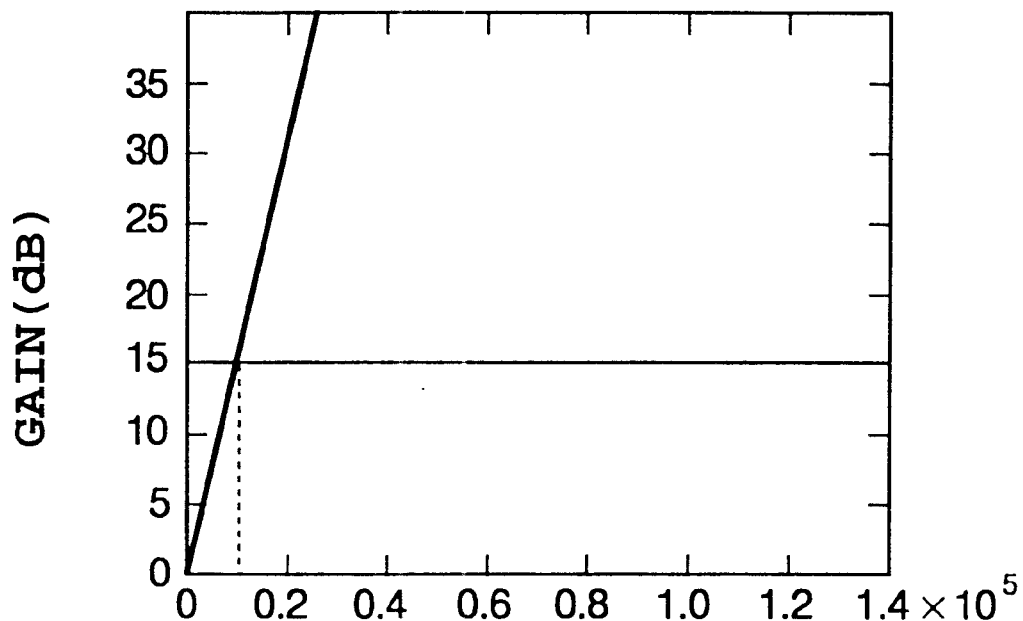
FIG. 10 is a graph illustrating the relationship between the signal gain and the fiber length x Er doping concentration of an Er-doped fluoride fiber when it is excited in 0.98 μm band.
Figure 11:
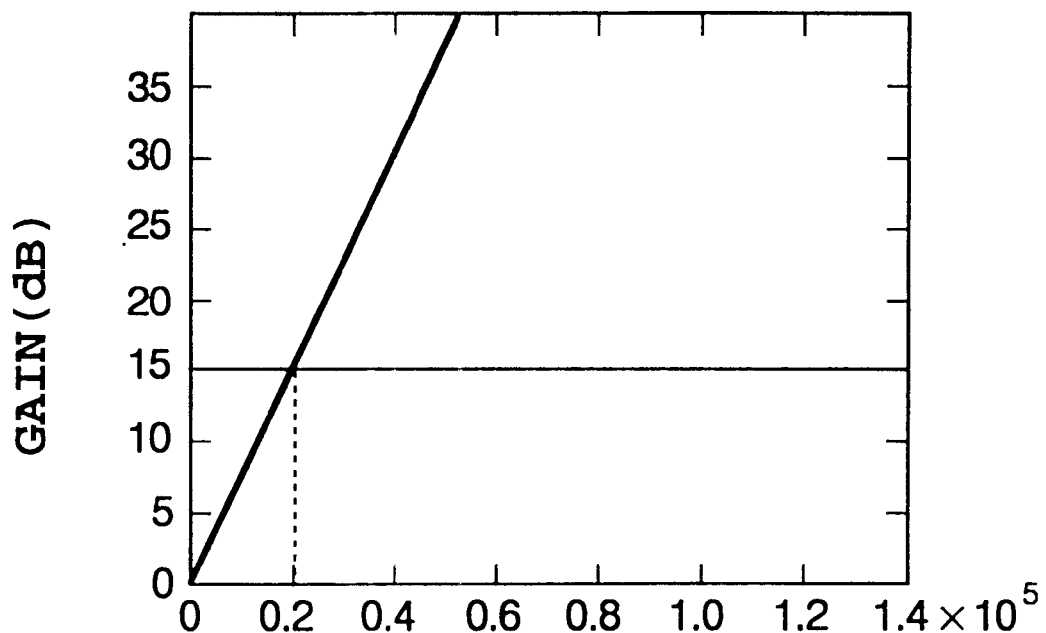
FIG. 11 is a graph illustrating the relationship between the signal gain and the fiber length x Er doping concentration of an Er-doped fluoride fiber when it is excited in a 1.48 μm band.

FIGS. 10 and 11 show the relationship between the signal gain and [fiber length x Er doping concentration] when the gain in 1.58 μm band of the Er-doped fluoride fiber is flat. FIG. 10 relates to the case where an excitation light of 0.97 μm band is used, and FIG. 11 relates to the case where an excitation light of 1.48 μm band is used.

Figure 12:
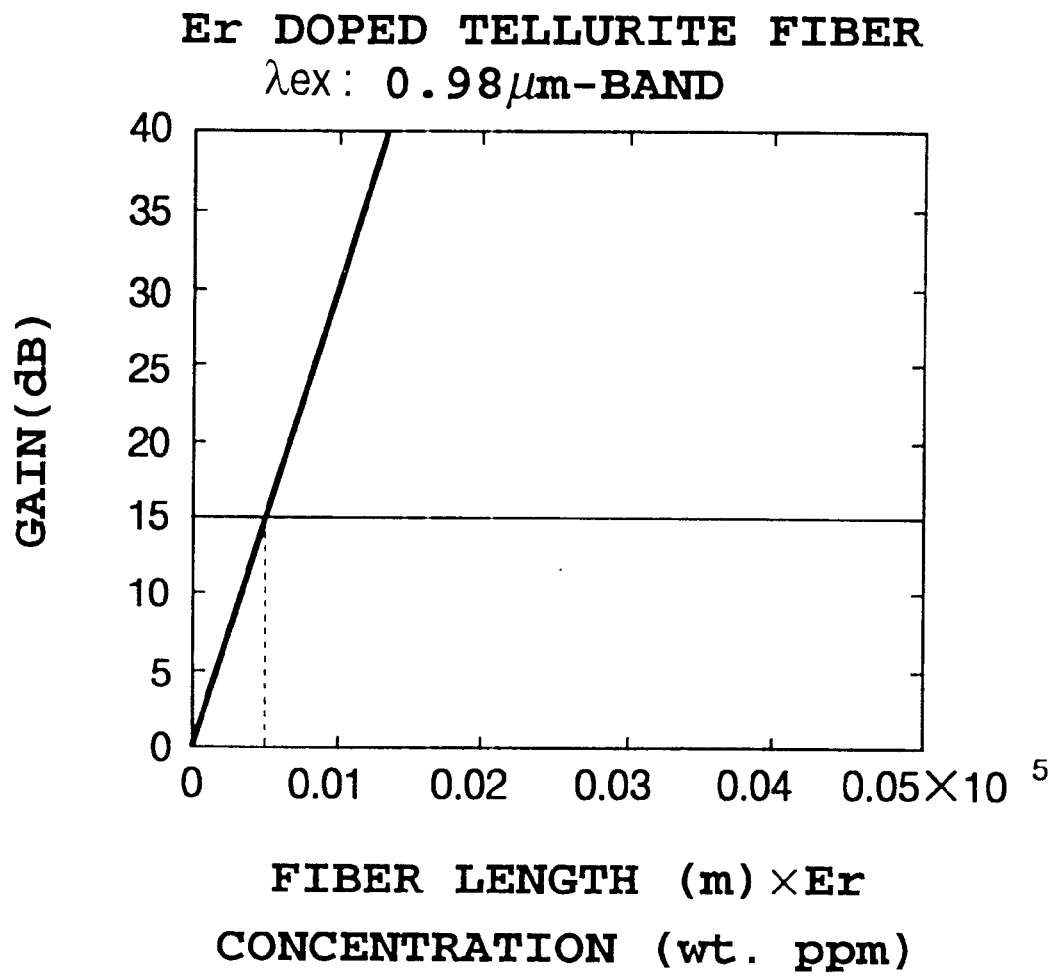
FIG. 12 is a graph illustrating the relationship between the signal gain and the fiber length x Er doping concentration of an Er-doped tellurite glass fiber when it is excited in a 0.98 μm band.
Figure 13:
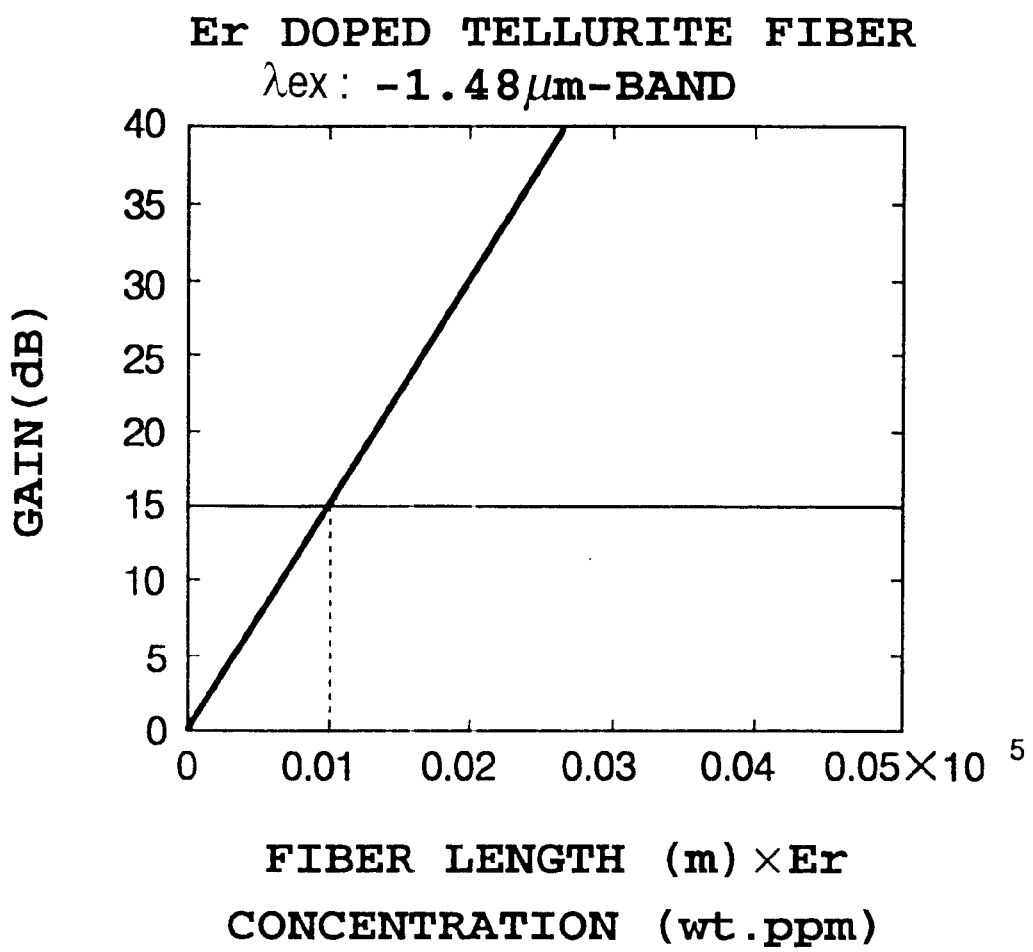
FIG. 13 is a graph illustrating the relationship between the signal gain and the fiber length x Er doping concentration of an Er-doped tellurite glass fiber when it is excited in a 1.48 μm band.

FIGS. 12 and 13 show the relationship between the signal gain and [fiber length x Er doping concentration] when the gain in 1.58 μm band of the Er-doped tellurite glass fiber is flat. FIG. 12 relates to the case where an excitation light of 0.98 μm band is used, and FIG. 13 relates to the case where an excitation light of 1.48 μm band is used.

Figure 14:
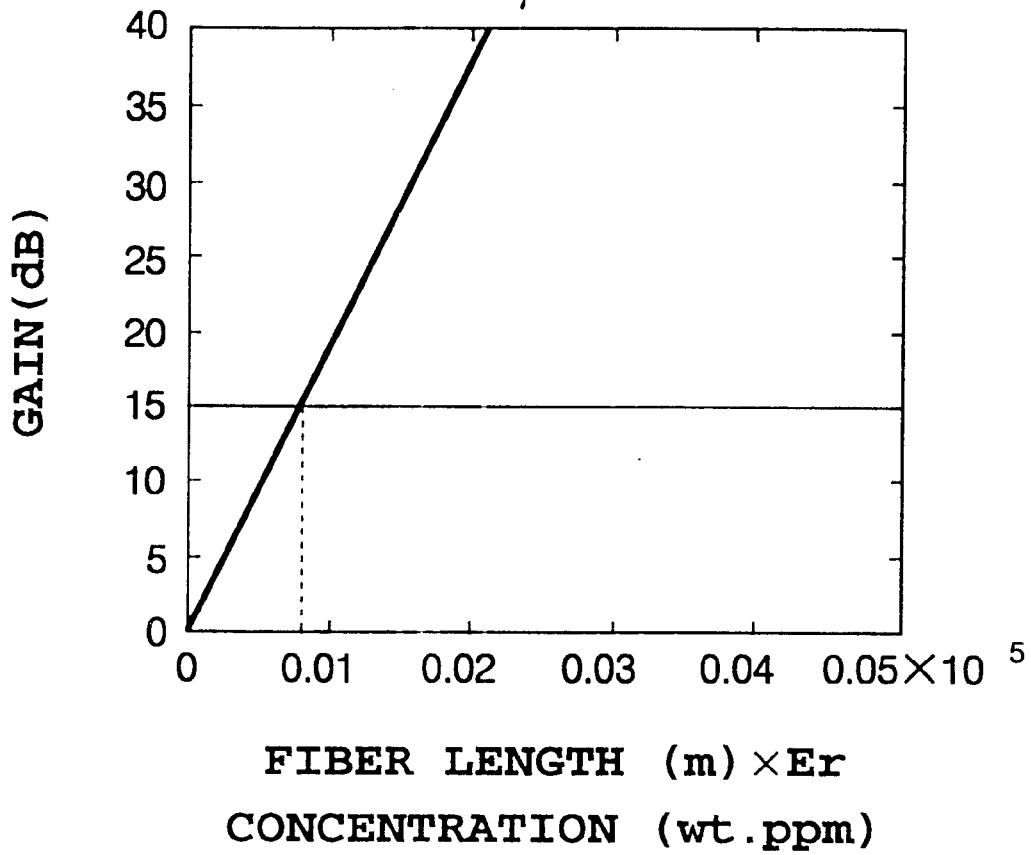
FIG. 14 is a graph illustrating the relationship between the signal gain and the fiber length x Er doping concentration of an Er-doped multi-component oxide glass fiber when it is excited in a 0.98 μm band.
Figure 15:
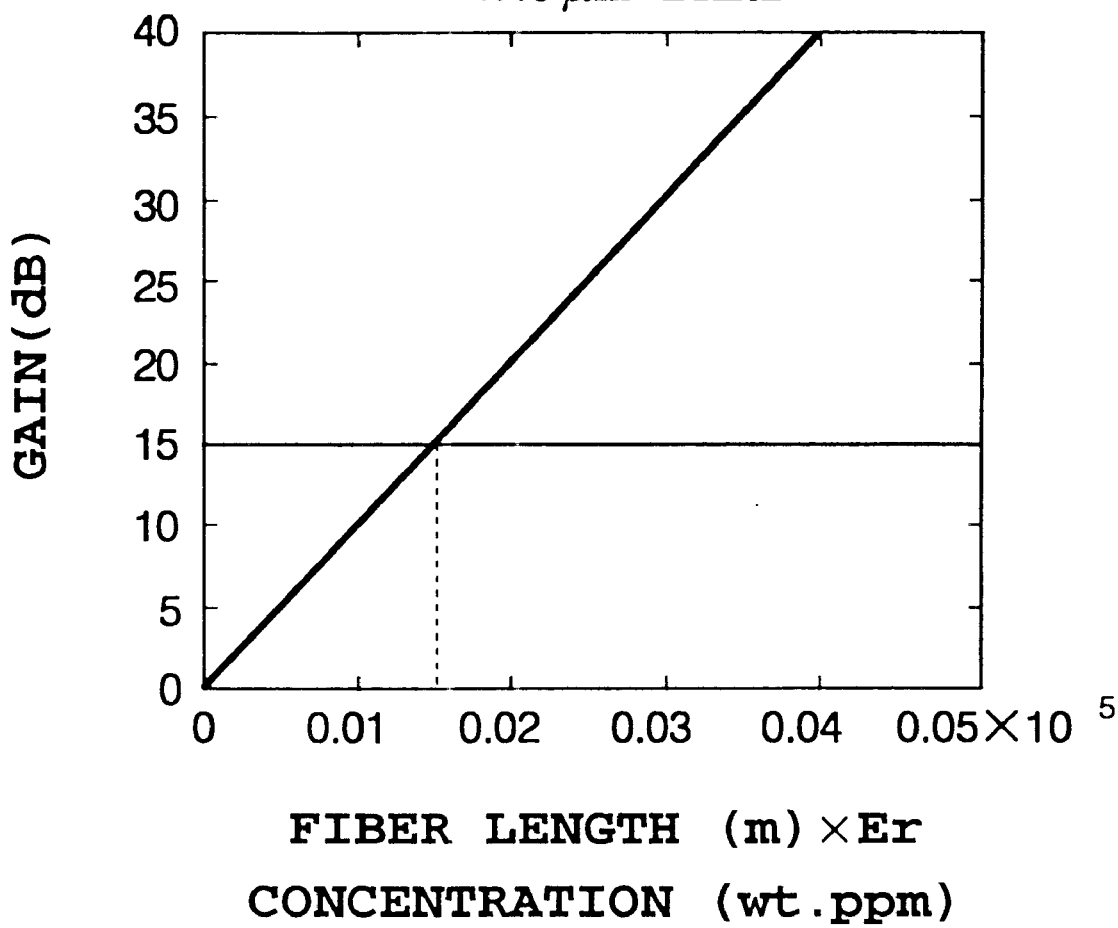
FIG. 15 is a graph illustrating the relationship between the signal gain and the fiber length x Er doping concentration of an Er-doped multi-component oxide glass fiber when it is excited in a 1.48 μm band.

FIGS. 14 and 15 show the relationship between the signal gain and [fiber length x Er doping concentration] when the gain in 1.58 μm band of the Er-doped multi-component oxide glass fiber is flat. FIG. 14 relates to the case where an excitation light of 0.98 μm band is used, and FIG. 15 relates to the case where an excitation light of 1.48 μm band is used.

Figure 16:
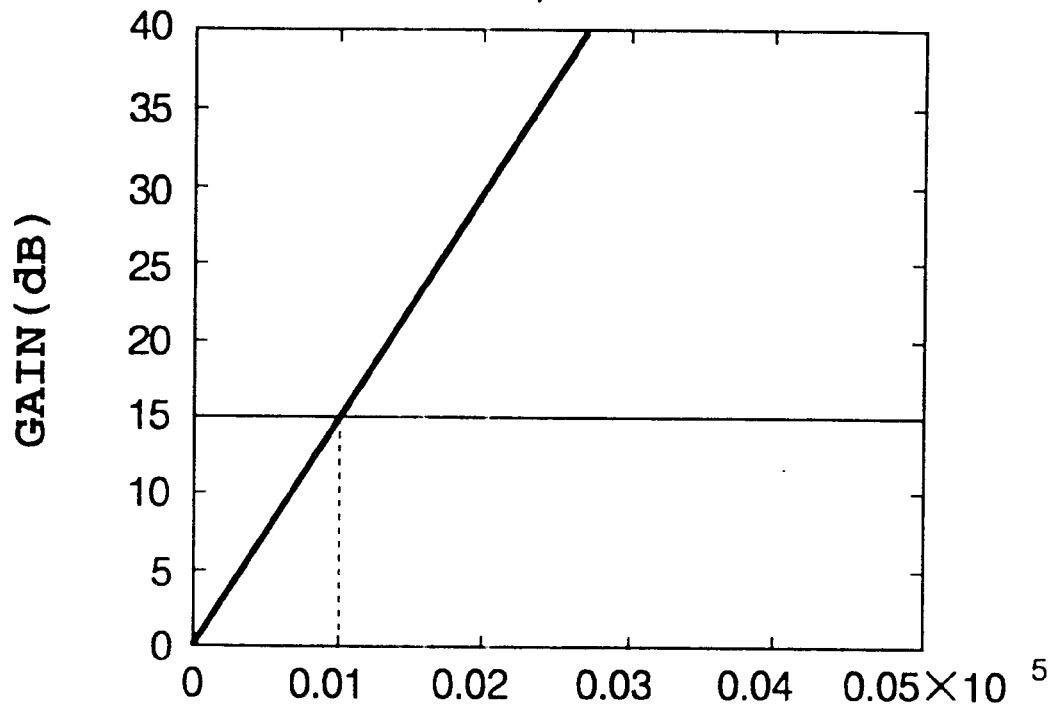
FIG. 16 is a graph illustrating the relationship between the signal gain and the fiber length x Er doping concentration of an Er-doped chalcogenide glass fiber when it is excited in a 0.98 μm band.
Figure 17:
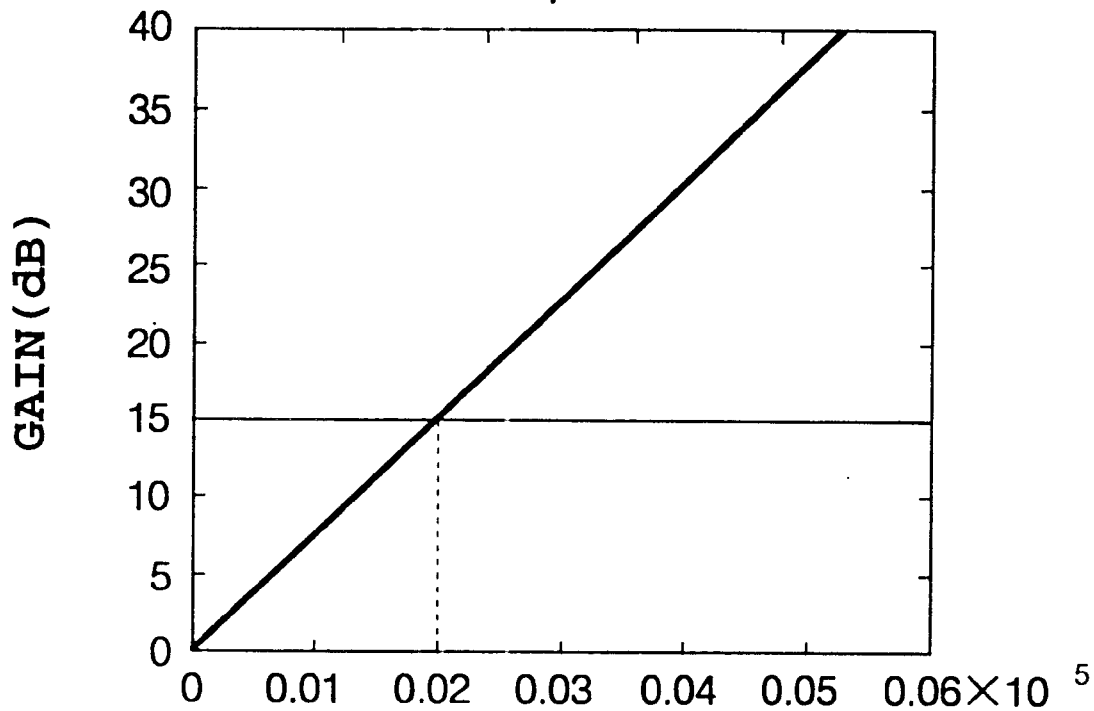
FIG. 17 is a graph illustrating the relationship between the signal gain and the fiber length x Er doping concentration of an Er-doped chalcogenide glass fiber when it is excited in a 1.48 μm band.

FIGS. 16 and 17 show the relationship between the signal gain and [fiber length x Er doping concentration] when the gain in 1.58 μm band of the Er-doped chalcogenide glass fiber is flat. FIG. 16 relates to the case where an excitation light of 0.98 μm band is used, and FIG. 17 relates to the case where an excitation light of 1.48 μm band is used.

Figure 18:
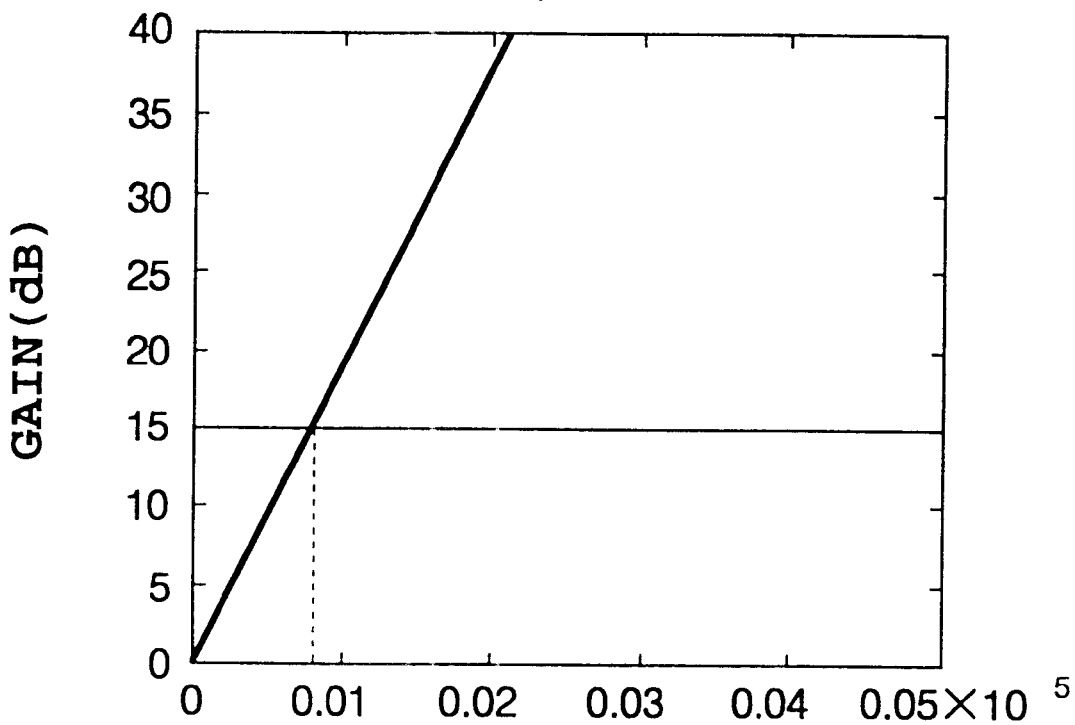
FIG. 18 is a graph illustrating the relationship between the signal gain and the fiber length x Er doping concentration of an Er-doped fluorophosphate glass fiber when it is excited in a 0.98 μm band.
Figure 19:
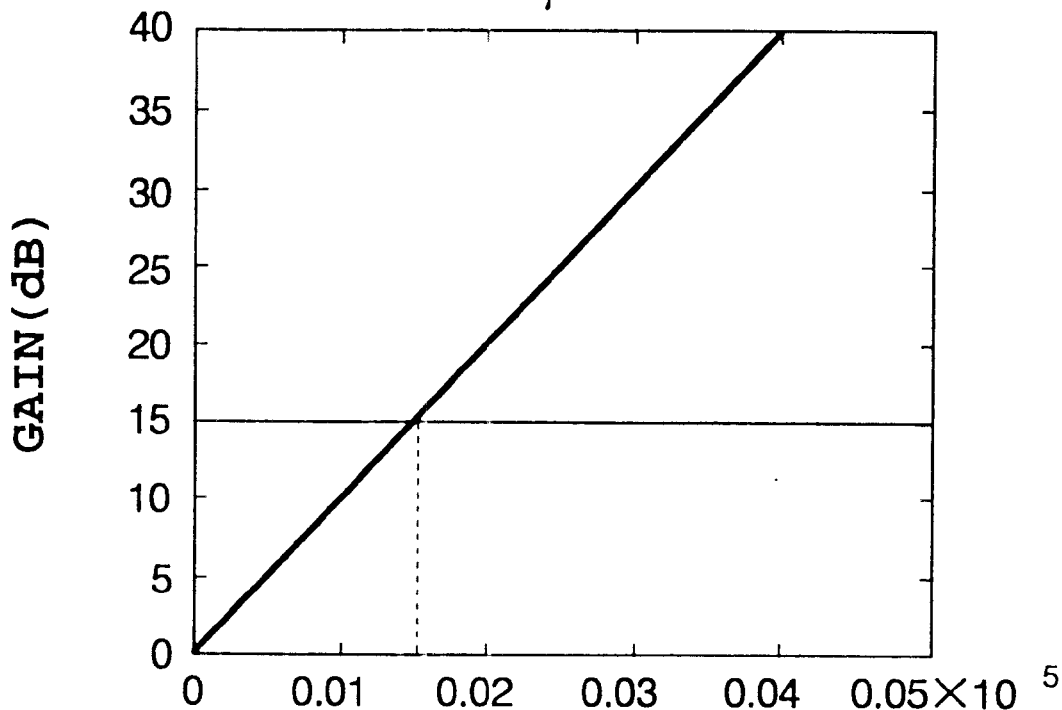
FIG. 19 is a graph illustrating the relationship between the signal gain and the fiber length x Er doping concentration of an Er-doped fluorophosphate glass fiber when it is excited in a 1.48 μm band.

FIGS. 18 and 19 show the relationship between the signal gain and [fiber length x Er doping concentration] when the gain in 1.58 μm band of the Er-doped fluorophosphate glass fiber is flat. FIG. 18 relates to the case where an excitation light of 0.98 μm band is used, and FIG. 19 relates to the case where an excitation light of 1.48 μm band is used.

A practical 1.58 μm band optical fiber amplifier is normally required to have a signal gain of more than 15 dB. To achieve the signal gain, it is sufficient that the value of [fiber length x Er doping concentration] determined from the intersecting point of the straight line shown in the individual Figure and the straight line of the signal gain of 15 dB is more than the required value. That is, in the 1.58 μm band optical fiber amplifier, [fiber length x Er doping concentration] required to obtain a signal gain of more than 15 dB is as follows:

Er-doped silica fiber, excited in 0.98 μm band: $0.3 \times 10^5$ or more,

Er-doped silica fiber, excited in 1.48 μm band: $0.6 \times 10^5$ or more,

Er-doped fluoride fiber, excited in 0.97 μm band: $0.1 \times 10^5$ or more,

Er-doped fluoride fiber, excited in 1.48 μm band: $0.2 \times 10^5$ or more.

Er-doped tellurite glass fiber, excited in 0.98 μm band: $0.005 \times 10^5$ or more, Er-doped tellurite glass fiber, excited in 1.48 μm band: $0.01 \times 10^5$ or more, Er-doped multi-component oxide glass fiber, excited in 0.98 μm band: $0.008 \times 10^5$ or more, Er-doped multi-component oxide glass fiber, excited in 1.48 μm band: $0.015 \times 10^5$ or more, Er-doped chalcogenide glass fiber, excited in 0.98 μm band: $0.01 \times 10^5$ or more, Er-doped chalcogenide glass fiber, excited in 1.48 μm band: $0.02 \times 10^5$ or more, Er-doped fluorophosphate glass fiber, excited in 0.98 μm band: $0.008 \times 10^5$ or more, and Er-doped tellurite glass fiber, excited in 1.48 μm band: $0.015 \times 10^5$ or more.

As far as is known, this limitation is recognized and defined for the first time by this invention.

The relationship between the signal gain and [fiber length x Er doping concentration) may vary depending on fiber parameters (refractive index difference, cut-off wavelength), Al-doping concentration (only for Er-doped silica fiber), codopant for core/clad structure formation (only for Er-doped silica fiber), excitation method (forward excitation, backward excitation, bidirectional excitation), and the like.

Therefore, depending on the excitation method, fiber parameters, and the like, it is necessary to set the minimum value of [fiber length x Er doping concentration] for achieving a signal gain of more than 15 dB to more than the above value.

Further, in the case where the basic optical fiber amplifier system as shown in FIG. 5, it is often the case that use of an optical source which generates a 0.98 or 0.97 μm band excitation light as the excitation light source 2A and an optical source which generates a 1.48 μm band excitation light as the excitation light source 2B, or use of an optical source which generates a 1.48 μm band excitation light as the excitation light source 2A and an optical source which generates a 0.98 or 0.97 μm band excitation light as the excitation light source 2B results in that the 0.98 or 0.97 μm band excitation light serves as a main excitation light source and a 1.48 μm band excitation light serves as a sub excitation light source. Accordingly, the [fiber length x Er doping concentration] required for obtaining a gain of 15 dB or more in 1.58 μm band fiber amplifier with Er-doped silica fibers, E-doped fluoride fibers, Er-doped tellurite glass fibers, Er-doped multi-component oxide glass fibers, Er-doped chalcogenide glass fibers, and Er-doped fluorophosphate glass fibers can be similar to the conditions under which 0.98 or 0.97 μm band excitation occurs in each of the optical fibers.

Figure 20:
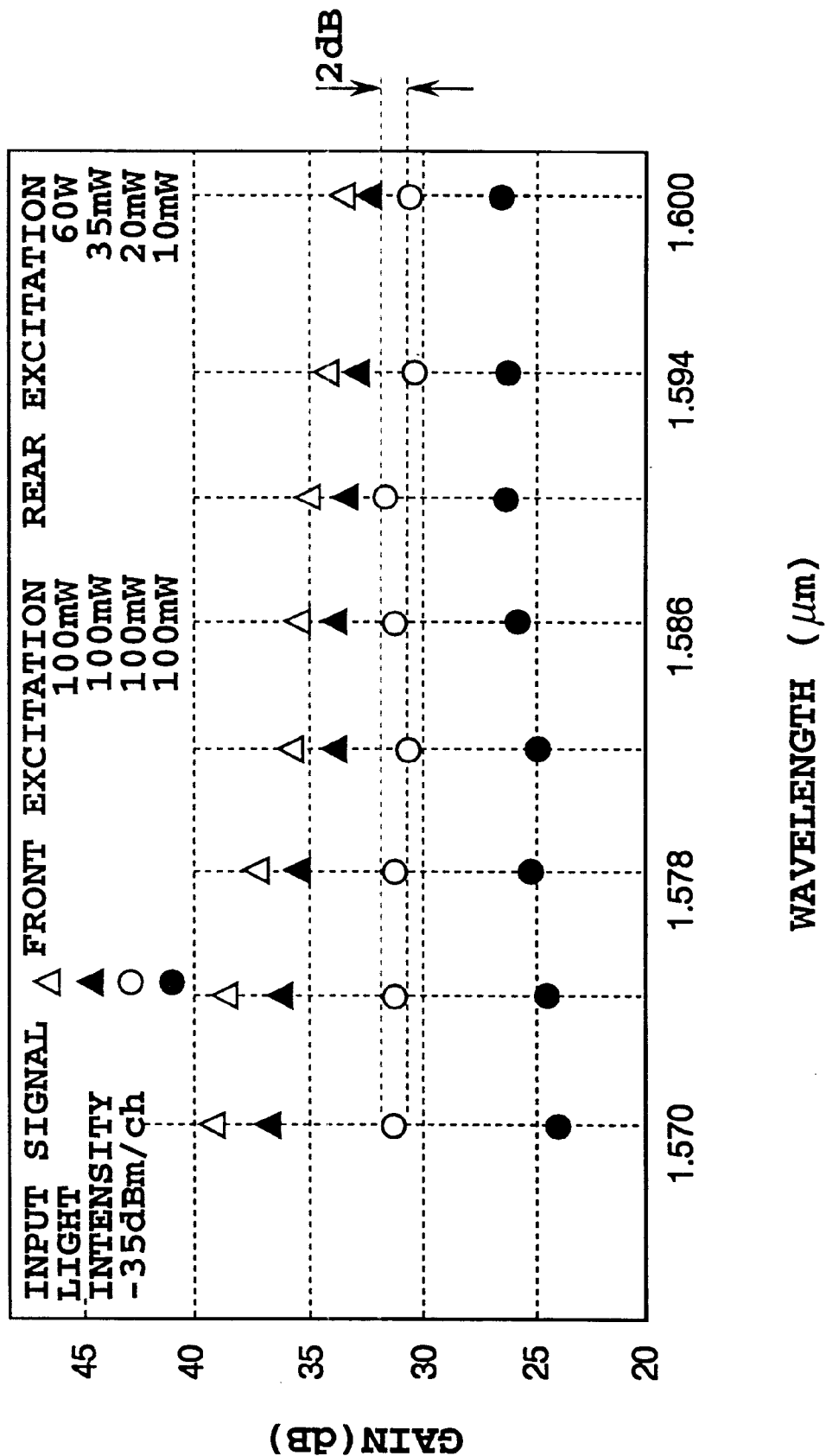
FIG. 20 is a graph illustrating the signal gain vs. individual signal wavelength of 8-channel WDM signals in a 1.58 μm band optical fiber amplifier with an Er-doped silica fiber.

FIG. 20 shows signal gain vs. individual signal wavelength of 8-channel WDM signals in 1.58 μm band optical fiber amplifier using the Er-doped silica fiber. The individual signal wavelengths are 1.570, 1.574, 1.578, 1.582, 1.586, 1.590, 1.594, and 1.600 μm. The fiber length is 200 m, the refractive index difference is 1.8%, the cut-off wavelength is 1.13 μm, the Al doping concentration is 40000 wt. ppm, the Er doping concentration is 1000 wt. ppm, the excitation wavelength is 1.48 μm band, and the excitation system is the bidirectional excitation system as shown in FIG. 5. The value of (Fiber length (m)×Er doping concentration (wt. ppm)] is $2\times10^5$).

Figure 21:
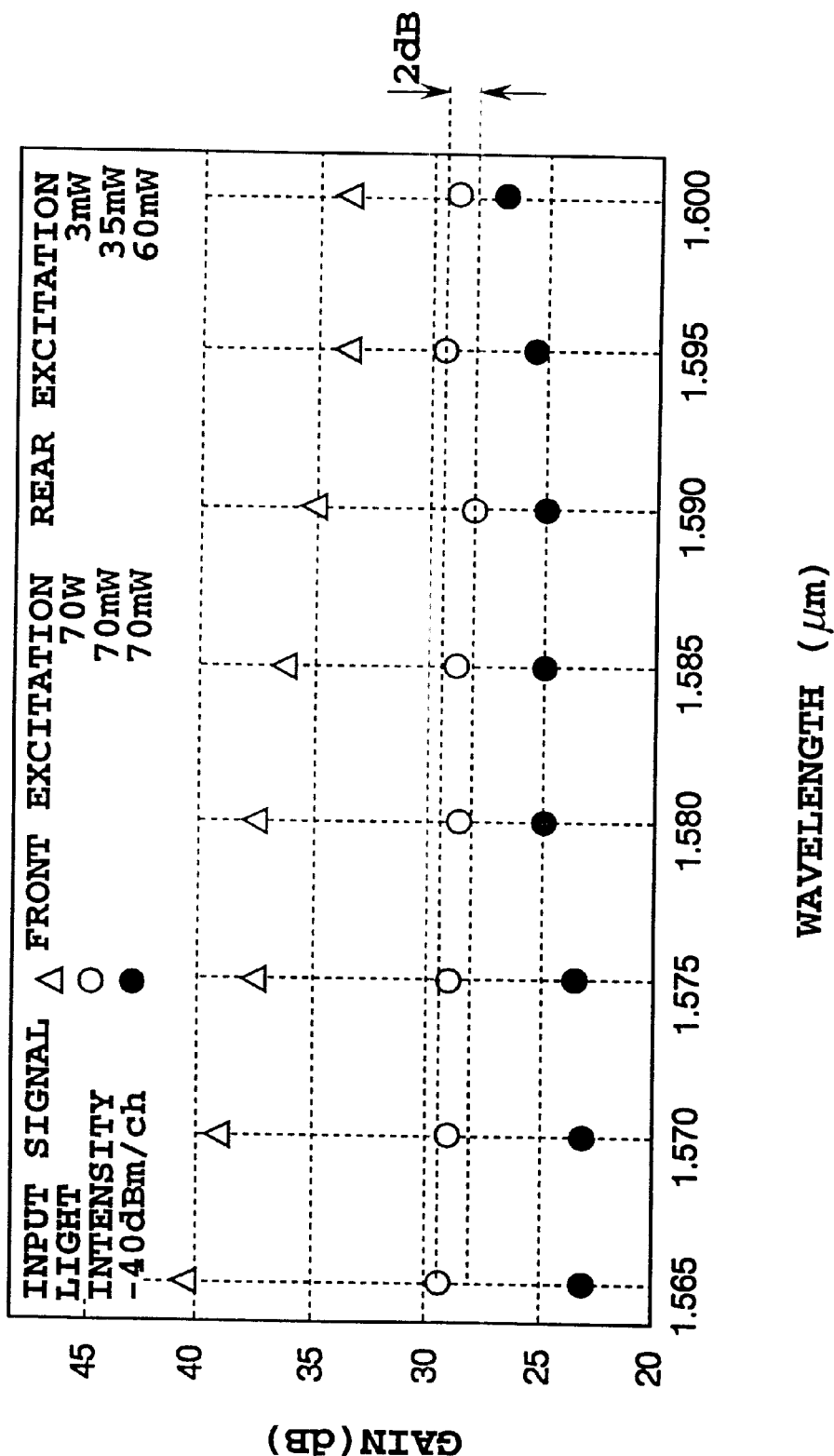
FIG. 21 is a graph illustrating the signal gain vs. individual signal wavelength of 8-channel WDM signals in a 1.58 μm band optical fiber amplifier with an Er-doped fluoride fiber.

FIG. 21 shows signal gain vs. individual signal wavelength of 8-channel WDM signals in 1.58 μm band optical fiber amplifier using the Er-doped fluoride fiber. The individual signal wavelengths are 1.565, 1.570, 1.575, 1.580, 1.585, 1.590, 1.595, and 1.600 m. The fiber length is 40 m, the refractive index difference is 2.5%, the cut-off wavelength is 1.0 μm the Er doping concentration is 1000 wt. ppm, and the excitation system is the bidirectional excitation system shown in FIG. 5. The value of [Fiber length (m)×Er doping concentration (wt. ppm)] is $0.4\times10^5$.

As shown in FIGS. 20 and 21, it can be seen that the gain deviation of WDM signals (difference in the maximum signal gain from the minimum signal gain in individual signal gain of WDM signals) can be reduced by adjusting the excitation light power. From some amplification experiments of WDM signals, it has been found that there is the relationship of $$Y \approx X+1$$

between a difference X (dB) of the signal gain of the maximum wavelength and signal gain of the minimum wavelength in WDM signal and a gain deviation Y (dB). This relationship is also true for Er-doped tellurite glass fibers, Er-doped multi-component glass fibers, Er-doped chalcogenide fibers, and Er-doped fluorophosphate glass fibers.

From this formula, it can be seen that in order to cause the gain deviation Y for WDM signal to be within 2 dB in the optical fiber amplifier using the Er-doped silica fiber or the Er-doped fluoride fiber, Er-doped tellurite glass fibers, Er-doped multi-component oxide glass fibers, Er-doped chalcogenide glass fibers or Er-doped fluorophosphate glass fibers, the excitation light power may be adjusted so that the difference X between the signal gain of the maximum wavelength and the signal gain of the minimum wavelength in WDM signals is within 1 dB. That is, when the 1.58 μm band optical fiber amplifier is used with a difference between signal gain of the maximum wavelength and signal gain of the minimum wavelength in WDM signals of less than 1 dB, a practical 1.58 μm band optical fiber amplifier with a gain deviation of less than 2 dB can be achieved. This method can be applied to WDM signals of 1.57 to 1.60 μm wavelength region in optical fiber amplifier with the Er-doped silica fiber, and to WDM signals of 1.565 to 1.600 μm wavelength region in optical fiber amplifiers with the Er-doped fluoride fiber. Also, the method can be applied to WDM signals of 1.57 to 1.60 μm wavelength region in optical fiber amplifiers with the Er-doped tellurite glass fiber, to WDM signals of 1.565 to 1.60 μm wavelength region in optical fiber amplifiers with the Er-doped multi-component oxide glass fiber, to WDM signals of 1.57 to 1.60 μm wavelength region in optical fiber amplifiers with the Er-doped chalcogenide fiber, and to WDM signals of 1.57 to 1.60 μm wavelength region in optical fiber amplifiers with the Er-doped fluorophosphate glass fiber.

Further, according to this invention, when it is arranged that the signal light is divided into spectra of a plurality of wavelength regions, signal lights of the individual divided wavelength regions are individually amplified in a plurality of optical amplification units, and individual signal lights outputted from the individual optical amplification units are multiplexed before they are outputted, the plurality of optical amplification units individually have predetermined amplification wavelength regions, and the amplification band region can be expanded as a whole.

For example, it is assumed that a first optical amplification unit of amplification wavelength regions λa to λb and a second optical amplification unit of amplification wavelength λc to λd are provided (λa<λb<λc<λd). The signal light of wavelength λa to λb is divided into signal light of wavelength λa to λb and signal light of wavelength λc to λd by a demultiplexer. The signal light of wavelength λa to λb is amplified by the first optical amplification unit, the signal light of wavelength λc to λd is amplified by the second optical amplification unit, passed through an optical variable attenuator for equalizing the signal light power after amplification, and individual light are multiplexed by a multiplexing portion. By this method, signal lights of wide wavelength regions can be collectively and uniformly amplified, thereby achieving an optical amplifier having flat and broadband amplification characteristics. That is, the combination of an optical fiber amplifier which operates with a gain that is flat in the 1.53–1.56 μm amplification wavelength region as a first optical amplifying portion and an optical fiber amplifier which operates with a gain that is flat in the 1.565–1.56 μm or 1.57–1.60 μm amplification wavelength region as a second amplifying region can achieve an optical fiber amplifier having a flattened gain characteristics in the 1.53–1.60 μm wavelength region. The same is true for the case where three or more optical amplifying portions are used. For example, an optical fiber amplifier having a flattened gain characteristics in the 1.43–1.60 μm wavelength region can be achieved by combining a $Tm^{3+}$-doped optical fiber amplifier with gain that is flat in the 1.43–1.49 μm amplification wavelength region as a first amplifying portion, a Raman fiber amplifier which operates with a gain that is flat in the 1.49–1.52 μm amplification wavelength as second amplifying portion, an optical fiber amplifier which operates with a gain that is flat in the 1.53–1.56 μm amplification wavelength region as a third amplifying portion, and the optical fiber amplifier which operates with a gain that is flat in the 1.565–1.60 μm amplification wavelength region as a fourth amplifying portion.

Figure 22:
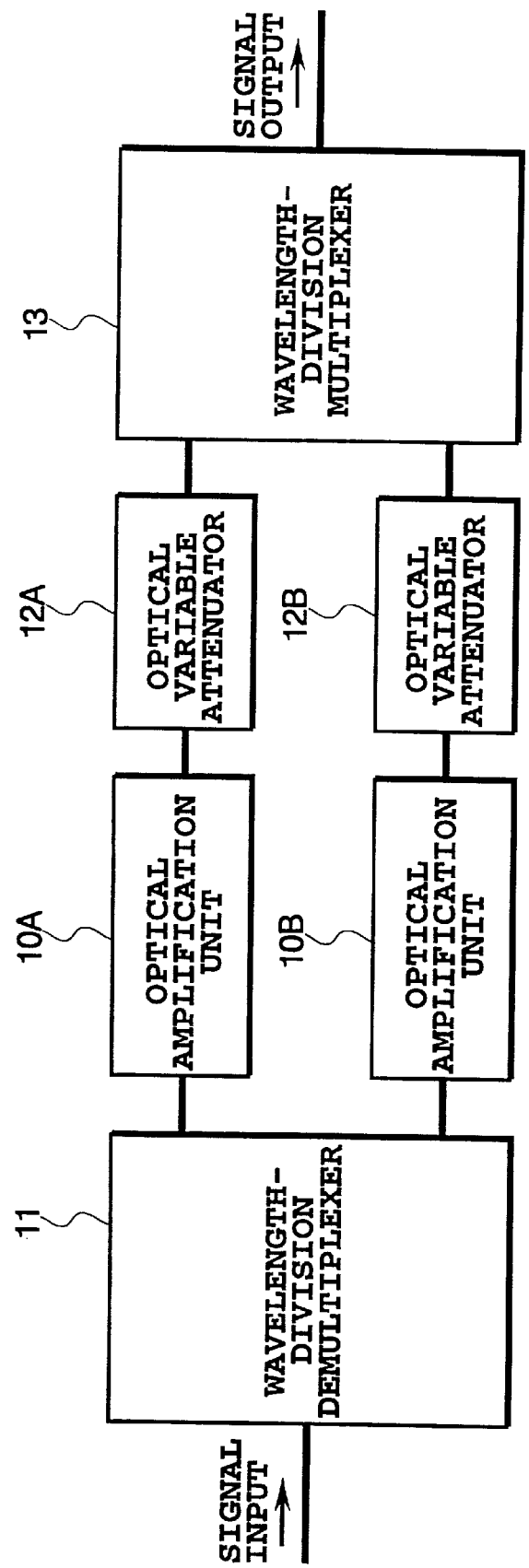
FIG. 22 is a block diagram showing an optical amplifier in an embodiment of this invention.

FIG. 22 shows an embodiment of the optical amplifier according to this invention. In FIG. 22, the optical amplifier of the present embodiment comprises a demultiplexer 11 for dividing the signal light into two wavelength regions, two optical amplification units 10A and 10B for individually amplifying signal light of individual wavelength regions outputted from the demultiplexer 11, optical variable attenuators (e.g., bulk type attenuation variable optical attenuators) 12A and 12B for adjusting the signal light power outputted from the individual optical amplification units, and a multiplexer 13 for combining the signal lights outputted from the individual optical variable attenuators.

Figure 23:
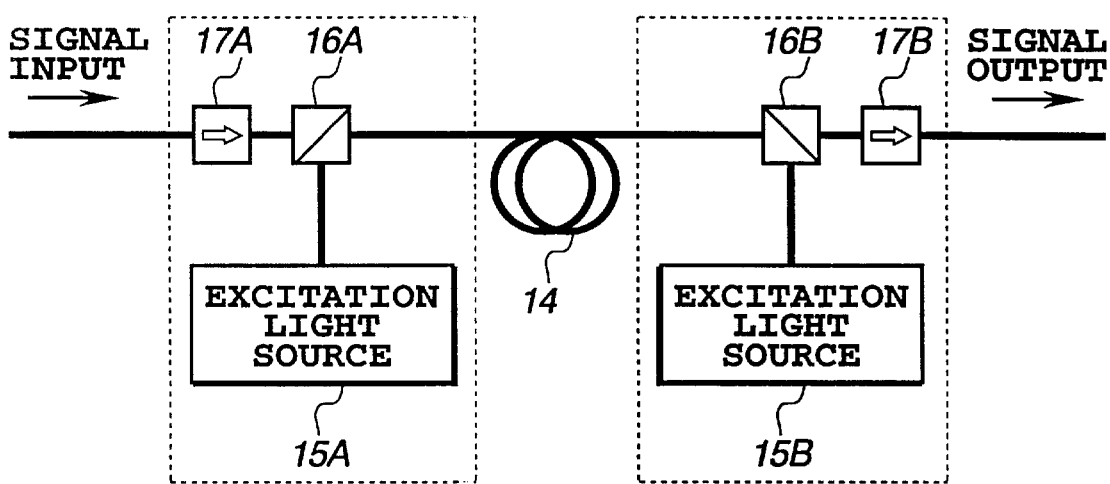
FIG. 23 is a block diagram showing structural examples of optical amplification units 10A and 10B of FIG. 22.

FIG. 23 shows an example of the structure of the optical amplification units 10A and 10B. In FIG. 23, the Er-doped optical fiber 14 is used as an amplification medium. Excitation light sources 15A and 15B generate excitation light for exciting the Er-doped optical fiber. The multiplexers 16A and 16B combine signal light and excitation light and input the resulting light into the Er-doped optical fiber 14. Optical isolators 17A and 17B are provided to suppress oscillation of the optical amplification units. Although a structural example of bidirectional excitation is shown here, a structure of forward excitation or backward excitation in which the excitation light is inputted only from one of the Er-doped optical fiber 14.

Figure 24:
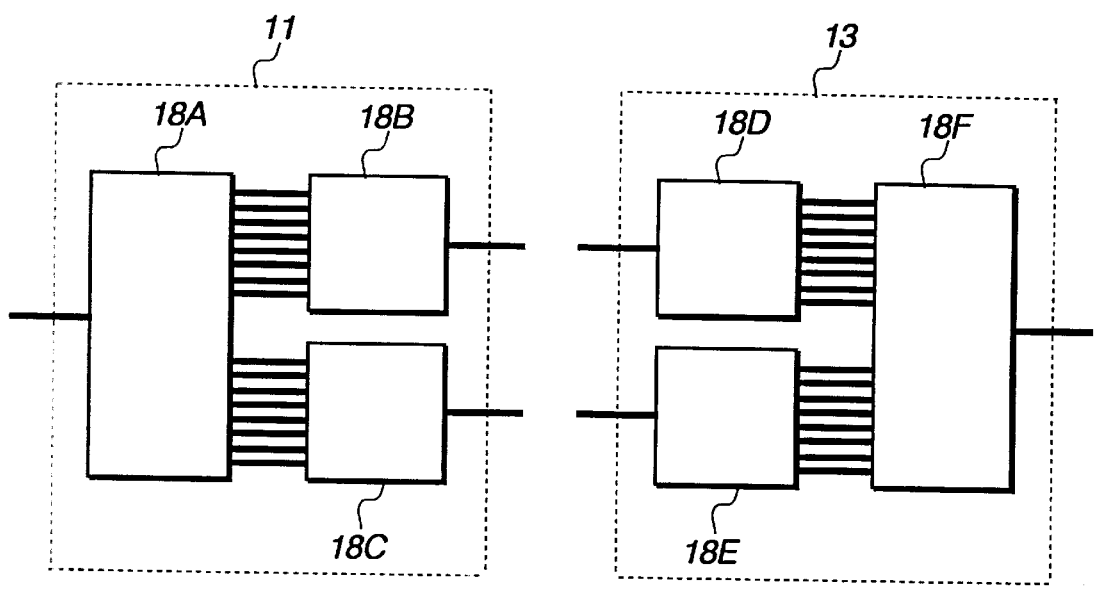
FIG. 24 is a block diagram showing a structural example of a wavelength-division demultiplexer 11 and a wavelength-division multiplexer 13 of the optical amplifier of FIG. 22.
Figure 25:
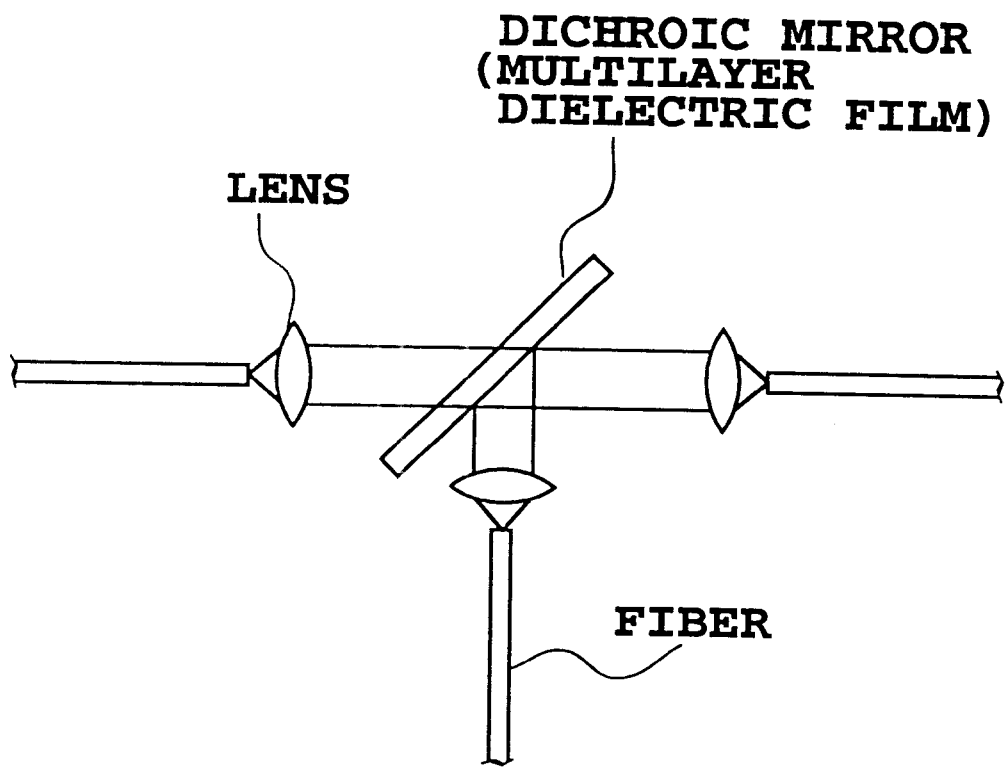
FIG. 25 is a block diagram showing the structure of a bulk multiplexer/demultiplexer which is used as a multiplexing portion and a demultiplexing portion of the optical amplifier shown in FIG. 22.

FIG. 24 shows structural examples of the demultiplexer 11 and the multiplexer 13 and FIG. 25 is a block diagram showing the arrangement of a bulk type multiplexer/demultiplexer used as demultiplexing and multiplexing portions in the optical fiber amplifier as shown in FIG. 22. In FIG. 23, the demultiplexer 11 and the multiplexer 13 individually comprise three arrayed waveguide gratings 18A, 18B, 18C; 18D, 18E, 18F for dividing the signal light into two wavelength regions and for combining the signal lights in two wavelength regions. Here, the signal light is assumed as to be 16-wave multiplexed. The signal light is once divided into 16 waves, combined by the arrayed waveguide gratings 18B and 18C into groups of 8 -channels each, and guided to the optical amplification units 10A and 10B. Further, the individual signal lights outputted from the optical amplification units 10A and 10B are individually once divided into 8-channels, signal lights of a total of 16 waves are synthesized by the arrayed waveguide grating 18F and outputted. As the demultiplexer 11 and the multiplexer 13, there can be used the bulk type multiplexer/demultiplexer with a multilayer dielectric film as shown in FIG. 25, fiber couplers, and the like. As shown in FIG. 25, the multiplexer/demultiplexer includes a dichroic mirror composed of a dielectric film.

Figure 26:
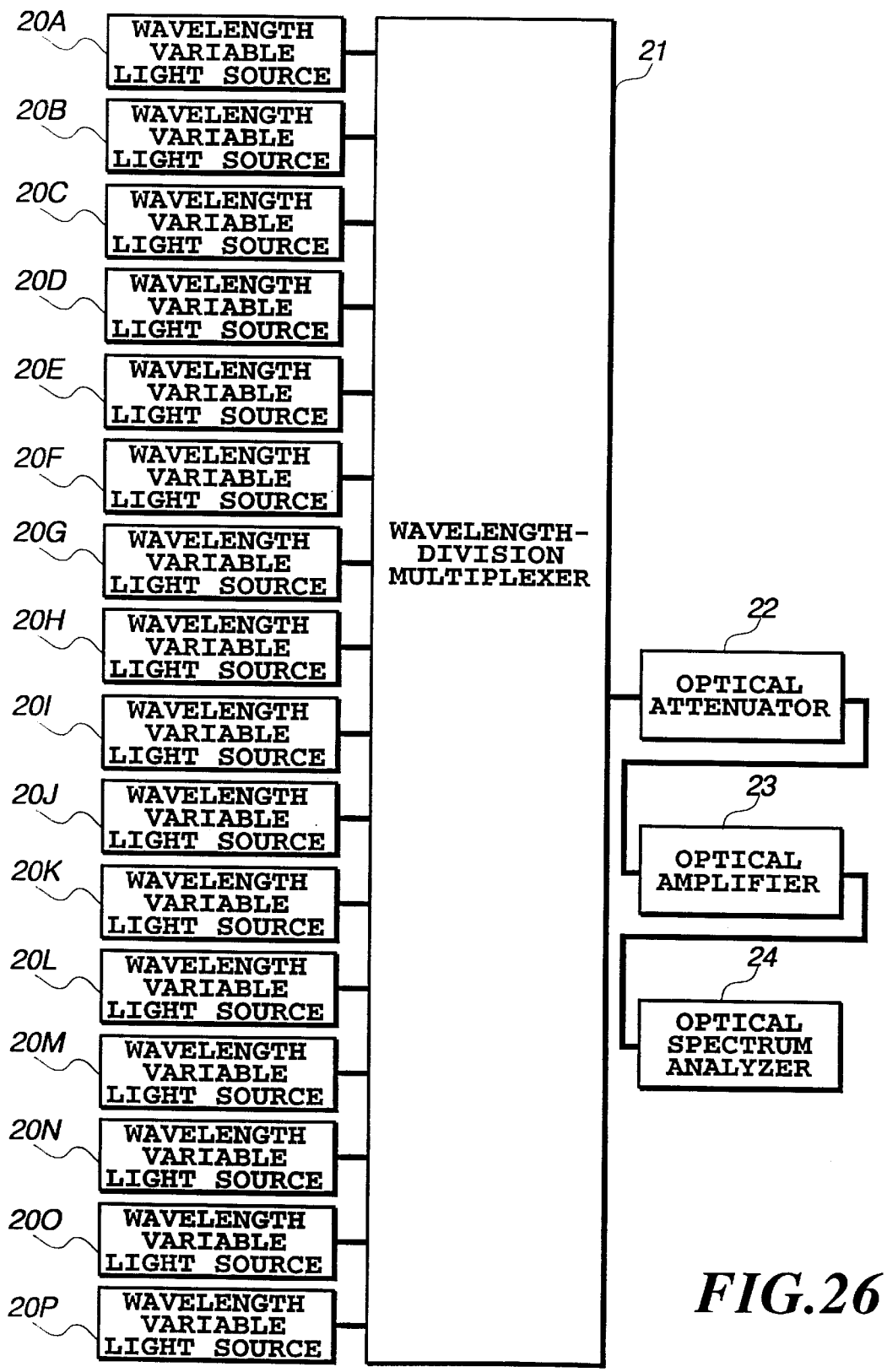
FIG. 26 is a block diagram showing the structure of a bulk-type evaluation system for measuring the amplification characteristics of the optical amplifier of this invention.

FIG. 26 shows the structure of an evaluation system for measuring amplification characteristics of the optical amplifier of this invention. In FIG. 26, signal lights outputted from the wavelength variable light sources 20A to 20P are wave combined by the multiplexer 21, and inputted to the optical amplifier 23 of this invention through an optical attenuator 22 for adjusting the signal light power. The signal light amplified by the optical amplifier 23 is observed by an optical spectrum analyzer 24. Signal wavelengths of the wavelength variable light sources 20A to 20P are individually 1532, 1536, 1540, 1544, 1548, 1552, 1556, 1560, 1572, 1576, 1580, 1584, 1588, 1592, 1596, and 1600 nm. FIG. 26 shows a system for evaluating 16-channel WDM signal amplification characteristics. However, addition of a wavelength tunable optical source permits an increase in the number of wavelength to a desired value.

Figure 27:
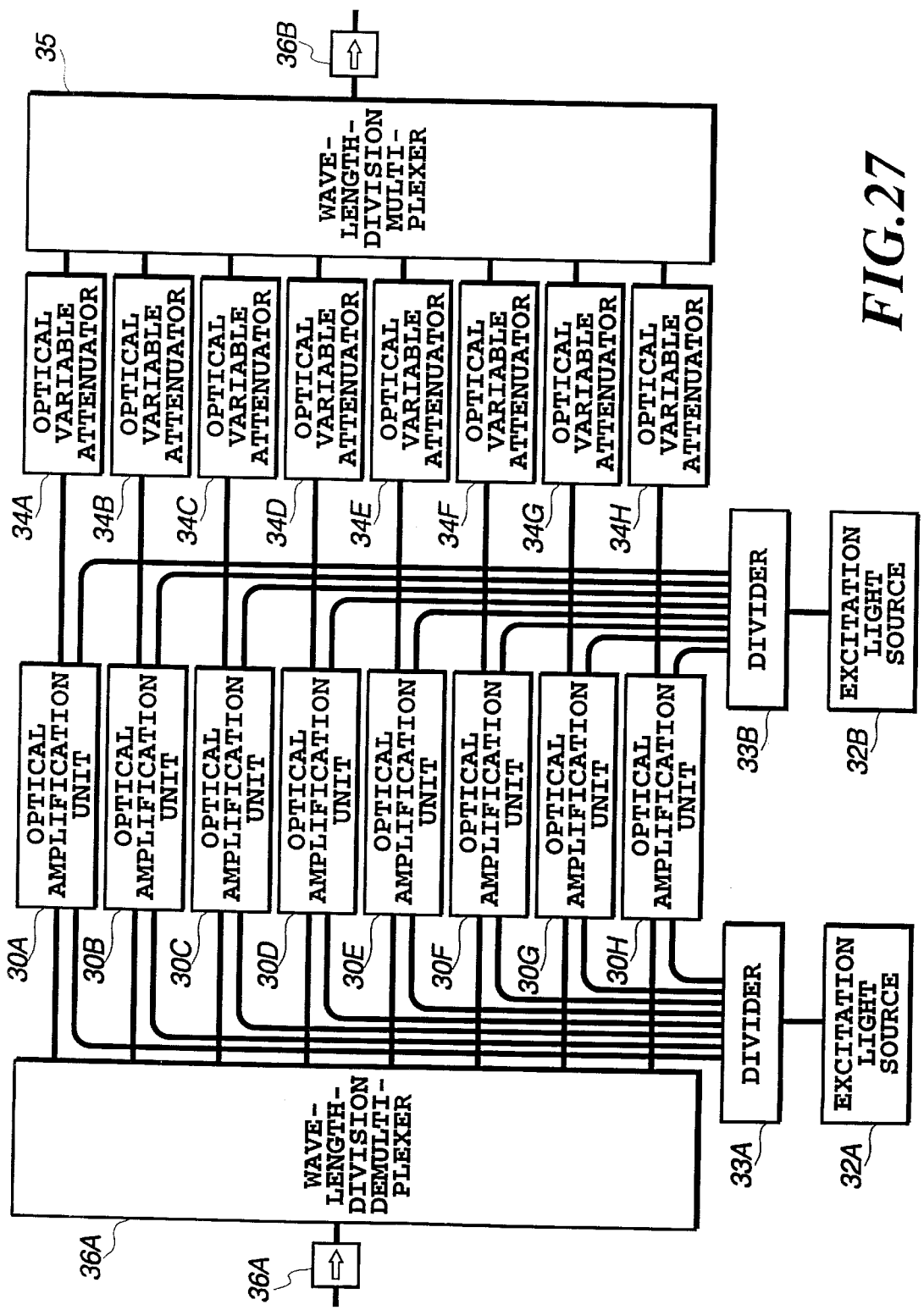
FIG. 27 is a graph illustrating amplification characteristics of the optical amplifier according to an embodiment of this invention.

FIG. 27 shows another embodiment of the optical amplifier of this invention. In FIG. 27, the optical amplifier of the present embodiment comprises a demultiplexer 31 for dividing the signal light into 8-channellength regions, 8 optical amplification units 30A to 30H for individually amplifying signal light of individual wavelength regions outputted from the demultiplexer 31, excitation light sources 32A and 32B for generating excitation light, demultiplexers 33A and 33B for dividing the excitation light outputted from the individual excitation light sources and inputting them into the individual optical amplification units, optical variable attenuators 34A to 34H for adjusting the signal light power outputted from the individual optical amplification units, a multiplexer 35 for multiplexing the signal lights outputted from the individual optical variable attenuators, and optical isolators 36A and 36B disposed at the input end and the output end.

EMBODIMENTS

As embodiments of this invention, practical examples having an average gain and a gain deviation of WDM signals of practical levels will be described below. However, these are given by way of illustration only, and thus are not intended to be limitative of the scope of this invention.

Embodiments 1 to 21

There were used 4 to 8-channel WDM signals in the range from 1.565 to 1.600 $\mu$m. Semiconductor laser modules of wavelengths of 0.98 $\mu$m, 0.97 $\mu$m, and 1.48 $\mu$m were used for excitation light sources, and the individual excitation systems shown in FIGS. 3 to 5 are used. As the multiplexer for combining WDM signals and excitation light, there were used a fiber type coupler in the case of the excitation light wavelengths of 0.98 $\mu$m and 0.97 $\mu$m and a bulk type coupler formed of a dielectric multilayer film in the. case of excitation light wavelength of 1.48 $\mu$m. The optical isolator showed a reverse direction insertion loss of 60 dB. As the Er-doped optical fiber were used the following fibers:

Fiber 1: Er-doped silica fiber
  Specific refractive index difference: 1.8%, Cut-off wavelength: 1.13 $\mu$m,
  Al doping concentration: 40000 wt. ppm, and
  Er doping concentration: 1000 wt. ppm
Fiber 2: Er-doped silica fiber
  Specific refractive index difference: 0.7%, Cut-off wavelength: 0.8 $\mu$m,
  Al doping concentration: 10000 wt. ppm,
  Er doping concentration: 2000 wt. ppm
Fiber 3: Er-doped fluoride fiber
  Glass composition: Zr based fluoride glass ($ZrF_4$—$HfF_4$—$BaF_2$—$PbF_2$—$LaF_3$—$YF_3$—LiF—NaF)
  Specific refractive index difference: 2.5%, Cut-off wavelength: 1.0 $\mu$m,
  Er doping concentration: 1000 wt. ppm
Fiber 4: Er-doped fluoride fiber
  Glass composition: In based fluoride glass ($InF_3$—$GaF_3$—$ZnF_2$—$BaF_2$—$SrF_2$—$PbF_2$—$LaF_3$—$YF_3$—LiF—NaF)
  Specific refractive index difference: 2.5%, Cut-off wavelength: 1.1 $\mu$m,
  Er doping concentration: 500 wt. ppm
Fiber 5: Er-doped fluoride fiber
  Glass composition: $GaF_3$/$InF_3$ based fluoride glass ($GaF_3$—$InF_3$—$ZnF_2$—$PbF_2$—$LaF_3$—$YF_3$)
  Specific refractive index difference: 3.7%, Cut-off wavelength: 1.$\mu$m,
  Er. doping concentration: 500 wt. ppm
Fiber 6: Er-doped aluminosilicate glass fiber
  Specific refractive index difference: 0.7%
  Cut-off wavelength: 1.1 $\mu$m,
  Er-doping concentration: 10000 wt. ppm,
Fiber 7: Er-doped phosphate glass fiber
  Specific refractive index difference: 0.7%
  Cut-off wavelength: 1.27 $\mu$m,
  Er-doping concentration: 10000 wt. ppm,
Fiber 8: Er-doped fluorophosphate glass fiber
  Specific refractive index difference: 0.29%
  Cut-off wavelength: 1.0 $\mu$m,
  Er-doping concentration: 3300 wt. ppm, Fiber 9: Er-doped tellurite glass fiber
Specific refractive index difference: 2.5%
Cut-off wavelength: 1.3 μm,
Er-doping concentration: 1000 wt. ppm, Fiber 10: Er-doped chalcogenide glass fiber
Specific refractive index difference: 3.7%
Cut-off wavelength: 1.1 μm,
Er-doping concentration: 2000 wt. ppm,

TABLE 1

| Embodiment | WDM signal wavelength (μm) | Input signal intensity (dBm/ch) | Fiber type | Fiber length (m) | Fiber length (m) × Er doping conc. (wt. ppm) | Excitation system | Average gain (dB) | Gain deviation (dB) |
|---|---|---|---|---|---|---|---|---|
| Embodiment 1 | 1.570, 1.574, 1.578, 1.582, 1.586, 1.580, 1.584, 1.600 | −35 | Fiber 1 | 200 | $2 \times 10^5$ | 1.48 μm band bidirectional excitation | 31 | 1.8 |
| Embodiment 2 | 1.573, 1.582, 1.591, 1.600 | −30 | Fiber 1 | 100 | $1 \times 10^5$ | 1.48 μm band forward excitation | 17 | 1.8 |
| Embodiment 3 | 1.570, 1.574, 1.578, 1.582, 1.588, 1.590, 1.594, 1.600 | −35 | Fiber 2 | 100 | $2 \times 10^5$ | 1.48 μm band bidirectional excitation | 28 | 1.6 |
| Embodiment 4 | 1.570, 1.578, 1.580, 1.584, 1.588, 1.582, 1.600 | −20 | Fiber 1 | 100 | $1 \times 10^5$ | 0.98 μm band bidirectional excitation | 33 | 1.5 |

TABLE 2

| Embodiment | WDM signal wavelength (μm) | Input signal intensity (dBm/ch) | Fiber type | Fiber length (m) | Fiber length (m) × Er doping conc. (wt. ppm) | Excitation system | Average gain (dB) | Gain deviation (dB) |
|---|---|---|---|---|---|---|---|---|
| Embodiment 5 | 1.565, 1.570, 1.575, 1.580, 1.585, 1.590, 1.595, 1.600 | −40 | Fiber 3 | 40 | $0.4 \times 10^5$ | 1.48 μm band bidirectional excitation | 28 | 1.8 |
| Embodiment 6 | 1.565, 1.570, 1.575, 1.580, 1.585, 1.590, 1.595, 1.600 | −35 | Fiber 4 | 40 | $0.2 \times 10^5$ | 1.48 μm band bidirectional excitation | 17 | 1.9 |
| Embodiment 7 | 1.565, 1.570, 1.575, 1.580, 1.585, 1.590, 1.595, 1.600 | −35 | Fiber 5 | 80 | $0.4 \times 10^5$ | 1.48 μm band bidirectional | 22 | 1.6 |
| Embodiment 8 | 1.565, 1.570, 1.575, 1.580, 1.585, 1.590, 1.595, 1.600 | −35 | Fiber 3 | 40 | $0.2 \times 10^5$ | 0.97 μm band forward excitation | 27 | 1.8 |

TABLE 3

| Embodiment | WDM signal wavelength (μm) | Input signal intensity (dBm/ch) | Fiber type | Fiber length (m) | Fiber length (m) × Er doping conc. (wt. ppm) | Excitation system | Average gain (dB) | Gain deviation (dB) |
|---|---|---|---|---|---|---|---|---|
| Embodiment 9 | 1.570, 1.574, 1.578, 1.582, 1.586, 1.590, 1.594, 1.600 | −35 | Fiber 1 | 200 | $2 \times 10^5$ | 0.98 μm 1.48 μm bidirectional excitation | 28 | 1.8 |
| Embodiment 10 | 1.565, 1.570, 1.575, 1.580, 1.585, 1.590, 1.595, 1.600 | −30 | Fiber 3 | 40 | $0.4 \times 10^5$ | 0.98 μm 1.48 μm bidirectional excitation | 16 | 1.8 |
| Embodiment 11 | 1.565, 1.570, 1.575, 1.580, 1.585, 1.590, 1.595, 1.600 | −35 | Fiber 4 | 40 | $0.2 \times 10^5$ | 0.98 μm 1.48 μm bidirectional excitation | 21 | 1.6 |

TABLE 4

| Embodiment | WDM signal wavelength ($\mu$m) | Input signal intensity (dBm/ch) | Fiber type | Fiber length (m) | Fiber length (m) × Er doping conc. (wt. ppm) | Excitation system | Average gain (dB) | Gain deviation (dB) |
|---|---|---|---|---|---|---|---|---|
| Embodiment 12 | 1.570, 1.574, 1.578, 1.582, 1.586, 1.590, 1.594, 1.600 | −35 | Fiber 6 | 4 | $0.4 \times 10^5$ | 1.48 $\mu$m band bidirectional excitation | 25 | 1.8 |
| Embodiment 13 | 1.570, 1.574, 1.578, 1.582, 1.586, 1.590, 1.594, 1.600 | −30 | Fiber 6 | 2 | $0.2 \times 10^5$ | 0.98 $\mu$m band forward excitation | 21 | 1.8 |
| Embodiment 14 | 1.570, 1.574, 1.578, 1.582, 1.586, 1.590, 1.594, 1.600 | −35 | Fiber 7 | 4 | $0.4 \times 10^5$ | 1.48 $\mu$m band bidirectional excitation | 18 | 1.6 |
| Embodiment 15 | 1.570, 1.576, 1.580, 1.584, 1.588, 1.592, 1.600, | −20 | Fiber 8 | 10 | $0.33 \times 10^5$ | 1.48 $\mu$m band bidirectional excitation | 22 | 1.5 |
| Embodiment 16 | 1.565, 1.570, 1.575, 1.580, 1.585, 1.590, 1.595, 1.600 | −40 | Fiber 9 | 4 | $0.04 \times 10^5$ | 0.98 $\mu$m band bidirectional excitation | 18 | 1.8 |
| Embodiment 17 | 1.565, 1.570, 1.575, 1.580, 1.585, 1.590, 1.595, 1.600 | −35 | Fiber 9 | 5 | $0.05 \times 10^5$ | 1.48 $\mu$m band bidirectional excitation | 26 | 1.9 |
| Embodiment 18 | 1.565, 1.570, 1.575, 1.580, 1.585, 1.590, 1.595, 1.600 | −35 | Fiber 9 | 3.5 | $0.035 \times 10^5$ | 0.98 $\mu$m band 1.48 $\mu$m band bidirectional excitation | 22 | 1.6 |
| Embodiment 19 | 1.570, 1.574, 1.578, 1.582, 1.586, 1.590, 1.594, 1.600 | −35 | Fiber 10 | 10 | $0.2 \times 10^5$ | 0.98 $\mu$m band 1.48 $\mu$m band bidirectional excitation | 22 | 1.8 |
| Embodiment 20 | 1.570, 1.574, 1.578, 1.582, 1.586, 1.590, 1.594, 1.600 | −40 | Fiber 10 | 10 | $0.2 \times 10^5$ | 1.48 $\mu$m band bidirectional excitation | 21 | 1.8 |
| Embodiment 21 | 1.570, 1.574, 1.578, 1.582, 1.586, 1.590, 1.594, 1.600 | −40 | Fiber 10 | 20 | $0.4 \times 10^5$ | 0.98 $\mu$m band forward excitation | 26 | 1.9 |

Tables 1 to 4 show that practically acceptable WDM signal amplifications with a signal gain of over 15 dB and a gain deviation of less than 2 dB can be achieved in the 1.57–1.60 $\mu$m wavelength region in the optical fiber amplifier with an Er-doped silica fiber, in the 1.565–1.60 $\mu$m wavelength region in the optical fiber amplifier with an Er-doped fluoride fiber, in the 1.57–1.60 $\mu$m wavelength region in the optical fiber amplifier with an Er-doped multi-component oxide glass fiber (an Er-doped aluminosilicate glass fiber or an Er-doped phosphate glass fiber), in the 1.57–1.60 $\mu$m wavelength region in the optical fiber amplifier with an Er-doped fluorophosphate glass fiber, in the 1.57–1.60 $\mu$m wavelength region in the optical fiber amplifier with an Er-doped chalcogenide glass fiber, and in the 1.565–1.60 $\mu$m wavelength region in the optical fiber amplifier with an Er-doped tellurite glass fiber. That is, with the 1.58 $\mu$m band optical fiber amplifier according to this invention, WDM signals of the wavelength region concerned can be flatly amplified.

Although the above embodiments use semiconductor lasers as the excitation light sources, similar effects can be obtained using a titanium sapphire laser, a solid state laser of F-center laser, a Yb-doped fiber laser, or a Tm-doped fiber laser as well. Further, as the glass composition of the Er-doped fluoride fiber may be used other Zr based fluoride glass, In based fluoride glass, and $GaF_3/InF_3$ based fluoride glass.

Embodiment 22

Description will be made of specific examples of the individual parts constituting the optical amplification unit 10A shown in FIG. 22. An Er-doped fluoride glass fiber is used as the Er-doped optical fiber 14 of FIG. 23. The glass is composed of a Zr based fluoride glass ($ZrF_4$—$BaF_2$—$LaF_3$—$YF_3$—$AlF_3$—LiF—NaF). The fiber has a fiber length of 5 m, a refractive index difference of 2.5%, a cut-off wavelength of 1.0 $\mu$m, and an Er doping concentration of 1000 wt. ppm. As the excitation light sources 15A and 15B of FIG. 23 are used 1480 nm band semiconductor lasers. As the multiplexers 16A and 16B of FIG. 23, bulk type WDM couplers are used. The optical isolators 17A and 17B of FIG. 23 used are polarization-independent type 1550 nm band optical isolators.

Then, description will be made of specific examples of individual parts constituting the optical amplification unit 10B shown in FIG. 22. Er-doped silica fiber is used as the Er-doped optical fiber 14 of FIG. 23. The fiber has a fiber length of 200 m, a refractive index difference of 1%, a cut-off wavelength of 1.1 $\mu$m, an Al doping concentration of 4.2 wt. %, and an Er doping concentration of 1310 wt. ppm. As the excitation light sources 15A and 15B of FIG. 23 are used 1480 nm band semiconductor lasers. As the multiplexers 16A and 16B of FIG. 23, bulk type WDM couplers are used. The optical isolators 17A and 17B of FIG. 23 used are polarization-independent type 1580 nm band optical isolators.

Figure 28:
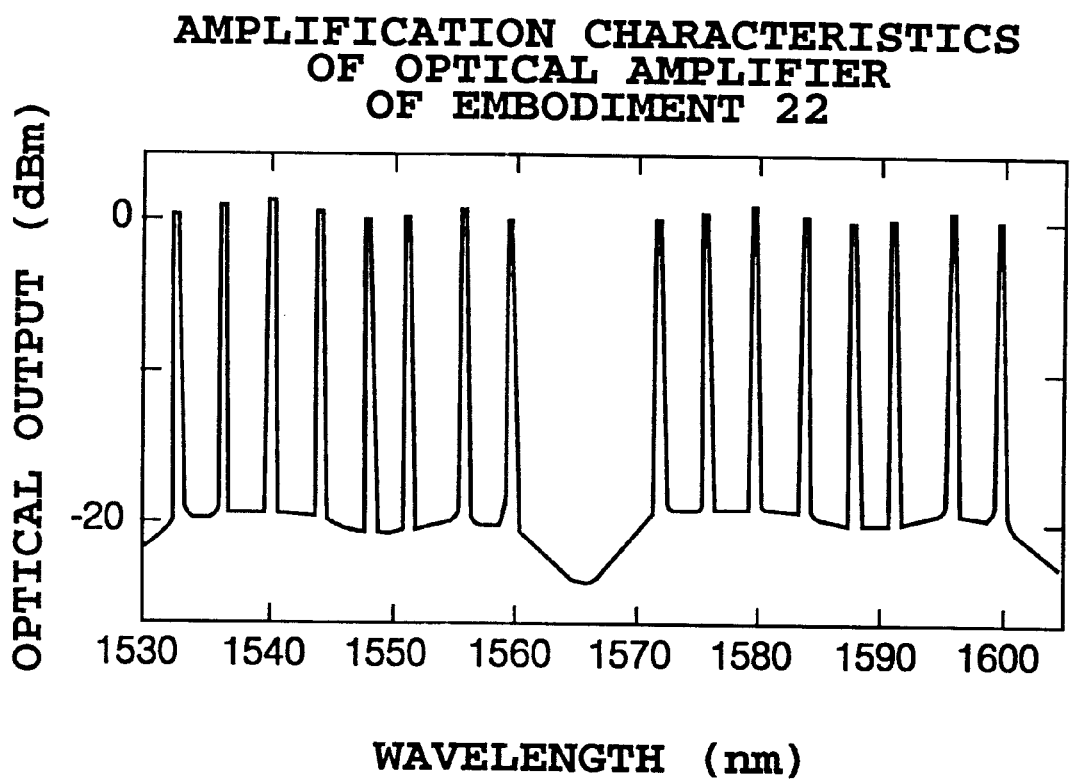
FIG. 28 is a graph illustrating amplification characteristics of the optical amplifier of Embodiment 22.

FIG. 28 illustrates the amplification characteristics of the optical amplifier of an Embodiment 22 measured using the evaluation system of FIG. 26. Here, the wavelength tunable light sources 20A to 20P used have a signal wavelength of 1532, 1536, 1540, 1544, 1548, 1552, 1556, 1560, 1572, 1576, 1580, 1584, 1588, 1592, 1596, or 1660 nm. The signal light input power is set to −25 dBm per channel. As shown here, WDM signals set in the 1532 to 1580 nm wavelength region and in the 1572 to 1600 nm wavelength region can be optically amplified with an average gain of 25 dB (signal light power after amplification is an average of −0 dBm/ch, while signal light power before amplification is −25 dBm/ch), and with a gain deviation of less than 1.5 dB.

As shown above, it has been found that using the optical fiber amplifier according to this invention, flat amplification characteristics can be obtained over a wide wavelength region, the amplification wavelength region can be expanded to two times that of the conventional optical fiber amplifier, e.g., from the 1530–1560 nm wavelength region (30 nm wide) of the conventional optical fiber amplifier to the 1530 to 1560 nm and 1570 to 1600 nm wavelength regions (totally 60 nm wide). That is, when the optical amplifier of this invention is applied to the WDM system, the transmission capacity can be increased to two times that of the conventional WDM system.

Embodiment 23

The basic structure of the optical amplifier according to the present embodiment is the same as Embodiment 22 shown in FIG. 22 and FIG. 23. However, in the present embodiment, an Er-doped multi-component oxide fiber is used as the Er-doped optical fiber 5 forming the optical amplification unit 10B of FIG. 22. The fiber has a fiber length of 3 m, a refractive index difference of 0.7%, a cut-off wavelength of 1.1 μm, and an Er doping concentration of 10000 wt. ppm. The demultiplexer 11 and the multiplexer 13 comprise bulk type multiplexer/demultiplexer having a dielectric multilayer film. The bulk type multiplexer/demultiplexer having the dielectric multilayer film can divide, for example, 16-wave WDM signals into 2 groups of 8-channels each at a time, and multiplex two groups of WDM signals of 8-channels each into 16 waves at a time. Other details of the structubackwarde the same as Embodiment 22.

Figure 29:
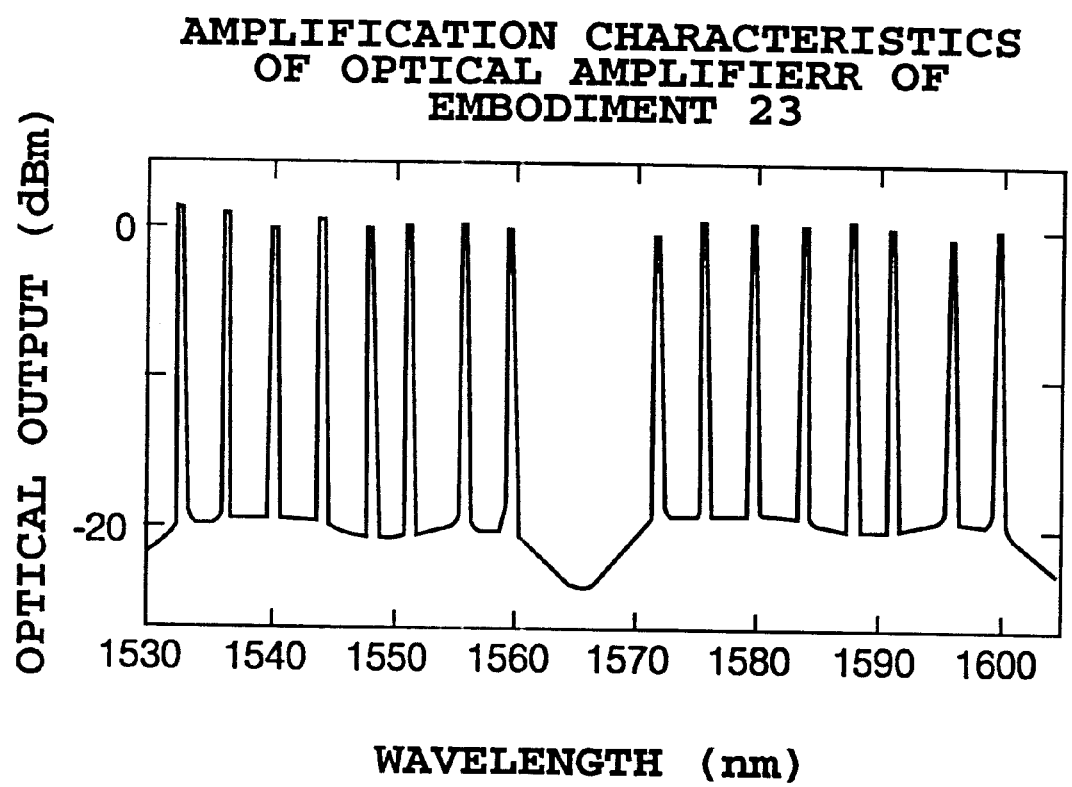
FIG. 29 is graph illustrating amplification characteristics of the optical amplifier of Embodiment 23.
Figure 30A:
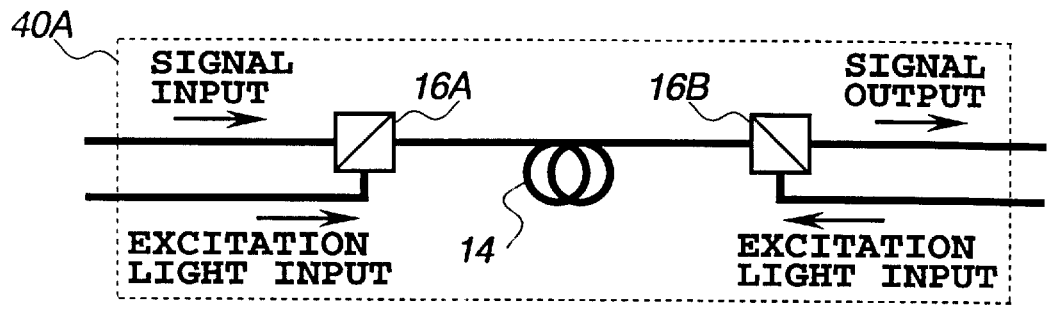
FIGS. 30A–30H are block diagrams each showing an example of the arrangement of optical amplification units 30A to 30H of the optical amplifier of FIG. 27.
Figure 30B:
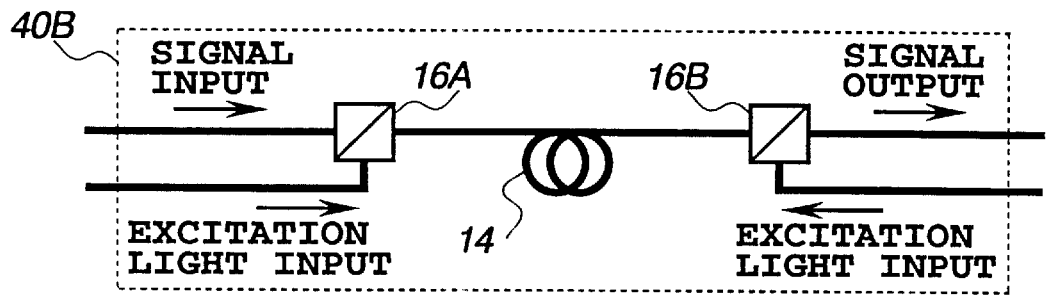
Figure 30C:
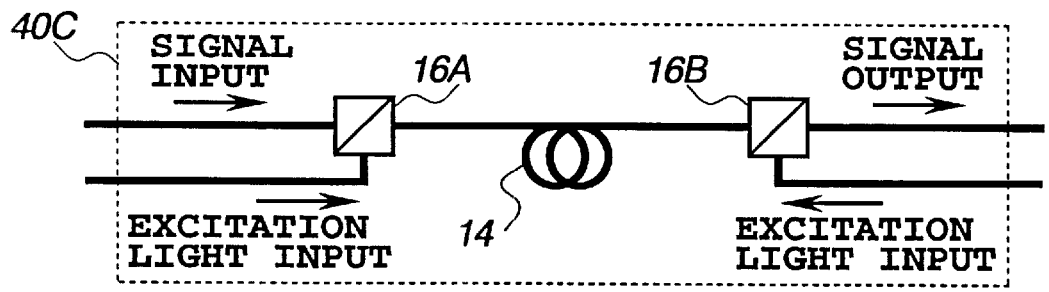
Figure 30D:
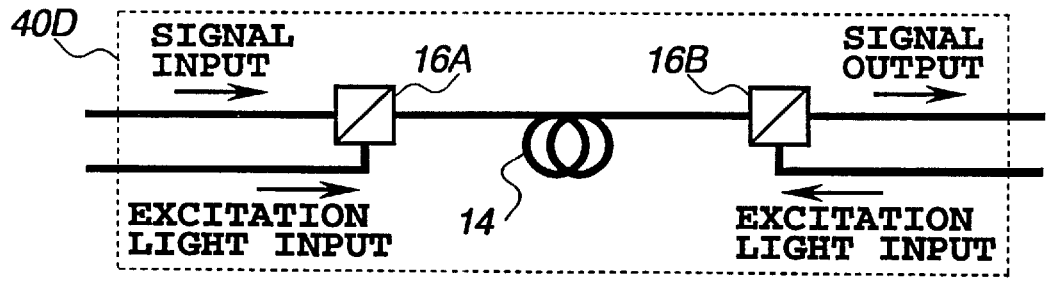
Figure 30E:
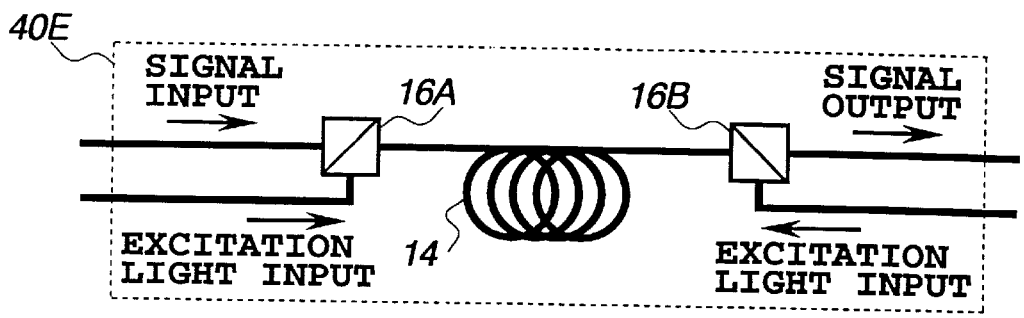
Figure 30F:
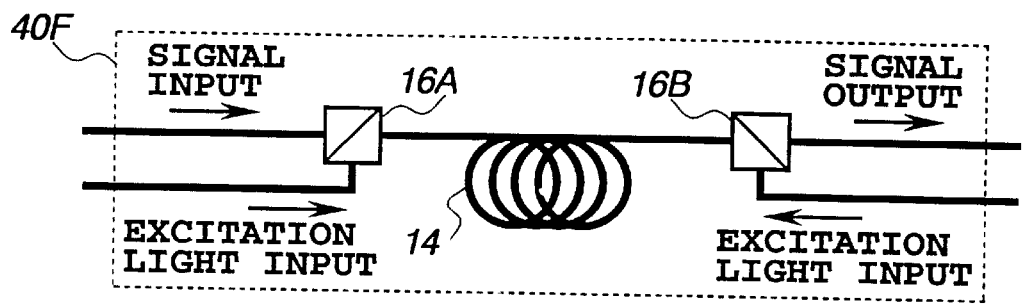
Figure 30G:
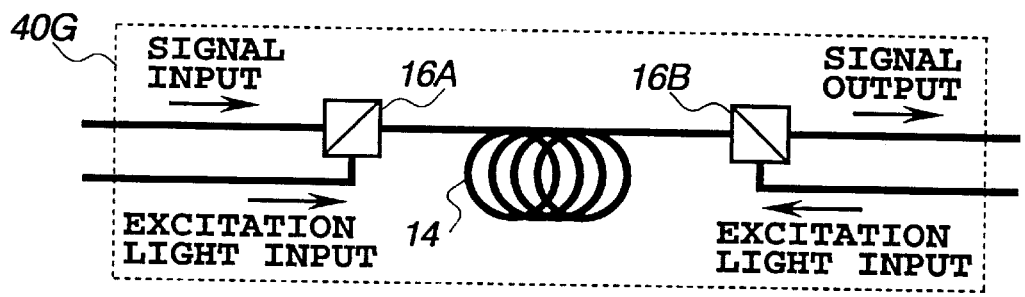
Figure 30H:
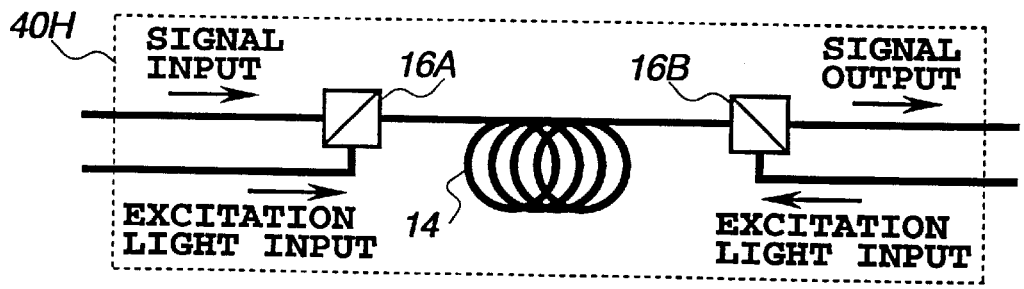

FIG. 29 illustrates the amplification characteristics of the optical amplifier of Embodiment 23 measured by the evaluation system of FIG. 26. The signal input power is −20 dBm per channel. As shown here, WDM signals set in the 1532–1560 nm and 1572–1600 nm wavelength regions can be optically amplified with an average gain of 20 dB (the signal light power after amplification is an average of −0 dBm/ch, while the signal light power before amplification is −20 dBm/ch), and with a gain deviation of no more than 1.5 dB.

As described above, it has been found that flat amplification characteristics can be obtained over a wide wavelength region by using the optical amplifier according to this invention, and the amplification wavelength region can be expanded to two times that of the conventional optical fiber amplifier from 1530 to 1560 nm (30 nm wide) of the conventional optical fiber amplifier to 1530 to 1560 nm and 1570 to 1600 nm (totally 60 nm wide).

Embodiment 24

The basic structure of the optical fiber amplifier according to the present embodiment is the same as Embodiment 22 or 23. Here, the Er-doped optical fiber 14 constituting the optical amplification units 10A and 10B shown in FIG. 23 had characteristics different from those used in Embodiment 22 or 23.

Table 5 shows 5 types (A, B, C, D, E) of Er-doped optical fiber 14 constituting the optical amplification unit 10A. Table 6 shows 8 types (F, G, H, I, J, K, L, M) of Er-doped optical fiber 14 constituting the optical amplification unit 10B.

TABLE 5

Optical amplification unit 10A in Embodiment 24

| | Fiber Composition | Fiber length (m) | Refractive index difference (%) | Cut-off wave-length (μm) | Er doping concentration (wt. ppm) |
|---|---|---|---|---|---|
| Fiber A | Er-doped fluoride glass fiber<br>Glass composition: Zr based fluoride glass<br>(ZrF4—BaF2—LaF3—YF3—AlF3—LiF—NaF) | 7 | 2.5 | 1.0 | 1000 |
| Fiber B | Er-doped fluoride glass fiber<br>Glass composition: In based fluoride glass<br>(InF3—GaF3—ZnF2—BaF2—PbF2—SrF2—YF3—LiF—NaF) | 7 | 2.5 | 1.0 | 1000 |
| Fiber C | Er-doped fluorophosphate glass fiber<br>Glass composition:<br>P2O5—Al2O3—AlF3—LiF—MgF2—GaF2—SrF2—BaF2—LaF3) | 0.8 | 0.29 | 1.0 | 3300 |
| Fiber D | Er-doped tellurite glass fiber | 1 | 2.5 | 1.3 | 1000 |
| Fiber E | Er-doped chalcogenide glass fiber | 3 | 3.7 | 1.1 | 2000 |

TABLE 6

Optical amplification unit 10A in Embodiment 24

| Fiber | Composition | Fiber length (m) | Refractive index difference (%) | Cut-off wavelength ($\mu$m) | Er doping concentration (wt. ppm) |
|---|---|---|---|---|---|
| Fiber F | Er-doped silica fiber (Al doping concentration: 4.2 wt %) | 200 | 2.5 | 1.1 | 1310 |
| Fiber G | Er-doped multi-component oxide glass fiber Glass composition: aluminosilicate glass | 3 | 0.7 | 1.1 | 10000 |
| Fiber H | Er-doped multi-component oxide glass fiber Glass composition: phosphate glass | 5 | 0.7 | 1.27 | 10000 |
| Fiber I | Er-doped fluoride glass fiber Glass composition: Zr based fluoride glass (ZrF4—BaF2—LaF3—YF3—AlF3—LiF—NaF) | 40 | 2.5 | 1.0 | 1000 |
| Fiber J | Er-doped fluoride glass fiber Glass composition: In based fluoride glass (InF3—GaF3—ZnF2—BaF2—PbF2—SrF2—YF3—LiF—NaF) | 40 | 2.5 | 1.0 | 1000 |
| Fiber K | Er-doped fluorophosphate glass fiber Glass composition: P2O5—Al2O3—AlF3—LiF—MgF2—GaF2—SrF2—BaF2—LaF3 | 3 | 0.29 | 1.0 | 3300 |
| Fiber L | Er-doped tellurite glass fiber | 5 | 2.5 | 1.3 | 1000 |
| Fiber M | Er-doped tellurite glass fiber | 10 | 3.7 | 1.1 | 2000 |

Tables 7 to 11 show the amplification characteristics of the optical fiber amplifier having the optical amplification unit 10A and the optical amplification unit 10B in combination. As shown, it has been found that in all the combinations (40 types), the amplification wavelength region of the conventional optical fiber amplifier can be expanded to at least two times the original. Although the excitation wavelength of the optical amplification units 10A and 10B is set here to 1480 nm, similar amplification characteristics have been obtained when all or part thereof is set to 980 nm.

TABLE 7

Amplification characteristics of optical amplifier of Embodiment 24

| Optical amplification unit 10A | Optical amplification unit 10B | Amplification wavelength region (nm) | Average gain (dB) | Gain deviation (dB) |
|---|---|---|---|---|
| Fiber A | Fiber F | 1530 to 1560 1570 to 1600 | 25 | 1.5 |
| Fiber A | Fiber G | 1530 to 1560 1570 to 1600 | 20 | 1.5 |
| Fiber A | Fiber H | 1530 to 1560 1570 to 1600 | 15 | 1.5 |
| Fiber A | Fiber I | 1530 to 1560 1565 to 1600 | 25 | 1.5 |
| Fiber A | Fiber J | 1530 to 1560 1565 to 1600 | 18 | 1.5 |
| Fiber A | Fiber K | 1530 to 1560 1570 to 1600 | 15 | 1.5 |
| Fiber A | Fiber L | 1530 to 1560 1565 to 1600 | 20 | 1.5 |
| Fiber A | Fiber M | 1530 to 1560 1570 to 1600 | 15 | 1.5 |

TABLE 8

Amplification characteristics of optical amplifier of Embodiment 24

| Optical amplification unit 10A | Optical amplification unit 10B | Amplification wavelength region (nm) | Average gain (dB) | Gain deviation (dB) |
|---|---|---|---|---|
| Fiber B | Fiber F | 1530 to 1560 1570 to 1600 | 18 | 1.5 |
| Fiber B | Fiber G | 1530 to 1560 1570 to 1600 | 18 | 1.5 |
| Fiber B | Fiber H | 1530 to 1560 1570 to 1600 | 18 | 1.5 |
| Fiber B | Fiber I | 1530 to 1560 1565 to 1600 | 18 | 1.5 |
| Fiber B | Fiber J | 1530 to 1560 1565 to 1600 | 18 | 1.5 |
| Fiber B | Fiber K | 1530 to 1560 1570 to 1600 | 15 | 1.5 |
| Fiber B | Fiber L | 1530 to 1560 1565 to 1600 | 18 | 1.5 |
| Fiber B | Fiber M | 1530 to 1560 1570 to 1600 | 15 | 1.5 |

TABLE 9

Amplification characteristics of optical amplifier of Embodiment 24

| Optical amplification unit 10A | Optical amplification unit 10B | Amplification wavelength region (nm) | Average gain (dB) | Gain deviation (dB) |
|---|---|---|---|---|
| Fiber C | Fiber F | 1530 to 1560 1570 to 1600 | 15 | 1.5 |
| Fiber C | Fiber G | 1530 to 1560 1570 to 1600 | 15 | 1.5 |
| Fiber C | Fiber H | 1530 to 1560 1570 to 1600 | 15 | 1.5 |
| Fiber C | Fiber I | 1530 to 1560 1565 to 1600 | 15 | 1.5 |
| Fiber C | Fiber J | 1530 to 1560 1565 to 1600 | 15 | 1.5 |
| Fiber C | Fiber K | 1530 to 1560 1570 to 1600 | 15 | 1.5 |

TABLE 9-continued

Amplification characteristics of optical amplifier of Embodiment 24

| Optical amplification unit 10A | Optical amplification unit 10B | Amplification wavelength region (nm) | Average gain (dB) | Gain deviation (dB) |
| --- | --- | --- | --- | --- |
| Fiber C | Fiber L | 1530 to 1560<br>1565 to 1600 | 15 | 1.5 |
| Fiber C | Fiber M | 1530 to 1560<br>1570 to 1600 | 15 | 1.5 |

TABLE 10

Amplification characteristics of optical amplifier of Embodiment 24

| Optical amplification unit 10A | Optical amplification unit 10B | Amplification wavelength region (nm) | Average gain (dB) | Gain deviation (dB) |
| --- | --- | --- | --- | --- |
| Fiber D | Fiber F | 1530 to 1560<br>1570 to 1600 | 20 | 1.5 |
| Fiber D | Fiber G | 1530 to 1560<br>1570 to 1600 | 20 | 1.5 |
| Fiber D | Fiber H | 1530 to 1560<br>1570 to 1600 | 20 | 1.5 |
| Fiber D | Fiber I | 1530 to 1560<br>1565 to 1600 | 20 | 1.5 |
| Fiber D | Fiber J | 1530 to 1560<br>1565 to 1600 | 18 | 1.5 |
| Fiber D | Fiber K | 1530 to 1560<br>1570 to 1600 | 15 | 1.5 |
| Fiber D | Fiber L | 1530 to 1560<br>1565 to 1600 | 20 | 1.5 |
| Fiber D | Fiber M | 1530 to 1560<br>1570 to 1600 | 15 | 1.5 |

TABLE 11

Amplification characteristics of optical amplifier of Embodiment 24

| Optical amplification unit 10A | Optical amplification unit 10B | Amplification wavelength region (nm) | Average gain (dB) | Gain deviation (dB) |
| --- | --- | --- | --- | --- |
| Fiber E | Fiber F | 1530 to 1560<br>1570 to 1600 | 15 | 1.5 |
| Fiber E | Fiber G | 1530 to 1560<br>1570 to 1600 | 15 | 1.5 |
| Fiber E | Fiber H | 1530 to 1560<br>1570 to 1600 | 15 | 1.5 |
| Fiber E | Fiber I | 1530 to 1560<br>1565 to 1600 | 15 | 1.5 |
| Fiber E | Fiber J | 1530 to 1560<br>1565 to 1600 | 18 | 1.5 |
| Fiber E | Fiber k | 1530 to 1560<br>1570 to 1600 | 15 | 1.5 |
| Fiber E | Fiber L | 1530 to 1560<br>1565 to 1600 | 18 | 1.5 |
| Fiber E | Fiber M | 1530 to 1560<br>1570 to 1600 | 18 | 1.5 |

Embodiment 25

The basic structure of the optical amplifier according to the present embodiment is the same as Embodiment 22 or 23. In the present embodiment, the optical fiber amplifier comprises three optical amplification units 10A, 10B, and 10C, and the Er-doped optical fibers 14 constituting the respective optical amplification units 10A, 10B, and 10C had different characteristics from each other.

Table 12 shows a single type (N) of Er-doped optical fiber constituting the optical amplification unit 10A. Table 13 shows two types (O, N) of Er-doped optical fibers 14 constituting the optical amplification unit 10B. The Er-doped optical fiber constituting the optical amplification unit 10C includes 8 types (F, G, H, I, J, K, L, M) of Er-doped optical fibers shown in Table 6 above.

TABLE 12

Optical amplification unit 10A in Embodiment 25

| Fiber | Composition | Fiber length (m) | Refractive index difference (%) | Cut-off wavelength (μm) | Er doping concentration (wt. ppm) |
| --- | --- | --- | --- | --- | --- |
| Fiber N | Er-doped silica fiber (Al doping concentration: 4.2 wt %) | 20 | 1.8 | 1.1 | 1310 |

TABLE 13

Optical amplification unit 10B in Embodiment 25

| | Composition | Fiber length (m) | Refractive index difference (%) | Cut-off wavelength (μm) | Er doping concentration (wt. ppm) |
| --- | --- | --- | --- | --- | --- |
| Fiber O | Er-doped multi-component oxide fiber<br>Glass composition: aluminosilicate glass | 80 | 0.7 | 1.1 | 10000 |
| Fiber P | Er-doped multi-component oxide fiber<br>Glass composition: phosphate glass | 1 | 0.7 | 1.27 | 10000 |

Tables 14 to 15 show the amplification characteristics of the optical amplifier having the optical amplification units 10A, 10B, and 10C in combination. As shown, it has been found that in all the combinations (16 types), the amplification wavelength region of the conventional optical fiber amplifier can be remarkably expanded. Although the excitation wavelength of the optical amplification units 10A, 10B, and 10C is set here to 1480 nm, similar amplification characteristics have been obtained when all or part thereof is set to 980 nm.

TABLE 14

Amplification characteristics of optical amplifier of Embodiment 25

| Optical amplification unit 10A | Optical amplification unit 10B | Optical amplification unit 10C | Amplification wavelength region (nm) | Average gain (dB) | Gain deviation (dB) |
| --- | --- | --- | --- | --- | --- |
| Fiber N | Fiber O | Fiber F | 1530 to 1540<br>1545 to 1560<br>1570 to 1600 | 20 | 1.5 |
| Fiber N | Fiber O | Fiber G | 1530 to 1540<br>1545 to 1560 | 20 | 1.5 |
| Fiber N | Fiber O | Fiber H | 1530 to 1540<br>1545 to 1560<br>1575 to 1600 | 22 | 1.5 |
| Fiber N | Fiber O | Fiber I | 1530 to 1540<br>1545 to 1560<br>1565 to 1600 | 20 | 1.5 |
| Fiber N | Fiber O | Fiber J | 1530 to 1540<br>1545 to 1560<br>1565 to 1600 | 18 | 1.5 |

TABLE 14-continued

Amplification characteristics of optical amplifier of Embodiment 25

| Optical amplification unit 10A | Optical amplification unit 10B | Optical amplification unit 10C | Amplification wavelength region (nm) | Average gain (dB) | Gain deviation (dB) |
|---|---|---|---|---|---|
| Fiber N | Fiber O | Fiber K | 1530 to 1540<br>1545 to 1560<br>1570 to 1600 | 15 | 1.5 |
| Fiber N | Fiber O | Fiber L | 1530 to 1540<br>1545 to 1560<br>1570 to 1600 | 20 | 1.5 |
| Fiber N | Fiber O | Fiber M | 1530 to 1540<br>1545 to 1560<br>1570 to 1600 | 15 | 1.5 |

TABLE 15

Amplification characteristics of optical amplifier of Embodiment 12

| Optical amplification unit 10A | Optical amplification unit 10B | Optical amplification unit 10C | Amplification wavelength region (nm) | Average gain (dB) | Gain deviation (dB) |
|---|---|---|---|---|---|
| Fiber N | Fiber P | Fiber F | 1530 to 1540<br>1545 to 1560<br>1570 to 1600 | 22 | 1.5 |
| Fiber N | Fiber P | Fiber G | 1530 to 1540<br>1545 to 1560<br>1570 to 1600 | 20 | 1.5 |
| Fiber N | Fiber P | Fiber H | 1530 to 1540<br>1545 to 1560<br>1575 to 1600 | 22 | 1.5 |
| Fiber N | Fiber P | Fiber I | 1530 to 1540<br>1545 to 1560<br>1565 to 1600 | 22 | 1.5 |
| Fiber N | Fiber P | Fiber J | 1530 to 1540<br>1545 to 1560<br>1565 to 1600 | 22 | 1.5 |
| Fiber N | Fiber P | Fiber K | 1530 to 1540<br>1545 to 1560<br>1570 to 1600 | 15 | 1.5 |
| Fiber N | Fiber N | Fiber L | 1530 to 1540<br>1545 to 1560<br>1570 to 1600 | 20 | 1.5 |
| Fiber N | Fiber N | Fiber M | 1530 to 1540<br>1545 to 1560<br>1570 to 1600 | 15 | 1.5 |

Embodiment 26

FIGS. 30A to 30H show a specific example of the arrangement of the optical amplification units 30A to 30H shown in FIG. 27. In FIG. 30, each of the Er-doped optical fiber 14 as an amplification medium is an Er-doped silica fiber. The fibers had a fiber length of 20 m (optical amplification units 40A to 40D) and of 200 m (optical amplification units 40E to 40H), a refractive index difference of 1%, a cut-off wavelength of 1.1 μm, an Al doping concentration of 4.2 wt. %, and an Er doping concentration of 1310 wt. ppm. The multiplexers 16A and 16B include bulk type WDM couplers, which combine the signal lights and excitation lights and input the resulting waves to the Er-doped optical fiber 14. Although the arrangement of a bidirectional excitation system is shown here, there may also be used a forward or backward excitation system, in which the excitation light is inputted only from one of the Er-doped optical fiber.

In the present embodiment, the excitation light sources 32A and 32B of FIG. 27 comprise 1480 nm band semiconductor lasers. As the dividers 33A and 33B of FIG. 27 for dividing the excitation light are used planar waveguide type 1×8 optical dividing circuits. As the demultiplexer 31 and the multiplexer 35 are used arrayed waveguide gratings. The optical variable attenuators 34A to 34H comprise bulk type attenuation variable optical attenuators. The optical isolators 36A and 36B comprise those of polarization independent type which can obtain a reverse direction insertion loss of about 60 dB in 1550 nm band and 1580 nm band.

Figure 31:
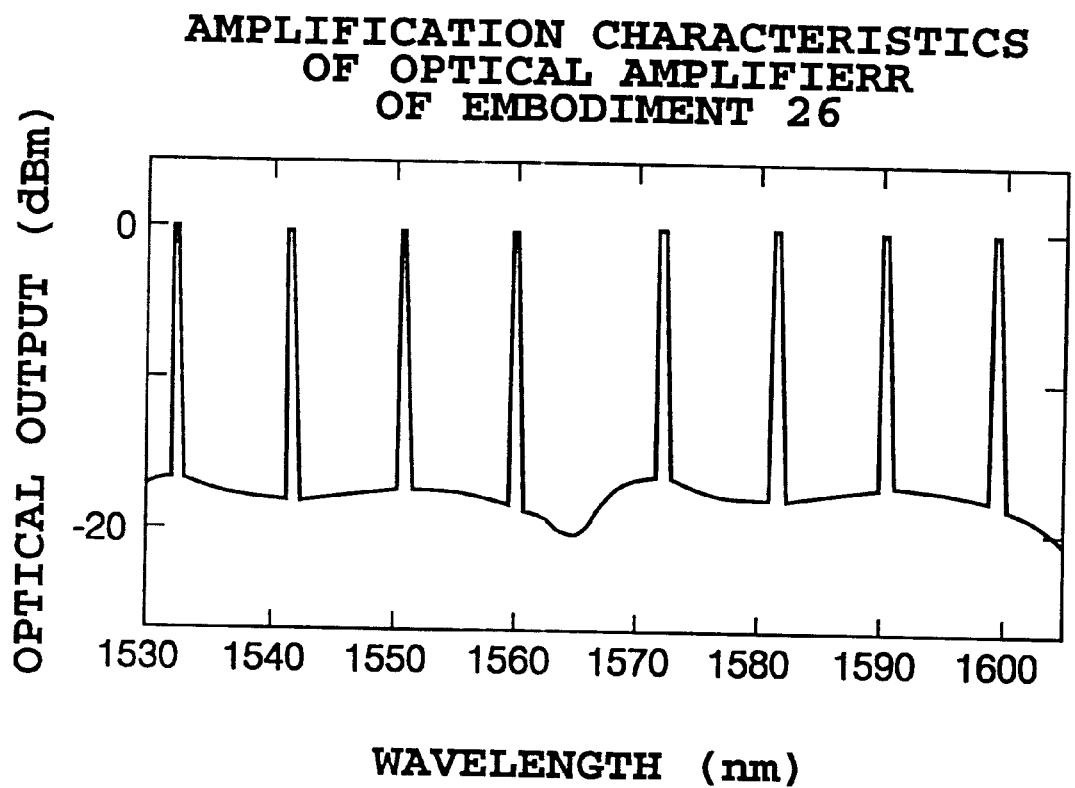
FIG. 31 is a graph illustrating amplification chararcteristics of the optical amplifier of Embodiment 26.

FIG. 31 shows amplification characteristics of optical amplifier according to the fifth embodiment measure by the evaluation system of FIG. 13. The signal light input power is set to −30 dBm per channel. As shown here, WDM signals set in 1532 to 1580 nm and 1572 to 1600 nm can be optically amplified with an average gain of 30 dB (signal light power after amplification is an average of −0 dBm/ch, while signal light power before amplification is −30 dBm/ch), and with a nearly equal gain deviation (gain deviation 0 dB).

As shown above, it has been found that using the optical amplifier according to this invention, flat amplification characteristics can be obtained over wide wavelength region, the amplification wavelength region can be expanded to two times that of the conventional optical fiber amplifier, i.e., from 1530 to 1560 nm (30 nm wide) of the conventional optical fiber amplifier to 1530 to 1560 nm and 157 to 1600 nm (totally 60 nm wide). Although the excitation wavelength of the optical amplification units 40A to 40H is set here to 1480 nm, similar amplification characteristics have been obtained when all or part thereof is set to 980 nm.

Embodiment 27

Figure 32:
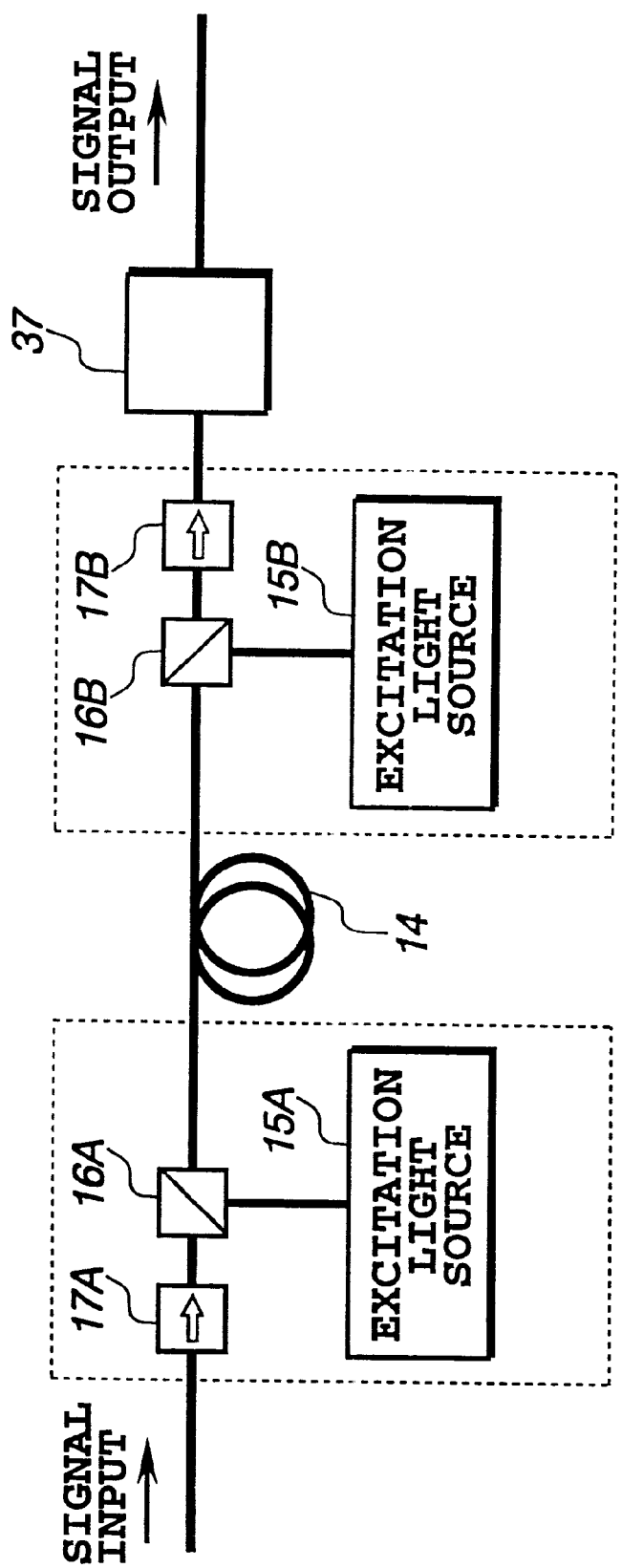
FIG. 32 is a block diagram showing an example of the arrangement of an optical amplifier with an optical equalizer used as an optical amplifying portion shown in FIG. 22.

The basic structure of the optical amplifier according to the present embodiment is the same as Embodiment 22 or 23 and amplifies two amplification wavelength regions in parallel. In the present embodiment, however, the optical amplification unit 10A comprises an optical fiber amplifier additionally including an optical equalizer 37 as shown in FIG. 32. The Er-doped fiber used is an Er-doped silica fiber. The fiber had a fiber length of 25 m, a refractive index difference of 1.7%, a cut-off wavelength of 1.1 μm, and an Er doping concentration of 1300 wt. ppm. As the excitation light source 15A and 15B were used 0.98 μm band semiconductor lasers. The multiplexers 16A and 16B include bulk type WDM couplers. As the optical equalizer 37 was used a long period fiber grating. The transmission characteristics of the optical equalizer 37 were adjusted so that it had flattened amplification characteristics in the 1.53–1.56 wavelength region. On the other hand, as the optical amplification unit 10B was used an optical fiber amplifier having the same structure as shown in FIG. 23. The Er-doped fiber used comprises an Er-doped silica fiber having a fiber length of 200 m, a refractive index difference of 1.7%, a cut-off wavelength of 1.1 μm, and an Er doping concentration of 1300 wt. ppm. As the excitation light source 15A and 15B were used 0.98 μm band semiconductor lasers. The multiplexers 16A and 16B used include bulk type WDM couplers. The optical fiber amplifier of the present embodiment had a flattened gain characteristics in the 1.57–1.60 μm wavelength region. The signal gain in this flattened gain wavelength region was 30 dB. For the demultiplexer 11 of FIG. 22 and the multiplexer 13 of FIG. 22, there was used a bulk type multiplexer/demultiplexer. Further, in the optical fiber amplifier of the present embodiment, the loss of the variable optical attenuators were adjusted so that the optical amplifier unit 10A had a flattened gain of 28 dB in the 1.53–1.56 μm and the optical amplification unit 10B had a flattened gain of 28 dB in the 1.57–1.60 μm.

The amplification characteristics of the optical fiber amplifier of the present embodiment were evaluated using the evaluation system shown in FIG. 26. The wavelength tunable light sources 20A to 20P had signal wavelengths of 1532, 1536, 1540, 1544, 1548, 1552, 1556, 1560, 1572, 1576, 1580, 1584, 1588, 1592, 1596, and 1660 nm, respectively. The signal input power was ñ35 dBm/ch. The measurement revealed that the WDM signals arranged in the 1532–1560 nm and 1572–1600 nm wavelength regions were amplified in an average gain of 28 dB with a gain deviation of less than 1.5 dB.

Embodiment 28

Figure 33:
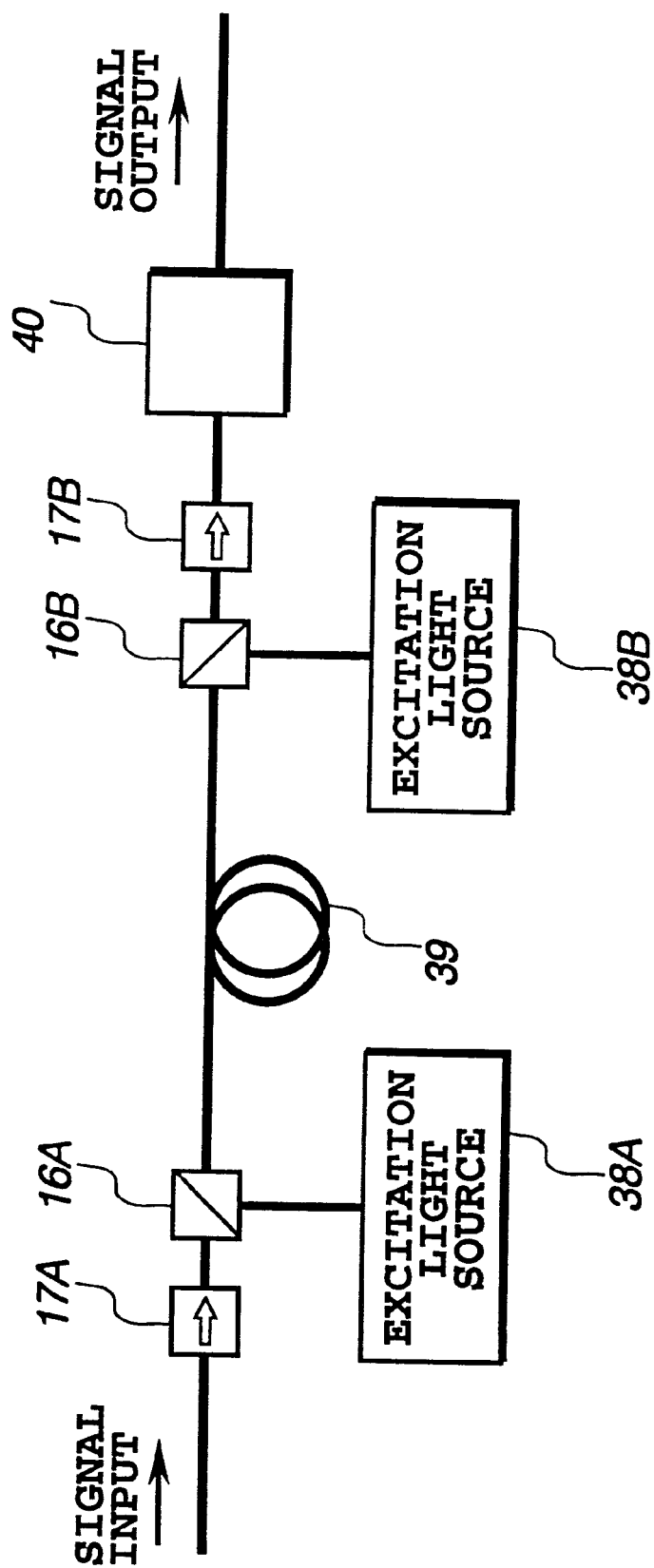
FIG. 33 is a block diagram showing an example of the arrangement of a Tm$^{3+}$- or Pr$^{3+}$-doped optical amplifier with an optical equalizer used as an optical amplifying portion shown in FIG. 22.
Figure 34:
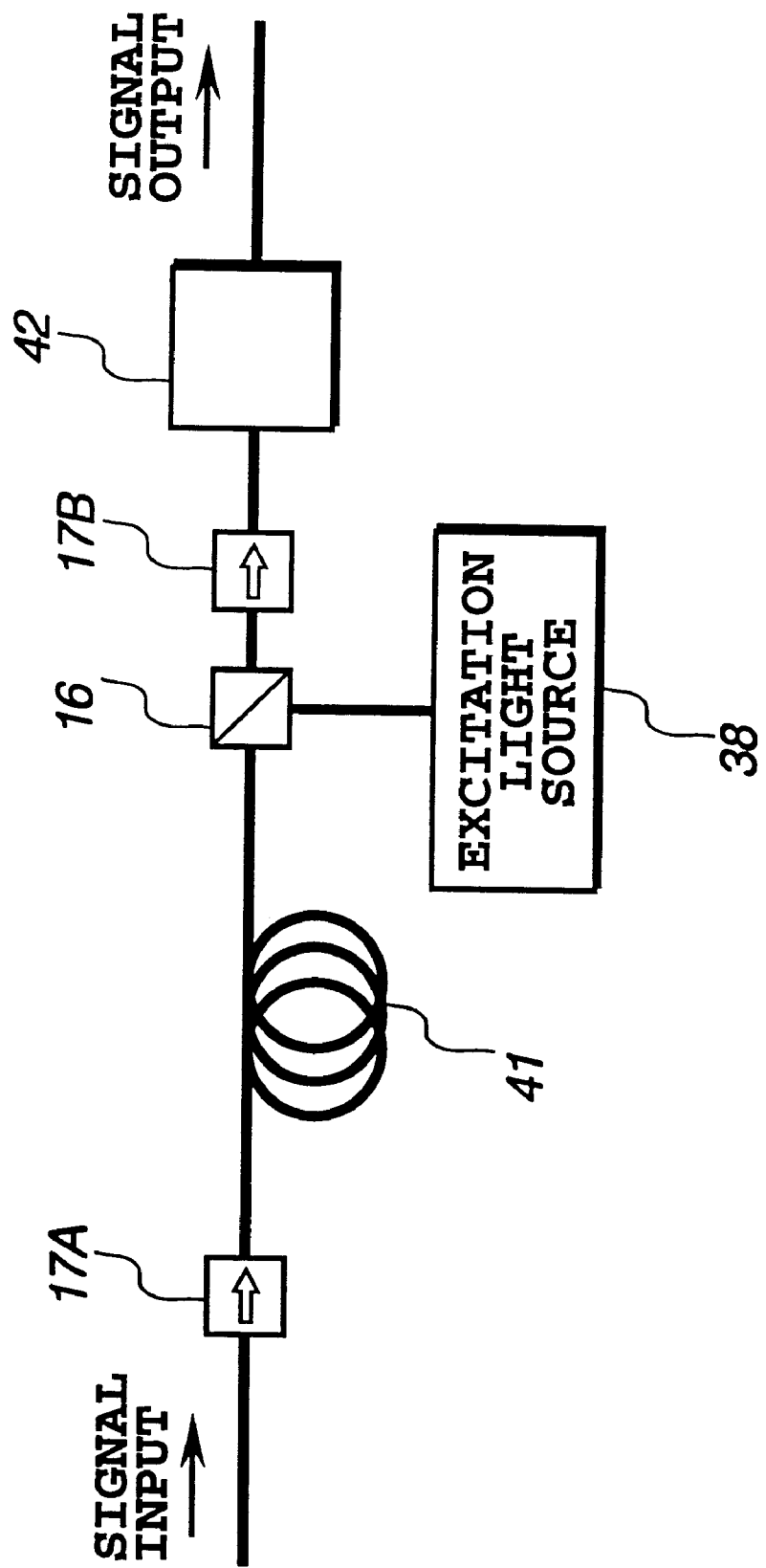
FIG. 34 is block diagram showing an example of the arrangement of a Raman fiber amplifier with an optical equalizer used as an optical amplifying portion shown in FIG. 22.

The optical amplifier according to the present embodiment has a basic structure which is the same as that of the optical fiber amplifier of Embodiment 22 or 23. In the present embodiment, however, the optical fiber amplifier include four optical amplification units, i.e., optical amplification units 10A, 10B, 10C, and 10D. The optical amplification unit 10A comprises an optical fiber amplifier additionally including an optical equalizer 37 as shown in FIG. 32. The Er-doped fiber used is an Er-doped silica fiber. The fiber had a fiber length of 25 m, a refractive index difference of 1.7%, a cut-off wavelength of 1.1 μm, and an Er doping concentration of 1300 wt. ppm. As the excitation light source 15A and 15B were used 1.48 μm band semiconductor lasers. The multiplexers 16A and 16B include bulk type WDM couplers. As the optical equalizer 37 was used a long period fiber grating. The optical equalizer 37 was fabricated so that it had flattened amplification characteristics in the 1.53–1.56 wavelength region. The optical amplification unit 10A had a signal gain of 38 dB in the flattened gain wavelength region. On the other hand, as the optical amplification unit 10B was used an optical fiber amplifier having the same structure as shown in FIG. 23. The Er-doped fiber used comprises an Er-doped silica fiber having a fiber length of 200 m, a refractive index difference of 1.7%, a cut-off wavelength of 1.1 μm, and an Er doping concentration of 1300 wt. ppm. As the excitation light source 15A and 15B were used 1.48 μm band semiconductor lasers. The multiplexers 16A and 16B used include bulk type WDM couplers. The optical amplification unit 10B had flattened gain characteristics in the 1.57–1.60 μm wavelength region. The signal gain in this flattened gain wavelength region was 30 dB. As the optical amplification unit 10C was used a $Tm^{3+}$-doped optical fiber amplifier additionally including an optical equalizer 40 as shown in FIG. 33. The $Tm^{3+}$-doped fiber used comprises a $Tm^{3+}$-doped fluoride fiber 39 having a fiber length of 20 m, a refractive index difference of 3.7%, a cut-off wavelength of 1.0 μm, and an Tm doping concentration of 1000 wt. ppm. As the excitation light sources 15A and 15B were used 1.047 μm band launching Nd-YLF lasers. The optical equalizer 40 comprises a Fabry-Perot etalon. The optical equalizer 40 was fabricated so that it had flattened amplification characteristics in the 1.43–1.49 wavelength region. The optical amplification unit 10C had a signal gain of 28 dB in the flattened gain wavelength region. As the optical amplification unit 10D was used a Raman fiber amplifier additionally including the optical equalizer 42 (FIG. 34). The fiber used for amplification was a silica fiber 41 having a fiber length of 60 μm, a refractive index difference of 0.7%, a cut-off wavelength of 0.9 μm. The excitation light source 38 was a 1.43 μm band launching Raman fiber laser. As the multiplexer 16A and 16B were used fiber couplers. The optical equalizer 42 comprises a Fabry-Perot etalon. The optical equalizer 42 was fabricated so that the Raman fiber amplifier shown in FIG. 34 had flattened amplification characteristics in the 1.49–1.52 μm wavelength region. The optical amplification unit 10C had a signal gain of 18 dB in the flattened gain wavelength region.

Figure 35:
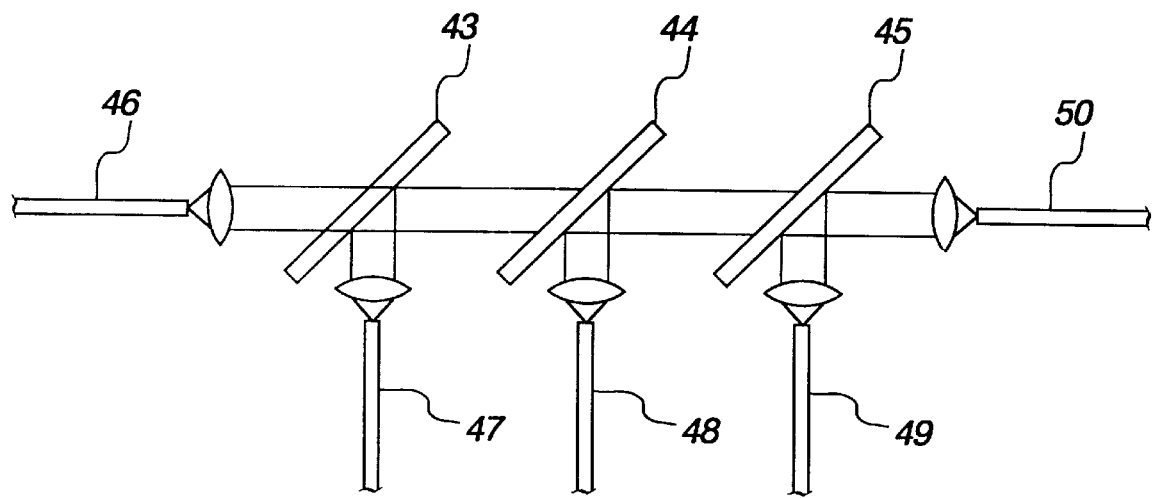
FIG. 35 is a block diagram showing the structure of a bulk-type multiplexer/demultiplexer which is used as a multiplexing portion and a demultiplexing portion of the optical amplifier shown in FIG. 22.

For the demultiplexer 11 of FIG. 22 and the multiplexer 13 of FIG. 22, there was used a bulk type multiplexer/demultiplexer as shown in FIG. 35. Fibers 46, 47, 48, and 49 are input/output ports for signal lights in the 1.56–1.60, 1.53–1.56, 1.49–1.52, and 1.43–1.49 μm wavelength regions, respectively, and also serve as a port for the signal light which multiplexes into a fiber 50 or demultiplexes from the fiber 50. Reference numeral 45 denotes a multilayer dielectric film which transmits a signal light of a wavelength not shorter than 1.49 μm and reflects a signal light of a wavelength not longer than 1.48 μm. Reference numeral 44 denotes a multilayer dielectric film which transmits a signal light of a wavelength not shorter than 1.52 μm and reflects a signal light of a wavelength not longer than 1.51 μm. Reference numeral 43 denotes a multilayer dielectric film which transmits a signal light of a wavelength not shorter than 1.56 μm and reflects a signal light of a wavelength not longer than 1.55 μm. Further, in the optical fiber amplifier of the present embodiment, the loss of the variable optical attenuators 12A, 12B, 12C, and 12D were adjusted so that the optical amplifier units 10A, 10B, 10C, and 10D had a flattened gain of 18 dB.

The amplification characteristics of the optical fiber amplifier of the present embodiment were evaluated in the same manner as in Embodiment 22 using the evaluation system shown in FIG. 26 except that the number of wave signals was increased to 26. The wavelengths of the signals were 1430, 1440, 1450, 1460, 1470, 1480, 1490, 1500, 1510, 1520, 10 1532, 1536, 1540, 1544, 1548, 1552, 1556, 1560, 1572, 1576, 1580, 1584, 1588, 1592, 1596, and 1660 nm, respectively. The signal input power was ñ35 dBm/ch. The measurement revealed that the WDM signals arranged in the 1532–1560 nm and 1572–1600 nm wavelength regions were amplified in an average gain of 18 dB with a gain deviation of no more than 1.5 dB.

Embodiment 29

The optical amplifier according to the present embodiment has a basic structure which is the same as that of the optical fiber amplifier of Embodiment 22 or 23. In the present embodiment, however, the optical fiber amplifier include four optical amplification units, i.e., optical amplification units 10A, 10B, 10C, and 10D. The optical amplification unit 10A comprises an optical fiber amplifier additionally including an optical equalizer 37 as shown in FIG. 32. The Er-doped fiber used is an Er-doped silica fiber. The fiber had a fiber length of 25 m, a refractive index difference of 1.7%, a cut-off wavelength of 1.1 μm, and an Er doping concentration of 1300 wt. ppm. As the excitation light source 15A and 15B were used 0.98 μm band semiconductor lasers. The multiplexers 16A and 16B include bulk type WDM couplers. As the optical equalizer 37 was used a long period fiber grating. The optical equalizer 37 was fabricated so that the optical fiber amplifier shown in FIG. 32 had flattened gain characteristics in the 1.53–1.56 wavelength region. The optical amplification unit 10A had a signal gain of 38 dB in the flattened gain wavelength region. On the other hand, as the optical amplification unit 10B was used an optical fiber amplifier having the same structure as shown in FIG. 23. The Er-doped fiber used comprises an Er-doped silica fiber having a fiber length of 200 m, a refractive index difference of 1.7%, a cut-off wavelength of 1.1 μm, and an Er doping concentration of 1300 wt. ppm. As the excitation light source 15A and 15B were used 1.48 μm band semiconductor lasers The multiplexers 16A and 16B used include bulk type WDM couplers. The optical amplification unit 10B had flattened gain characteristics in the 1.57–1.60 μm wavelength region. The signal gain in this flattened gain wavelength region was 30 dB. As the optical amplification unit 10C was used a $Pr^{3+}$-doped optical fiber amplifier additionally including an optical equalizer 40 as shown in FIG. 33. The $Pr^{3+}$-doped fiber used comprises a $Pr^{3+}$-doped fluoride fiber 39 having a fiber length of 20 m, a refractive index difference of 2.5%, a cut-off wavelength of 1.0 μm, and a Pr doping concentration of 1000 wt. ppm. As the excitation light sources 15A and 15B were used 1.047 μm band launching Nd-YLF lasers. The optical equalizer 40 comprises a Fabry-Perot etalon. The optical equalizer 40 was fabricated so that the optical fiber amplifier shown in FIG. 33 had flattened amplification characteristics in the 1.28–1.32 μm wavelength region. The optical amplification unit 10C had a signal gain of 28 dB in the flattened gain wavelength region. As the optical amplification unit 10D was used a Raman fiber amplifier additionally including the optical equalizer 42 (FIG. 34). The fiber used for amplification was a silica fiber 41 having a fiber length of 60 μm, a refractive index difference of 0.7%, a cut-off wavelength of 0.9 μm. The excitation light source 38 was a 1.43 μm band launching Raman fiber laser. As the multiplexer 16A and 16B were used fiber couplers. The optical equalizer 42 comprises a Fabry-Perot etalon. The optical equalizer 42 was fabricated so that the Raman fiber amplifier shown in FIG. 34 had flattened amplification characteristics in the 1.49–1.52 μm wavelength region. The optical amplification unit 10D had a signal gain of 18 dB in the flattened gain wavelength region. For the demultiplexer 11 and the multiplexer 13, there was used a bulk type multiplexer/demultiplexer as shown in FIG. 34. Fibers 46, 47, 48, and 49 are input/output ports for signal lights in the 1.56–1.60, 1.53–1.56, 1.49–1.52, and 1.43–1.49 μm wavelength regions, respectively, and also serve as a port for the signal light which multiplexes into a fiber 50 or demultiplexes from the fiber 50. Reference numeral 45 denotes a multilayer dielectric film which transmits a signal light of a wavelength not shorter than 1.49 μm and reflects a signal light of a wavelength not longer than 1.48 μm. Reference numeral 44 denotes a multilayer dielectric film which transmits a signal light of a wavelength not shorter than 1.52 μm and reflects a signal light of a wavelength not longer than 1.51 μm. Reference numeral 43 denotes a multilayer dielectric film which transmits a signal light of a wavelength not shorter than 1.56 μm and reflects a signal light of a wavelength not longer than 1.55 μm. Further, in the optical fiber amplifier of the present embodiment, the loss of the variable optical attenuators 12A, 12B, 12C, and 12D were adjusted so that the optical amplifier units 10A, 10B, 10C, and 10D had a flattened gain of 18 dB.

The amplification characteristics of the optical fiber amplifier of the present embodiment were evaluated in the same manner as in Embodiment 22 using the evaluation system shown in FIG. 26 except that the number of wave signals was increased to 25. The wavelengths of the signals were 1280, 1290, 1300, 1310, 1320, 1490, 1500, 1510, 1520, 1532, 1536, 1540, 1544, 1548, 1552, 1556, 1560, 1572, 1576, 1580, 1584, 1588, 1592, 1596, and 1660 nm, respectively. The signal input power was ñ35 dBm/ch. The measurement revealed that the WDM signals were amplified in an average gain of 18 dB with a gain deviation of no more than 1.5 dB.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical amplifier, comprising:
   an erbium-doped fiber having a core part and a clad part, at least one of the core part and the clad part being doped with erbium,;
   at least one excitation light source for exciting said erbium-doped fiber, the at least one excitation light source emitting excitation light selected from a wavelength of about 0.97, 0.98 or 1.48 μm;
   optical means for inputting excitation light from said at least one excitation light source and at least one signal light to said erbium-doped fiber; and
   an optical isolator,
   wherein the erbium-doped fiber is selected to have a certain value of a product of an erbium-doped fiber length and an erbium concentration in said erbium-doped fiber so as to obtain more than a predetermined gain at a wavelength region having a 1.58 μm-band.

2. The optical amplifier as claimed in claim 1, wherein said erbium-doped fiber is an erbium-doped fiber which comprises, as a main component, a material selected from the group consisting of silica, tellurite glass, multicomponent oxide glass, charcogenide glass or fluorophosphate glass, and said at least one excitation light source is selected from light sources emitting light in one of about 0.98 or 1.48 μm of wavelength band.

3. The optical amplifier as claimed in claim 1, wherein said erbium-doped fiber is an erbium-doped fluoride base fiber, and wherein said at least one excitation light source is selected from light sources emitting light having one of about 0.97 or 1.48 μm of wavelength band.

4. The optical amplifier as claimed in claim 1, wherein said predetermined gain is 15 dB, wherein said erbium-doped fiber is selected from the group consisting of (a) an erbium-doped fiber which is comprised of a silica as a main component, (b) an erbium-doped fiber which is comprised of multicomponent oxide glass as a main component, (c) an erbium-doped fiber which is comprised of charcogenide glass as a main component, and (d) an erbium-doped fiber which is comprised of fluorophosphate glass as a main component, and wherein a difference between the gain of a maximum signal wavelength and the gain of a minimum signal wavelength in a wavelength region of 1.570 to 1.600 μm is less than 1 dB.

5. The optical amplifier as claimed in claim 1, wherein said predetermined gain is 15 dB, and wherein said erbium-doped fiber is selected from the group consisting of (a) an erbium-doped fluoride base fiber and (b) an erbium-doped fiber which is comprised of tellurite glass fiber as a main component, and wherein a difference between the gain of a maximum signal wavelength and the gain of a minimum signal wavelength in a wavelength region of 1.565 to 1.600 μm is less than 1 dB.

6. An optical amplifier, comprising:
   a fiber having a core part and a clad part, in which the fiber is comprised of silica as a main component, and at least one of the core part and the clad part of the fiber is doped with erbium;
   a 0.98 μm excitation light source for exciting $^4I_{11/2}$ level of Er in said fiber;
   optical means for inputting excitation light from said excitation light source and signal light to said fiber; and
   an optical isolator,
   wherein a product of a fiber length of said fiber and an erbium concentration in said fiber is greater than $0.3\times 10^5$ (m·wt.ppm).

7. An optical amplifier, comprising:
a fiber having a core part and a clad part, in which the fiber is comprised of silica as a main component, and at least one of the core part and the clad part of the fiber is doped with erbium;
a 1.48 μm excitation light source for exciting a $^4I_{13/2}$ level of Er in said fiber;
optical means for inputting excitation light from said excitation light source and signal light to said fiber; and
an optical isolator,
wherein a product of a fiber length of said fiber and an erbium concentration in said fiber is greater than $0.6 \times 10^5$ (m·wt.ppm).

8. An optical amplifier, comprising:
an erbium-doped fluoride base fiber having a core part and a clad part, at least one of the core part and the clad part being doped with erbium;
a 0.97 μm excitation light source for exciting a $^4I_{11/2}$ level of Er in said fluoride base fiber;
optical means for inputting excitation light from said excitation light source and signal light to said fluoride base fiber; and
an optical isolator,
wherein a product of a fluoride base fiber length of said fluoride base fiber and an erbium concentration in said fluoride base fiber is greater than $0.1 \times 10^5$ (m·wt.ppm).

9. An optical amplifier, comprising:
an erbium-doped fluoride base fiber having a core part and a clad part, at least one of the core part and the clad part being doped with erbium;
a 1.48 μm excitation light source for exciting a $^4I_{13/2}$ level of Er in said fluoride base fiber;
optical means for inputting excitation light from said excitation light source and signal light to said fluoride base fiber; and
an optical isolator,
wherein a product of a fluoride base fiber length of said fluoride base fiber and an erbium concentration in said fluoride base fiber is greater than $0.2 \times 10^5$ (m wt.ppm).

10. An optical amplifier, comprising:
a fiber having a core part and a clad part, in which the fiber is comprised of tellurite glass as a main component, and at least one of the core part and the clad part of the fiber is doped with erbium;
a 0.98 μm excitation light source for exciting a $^4I_{11/2}$ level of Er in said fiber;
optical means for inputting excitation light from said excitation light source and signal light to said fiber; and
an optical isolator,
wherein a product of a fiber length of said fiber and an erbium concentration in said fiber is greater than $0.005 \times 10^5$ (m·wt.ppm).

11. An optical amplifier, comprising:
a fiber having a core part and a clad part, in which the fiber is comprised of tellurite glass as a main component, and at least one of the core part and the clad part of the fiber is doped with erbium;
a 1.48 μm excitation light source for exciting a $^4I_{13/2}$ level of Er in said fiber;
optical means for inputting excitation light from said excitation light source and signal light to said fiber; and
an optical isolator,
wherein a product of a fiber length of said fiber and an erbium concentration in said fiber is greater than $0.01 \times 10^5$ (m. wt.ppm).

12. An optical amplifier, comprising:
a fiber having a core part and a clad part, in which the fiber is comprised of multi-component oxide glass as a main component, and at least one of the core part and the clad part of the fiber is doped with erbium;
a 0.98 μm excitation light source for exciting a $^4I_{11/2}$ level of Er in said fiber;
optical means for inputting excitation light from said excitation light source and signal light to said fiber; and
an optical isolator,
wherein a product of a fiber length of said fiber and an erbium concentration in said fiber is greater than $0.008 \times 10^5$ (m·wt.ppm).

13. An optical amplifier, comprising:
a fiber having a core part and a clad part, in which the fiber is comprised of multi-component oxide glass as a main component, and at least one of the core part and the clad part of the fiber is doped with erbium;
a 1.48 μm excitation light source for exciting a $^4I_{13/2}$ level of Er in said fiber;
optical means for inputting excitation light from said excitation light source and signal light to said fiber; and
an optical isolator,
wherein a product of a fiber length of said fiber and an erbium concentration in said fiber is greater than $0.015 \times 10^5$ (m·wt.ppm).

14. An optical amplifier, comprising:
a fiber having a core part and a clad part, in which the fiber is comprised of chalcogenide glass as a main component, and at least one of the core part and the clad part of the fiber is doped with erbium;
a 0.98 μm excitation light source for exciting a $^4I_{11/12}$ level of Er in said fiber;
optical means for inputting excitation light from said excitation light source and signal light to said fiber; and
an optical isolator,
wherein a product of a fiber length of said fiber and an erbium concentration in said fiber is greater than $0.01 \times 10^5$ (m·wt.ppm).

15. An optical amplifier, comprising:
a fiber having a core part and a clad part, in which the fiber is comprised of chalcogenide glass as a main component, and at least one of the core part and the clad part of the fiber is doped with erbium;
a 1.48 μm excitation light source for exciting a $^4I_{13/2}$ level of Er in said fiber;
optical means for inputting excitation light from said excitation light source and signal light to said fiber; and
an optical isolator,
wherein a product of a fiber length of said fiber and an erbium concentration in said fiber is greater than $0.02 \times 10^5$ (m·wt.ppm).

16. An optical amplifier, comprising:
a fiber having a core part and a clad part, in which the fiber is comprised of fluorophosphate glass as a main component, and at least one of the core part and the clad part of the fiber is doped with erbium;
a 0.98 μm excitation light source for exciting a $^4I_{11/2}$ level of Er in said fiber;
optical means for inputting excitation light from said excitation light source and signal light to said fiber; and
an optical isolator,
wherein a product of a fiber length of said fiber and an erbium concentration in said fiber is greater than $0.008 \times 10^5$ (m·wt.ppm).

17. An optical amplifier, comprising:
a fiber having a core part and a clad part, in which the fiber is comprised of fluorophosphate glass as a main component, and at least one of the core part and the clad part of the fiber is doped with erbium;
a 1.48 μm excitation light source for exciting a $^4I_{13/2}$ level of Er in said fiber;
optical means for inputting excitation light from said excitation light source and signal light to said fiber; and
an optical isolator,
wherein a product of a fiber length of said fiber and an erbium concentration in said fiber is greater than 0.015×10$^5$ (m·wt.ppm).

18. An optical amplifier, comprising:
a fiber having a core part and a clad part, in which the fiber is comprised of silica as a main component, and at least one of the core part and the clad part of the fiber is doped with erbium;
a 0.98 μm excitation light source for exciting a $^4I_{11/2}$ level of Er in said fiber and a 1.48 μm excitation light source for exciting a $^4I_{13/2}$ level of Er in said fiber;
optical means for inputting excitation light from said excitation light source and signal light to said fiber; and
an optical isolator,
wherein a product of a fiber length of said fiber and an erbium concentration in said fiber is greater than 0.01×10$^5$ (m·wt.ppm).

19. An optical amplifier, comprising:
an erbium-doped fluoride base fiber having a core part and a clad part, at least one of the core part and the clad part being doped with erbium;
a 0.97 μm excitation light source for exciting a $^4I_{11/2}$ level of Er in said fluoride base fiber and a 1.48 μm excitation light source for exciting a $^4I_{13/2}$ level of Er in said fluoride base fiber;
optical means for inputting excitation light from said excitation light source and signal light to said fluoride base fiber; and
an optical isolator,
wherein a product of a fluoride base fiber length of said fluoride base fiber and an erbium concentration in said fluoride base fiber is greater than 0.1×10$^5$ (m·wt.ppm).

20. An optical amplifier, comprising:
a fiber having a core part and a clad part, in which the fiber is comprised of tellurite glass as a main component, and at least one of the core part and the clad part of the fiber is doped with erbium;
a 0.98 μm excitation light source for exciting a $^4I_{11/2}$ level of Er in said fiber and a 1.48 μm excitation light source for exciting a $^4I_{13/2}$ level of Er in said fiber;
optical means for inputting excitation light from said excitation light source and signal light to said fiber; and
an optical isolator,
wherein a product of fiber length of said fiber and erbium concentration in said fiber is greater than 0.005×10$^5$ (m·wt.ppm).

21. An optical amplifier, comprising:
a fiber having a core part and a clad part, in which the fiber is comprised of multi-component oxide glass as a main component, and at least one of the core part and the clad part of the fiber is doped with erbium;
a 0.98 μm excitation light source for exciting a $^4I_{11/2}$ level of Er in said fiber and a 1.48 μm excitation light source for exciting a $^4I_{13/2}$ level of Er in said fiber;
optical means for inputting excitation light from said excitation light source and signal light to said fiber; and
an optical isolator,
wherein a product of fiber length of said fiber and erbium concentration in said fiber is greater than 0.008×10$^5$ (m·wt.ppm).

22. An optical amplifier, comprising:
a fiber having a core part and a clad part, in which the fiber is comprised of chalcogenide glass as a main component, and at least one of the core part and the clad part of the fiber is doped with erbium;
0.98 μm excitation light source for exciting a $^4I_{11/2}$ level of Er in said fiber and a 1.48 μm excitation light source for exciting a $^4I_{13/2}$ level of Er in said fiber;
optical means for inputting excitation light from said excitation light source and signal light to said fiber; and
n optical isolator,
wherein a product of fiber length of said fiber and erbium concentration in said fiber is greater than 0.01×10$^5$ (m·wt.ppm).

23. An optical amplifier, comprising:
a fiber having a core part and a clad part, in which the fiber is comprised of fluorophosphate glass as a main component, and at least one of the core part and the clad part of the fiber is doped with erbium;
a 0.98 μm excitation light source for exciting a $^4I_{11/2}$ level of Er in said fiber and a 1.48 μm excitation light source for exciting a $^4I_{13/2}$ level of Er in said fiber;
optical means for inputting excitation light from said excitation light source and signal light to said fiber; and
an optical isolator,
wherein a product of fiber length of said fiber and erbium concentration in said fiber is greater than 0.008×10$^5$ (m·wt.ppm).

24. An optical amplifier, comprising:
a demultiplexer for dividing signal light into a plurality of wavelength regions;
a plurality of optical amplification units for amplifying individual signal light outputted from said demultiplexer; and
a multiplexer for combining individual signal light outputted from said plurality of optical amplification units,
wherein at least one of said plurality of optical amplification units is selected from the optical amplifier as claimed in claim 1 to 23.

25. The optical amplifier as claimed in claim 24, wherein an optical variable attenuator for adjusting a signal light power outputted from each optical amplification unit is inserted between at least one of the optical amplification unit and an input port of said multiplexer.

26. An optical amplifier, comprising:
a demultiplexer for dividing signal light into a plurality of wavelength regions; a plurality of optical amplification units for amplifying individual signal light outputted from said demultiplexer; and
a multiplexer for combining individual signal light outputted from said plurality of optical amplification units,
wherein at least one of said plurality of optical amplification units is selected from an optical amplifier as claimed in claim 1 to 23,
wherein at least one of remaining said plurality of optical amplification units is selected from:
(a) a thulium-doped amplifier in which the thulium-doped amplifier comprises a thulium-doped fiber having a core part and a clad part, one of the core part and the clad part being doped with thulium, an excitation light source for exciting said thulium-doped fiber, optical means for inputting an excitation light from said excitation light source and a signal light into said thulium-doped fiber, (b) a praseodymium-doped amplifier in which the praseodymium-doped amplifier comprises a praseodymium-doped fiber having a core part and a clad part, one of the core part and the clad part being doped with praseodymium, an excitation light source for exciting said praseodymium-doped fiber, optical means for inputting an excitation light from said excitation light source and a signal light into said praseodymium-doped fiber, and (c) a Raman fiber amplifier.

27. The optical amplifier as claimed in claim 26, wherein said Raman fiber amplifier has amplification activity in a 1.51 $\mu$m band.

28. An optical amplification method for amplifying signal light in a wavelength region of 1.58 $\mu$m band comprising steps of;

inputting the signal light into an erbium-doped fiber, and amplifying the signal light by passing an excitation light from an excitation light source through the erbium-doped fiber, wherein an emission wavelength of said excitation light is selected form about 0.97, 0.98 or 1.48 $\mu$m, said erbium-doped fiber has a core part and a clad part, at least one of the core part and the clad part being doped with erbium, and the erbium-doped fiber is selected to have a certain value of a product of an erbium-doped fiber length and an erbium concentration in said erbium-doped fiber so as to obtain more than a predetermined gain at a wavelength region of 1.58 $\mu$m-band.

29. The optical amplification method as claimed in claim 28, wherein said wavelength region of 1.58 $\mu$m-band is a wavelength region of 1.57 to 1.60 $\mu$m.

30. The optical amplification method as claimed in claim 28, wherein said wavelength region of 1.58 $\mu$m band is a wavelength region of 1.565 to 1.60 $\mu$m.

31. An optical amplification method for amplifying signal light in a wavelength region of 1.58 $\mu$m band comprising steps of:

inputting signal light;

dividing the signal light into a plurality of wavelength regions by demultiplexer;

amplifying the divided signal lights by a plurality of optical amplification units; and combining the amplified divided signal lights outputted from said plurality of optical amplification units;

wherein at least one of said optical amplification unit comprises an erbium-doped fiber having core part and a clad part, at least one of the core part and the clad part being doped with erbium, an excitation light source for exciting said Er-doped fiber, optical means for inputting an excitation light from said excitation light source and the individual divided signal light into said Er-doped fiber, an emission wavelength of said excitation light is selected from about 0.97, 0.98 or 1.48 $\mu$m, and the Er-doped fiber is selected to have a certain value of a product of an erbium-doped fiber length and an erbium concentration in said erbium-doped fiber so as to obtain a predetermined gain at a wavelength region of 1.58 $\mu$m-band.

32. The optical amplification method as claimed in claim 31, wherein at least one of the optical amplification unit comprises an erbium-doped fiber having a core part and a clad part, at least one of the core part and the clad part being doped with erbium, at least one of remaining said optical amplification unit is selected from:

(a) a thulium fiber amplifier which comprises a thulium-doped fiber having a core part and a clad part, one of the core part and the clad part being doped with thulium, (b) a praseodymium fiber amplifier which comprises a praseodymium-doped fiber having a core part and a clad part, one of the core part and the clad part being doped with praseodymium, and (c) a Raman fiber amplifier.

33. The optical amplification method as claimed in claim 32, wherein said Raman fiber amplifier has an amplification activity in a 1.51 $\mu$m band.

34. The optical amplifier as claimed in claim 26, wherein an optical variable attenuator for adjusting a signal light power outputted from each optical amplification unit is inserted between at least one of the optical amplification unit and an input port of said multiplexer.

35. The optical amplifier as claimed in claim 26, wherein an optical variable attenuator for adjusting a signal light power outputted from each optical amplification unit is inserted between at least one of the optical amplification unit and an input port of said multiplexer, and wherein said Raman fiber amplifier has an amplification activity in a 1.51 $\mu$m band.

* * * * *